(12) United States Patent
Masuda

(10) Patent No.: US 9,323,370 B2
(45) Date of Patent: Apr. 26, 2016

(54) ELECTRODE SHEET, TOUCH PANEL, AND DISPLAY DEVICE

(71) Applicant: Sharp Kabushiki Kaisha, Osaka-shi, Osaka (JP)

(72) Inventor: Takeshi Masuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 75 days.

(21) Appl. No.: 14/359,921

(22) PCT Filed: Jan. 30, 2013

(86) PCT No.: PCT/JP2013/052007
§ 371 (c)(1),
(2) Date: May 22, 2014

(87) PCT Pub. No.: WO2013/140859
PCT Pub. Date: Sep. 26, 2013

(65) Prior Publication Data
US 2014/0320769 A1      Oct. 30, 2014

(30) Foreign Application Priority Data

Mar. 22, 2012   (JP) .................................. 2012-066190

(51) Int. Cl.
*G06F 3/041* (2006.01)
*G06F 3/044* (2006.01)

(52) U.S. Cl.
CPC ................ *G06F 3/041* (2013.01); *G06F 3/044* (2013.01)

(58) Field of Classification Search
CPC ..... G06F 3/041; G06F 3/044; G02F 1/13338; G02F 1/1333

USPC .......................................................... 345/173
See application file for complete search history.

(56) References Cited

U.S. PATENT DOCUMENTS

| 2010/0060602 | A1  | 3/2010  | Agari et al. |
| 2011/0102370 | A1* | 5/2011  | Kono et al. ................... 345/174 |
| 2012/0118614 | A1  | 5/2012  | Kuriki |
| 2012/0212449 | A1  | 8/2012  | Kuriki |
| 2012/0312677 | A1  | 12/2012 | Kuriki |

FOREIGN PATENT DOCUMENTS

| JP | 2010-061502 A | 3/2010 |
| JP | 2010-097536 A | 4/2010 |
| JP | 2010-262529 A | 11/2010 |
| JP | 2011-129112 A | 6/2011 |
| JP | 2011-175628 A | 9/2011 |
| JP | 2011-175967 A | 9/2011 |
| JP | 2011-237839 A | 11/2011 |

OTHER PUBLICATIONS

Official Communication issued in International Patent Application No. PCT/JP2013/052007, mailed on Apr. 16, 2013.

* cited by examiner

*Primary Examiner* — Towfiq Elahi
(74) *Attorney, Agent, or Firm* — Keating & Bennett, LLP

(57) ABSTRACT

An electrode sheet (2) is provided with an X pattern electrode part (12) in which X pattern electrodes (18) of X electrodes (17) multiply connected in the X direction are multiply arranged in the Y direction, and a Y pattern electrode part (22) in which Y pattern electrodes (28) of Y electrodes (27) multiply connected in the Y direction are multiply arranged in the X direction. In a planar view, the Y electrodes (27) are provided between the X electrodes (17), and multiple different electrode patterns are alternately arranged in one of the X direction, the Y direction, and a diagonal direction.

14 Claims, 32 Drawing Sheets

ELECTRODE SHEET, TOUCH PANEL, AND DISPLAY DEVICE

TECHNICAL FIELD

The present invention relates to an electrode sheet for a touch panel, a touch panel, and a display device equipped with a touch panel.

BACKGROUND ART

Recently, in order to further miniaturize devices, electro-optical devices such as a display device with an integrated display unit and input unit are becoming widely prevalent. Particularly, among mobile devices such as mobile phones, personal digital assistants (PDAs), and tablet personal computers (PCs), there is widespread use of display devices equipped with a touch panel able to detect a contact position when a finger or input stylus is made to contact a display screen.

Regarding touch panels, in the related art, various types of touch panels are known, such as the so-called resistive film (pressure-sensitive) technique and the electrostatic capacitance technique. Among these, so-called capacitive touch panels, which use an electrostatic capacitance technique that detects a contact position by detecting changes in electrostatic capacitance, are being widely used in the display devices of mobile equipment and the like.

In addition, regarding such capacitive touch panels, two types of touch panels are known: touch panels of what is called the surface capacitance type, and touch panels of the projected capacitance type. Among these, projected capacitance touch panels having a large number of electrodes arranged in a matrix in a planar view are more suitably being used, since two or more contacts (multi-touch) may be detected at the same time (for example, see PTLs 1 to 7).

Herein, a general configuration of a touch panel electrode sheet used in a touch panel that uses the projected capacitance type of the electrostatic capacitance technique of the related art will be described below with reference to FIGS. 31 to 34.

FIG. 31 is an exploded perspective view illustrating a general configuration of the principal part of the conducting sheet described in PTL 1 as an electrode sheet used in a touch panel using the projected capacitance type of the electrostatic capacitance technique.

As illustrated in FIG. 31, the conducting sheet described in PTL 1 is equipped with a first transparent substrate 312A having a first conducting part 316A in which multiple first transparent conducting patterns 318A are arranged in the X direction (row direction), and a second transparent substrate 312B having a second conducting part 316B in which multiple second transparent conducting patterns 318B are arranged in the Y direction (column direction), and is configured such that the first transparent substrate 312A and the second transparent substrate 312B are stacked.

FIG. 32(a) is a plan view illustrating an example pattern of the first conducting part 316A on the first transparent substrate 312A illustrated in FIG. 31, while FIG. 32(b) is a plan view illustrating an example pattern of the second conducting part 316B on the second transparent substrate 312B illustrated in FIG. 31.

As illustrated in FIG. 32(a), the first transparent conducting pattern 318A is configured such that multiple first large lattices 324A (X pattern electrodes) are connected in series in the X direction. Each first large lattice 324A is respectively made up of a combination of multiple small lattices 326, and at the perimeter of each edge of the first large lattices 324A, first auxiliary patterns 320A made up of multiple auxiliary lines 336A unconnected to the first large lattices 324A are formed.

Similarly, as illustrated in FIG. 32(b), the second transparent conducting pattern 318B is configured such that multiple second large lattices 324B are connected in series in a second direction. Each second large lattice 324B is respectively made up of a combination of multiple small lattices 326, and at the perimeter of each edge of the second large lattices 324B, second auxiliary patterns 320B made up of multiple auxiliary lines 336B unconnected to the second large lattices 324B are formed.

The second large lattices 324B are arranged to fill in the gaps of the first large lattices 324A when viewing the above conducting sheet from the normal direction thereof.

Also, although the shapes of the auxiliary lines differ, PTLs 2 to 5 also disclose conducting sheets very similar to PTL 1.

Additionally, FIGS. 33 and 34 are respective plan view illustrating a general configuration of the principal part of a conducting sheet used in a touch panel described in PTL 7.

Among the detecting column traces 431 of the touch panel in the conducting sheet described in FIG. 33, a pair of zigzag traces 431a/431b that are line-symmetric in the Y direction are arranged at a designated interval in the X direction, and placed so that neighboring traces become line-symmetric to each other with respect to the Y direction. Similarly, among the detecting row traces 441, a pair of zigzag traces 441a/441b that are line-symmetric in the X direction are arranged at a designated interval in the Y direction, and placed so that neighboring traces become line-symmetric to each other with respect to the X direction.

In these detecting column traces 431 and detecting row traces 441, a 45-degree angle is respectively obtained with respect to the X direction by each edge forming the zigzag, and the detecting column traces 431 and detecting row traces 441 are placed so as to be orthogonal at the midpoint of each edge forming the zigzag pattern.

In addition, in the multiple areas surrounded by the detecting column traces 431 and the detecting row traces 441, isolated traces 481a/481b are placed as dummy traces.

Also, the conducting sheet illustrated in FIG. 34 has a configuration in which branching traces 482a/482b are placed in the areas surrounded by the detecting column traces 431 and the detecting row traces 441 of a touch panel having a similar shape as FIG. 33.

Herein, the branching traces 482a are formed in the same layer as the detecting column traces 431, and both ends of the branching traces 482a are electrically connected to the detecting column traces 431. Similarly, the branching traces 482b are formed in the same layer as the detecting column traces 441, and both ends of the branching traces 482b are electrically connected to the detecting row traces 441. Also, the main portions of the branching traces 482a/482b are placed so that a 45-degree angle is obtained with respect to the Y direction or the X direction.

Additionally, PTL 7 discloses a conducting sheet not provided with the isolated traces 481a/481b or the branching traces 482a/482b illustrated in FIGS. 33 and 34, but provided with detecting traces that have a similar shape to the detecting column traces 431 and the detecting row traces 441.

CITATION LIST

Patent Literature

PTL 1: Japanese Unexamined Patent Application Publication No. 2011-237839 (2011 Nov. 24)

PTL 2: Japanese Unexamined Patent Application Publication No. 2011-175967 (2011 Sep. 8)
PTL 3: Japanese Unexamined Patent Application Publication No. 2011-175628 (2011 Sep. 8)
PTL 4: Japanese Unexamined Patent Application Publication No. 2011-129112 (2011 Jun. 30)
PTL 5: Japanese Unexamined Patent Application Publication No. 2010-262529 (2010 Nov. 18)
PTL 6: Japanese Unexamined Patent Application Publication No. 2010-61502 (2010 Mar. 18)
PTL 7: Japanese Unexamined Patent Application Publication No. 2010-97536 (2010 Apr. 30)

SUMMARY OF INVENTION

Technical Problem

Note that PTL 1 discloses that, in the case of placing the above conducting sheet on top of a liquid crystal display device as an electrode sheet for a touch panel, the arrangement of auxiliary traces 336A/336B formed between the first large lattices 324A and the second large lattices 324B that differs from the arrangement of the small lattices 326 may minimize interference with the pixel arrangement of the liquid crystal display device, and reduce the occurrence of moiré.

However, as illustrated in FIGS. 32(a) and 32(b), the first transparent conducting patterns 318A and the second transparent conducting patterns 318B described in PTL 1 are primarily formed by repetition of a large number of the small lattices 326.

In the conducting sheet described in PTL 1, although the first auxiliary patterns 320A and the second auxiliary patterns 320B are formed at the perimeter of the first large lattices 324A and the second large lattices 324B, the formation area of these first auxiliary patterns 320A and second auxiliary patterns 320B is extremely small compared to the formation area of the small lattices 326, and the small lattices 326 are dominantly formed.

For this reason, with the conducting sheet described in PTL 1, the small lattices 326 are near-continuously and repeatedly arranged when viewing the above conducting sheet from the normal direction thereof.

For this reason, in actual practice, the pixel arrangement of the liquid crystal display device and the small lattices 326 of the above conducting sheet interfere, and continuous, periodic moiré is produced. For this reason, display quality suffers significantly.

Additionally, although the shapes of the auxiliary lines differ, the conducting sheets described in PTLs 2 to 5 likewise have a problem similar to PTL 1, in that small lattices are near-continuously and repeatedly arranged when viewed from the normal direction.

Furthermore, the conducting sheets described in PTLs 6 and 7 likewise have a problem similar to PTL 1, in that small lattices are near-continuously and repeatedly arranged when viewed from the normal direction, as indicated by the double-dashed chain lines in FIGS. 33 and 34.

The present invention has been devised in light of the above problems, and an object thereof is to provide an electrode sheet for a touch panel, a touch panel, and a display device capable of reducing visibility and display quality degradation due to moiré over the related art.

Solution to Problem

In order to solve the above problems, an electrode sheet according to one mode of the present invention is an electrode sheet for a touch panel, comprising: (1) a first pattern electrode part in which first pattern electrode lines of first pattern electrodes multiply connected in a first direction are multiply arranged in a second direction orthogonal to the first direction; and (2) a second pattern electrode part in which second pattern electrode lines of second pattern electrodes multiply connected in the second direction are multiply arranged in the first direction. In the first and second pattern electrode parts, the second pattern electrode lines are provided between the first pattern electrode lines when viewed from a direction perpendicular to these pattern electrode parts. The first and second pattern electrodes each internally include an electrode pattern periodically formed by traces. Multiple different electrode patterns are alternately arranged in a direction from among the first direction, the second direction, and a direction intersecting the first direction and the second direction when viewed from a direction perpendicular to the first and second electrode parts.

According to the above configuration, in the case of using a display device overlaid with a touch panel using the above electrode sheet, for example, even if the first pattern electrodes and the second pattern electrodes interfere with pixels in the display device, the moiré fringes produced by interference between the first pattern electrodes and the pixels, and the moiré fringes produced by interference between the second pattern and the pixels, have respectively different periods and periodic directions of the moiré fringes.

For this reason, according to the above configuration, by alternately arranging multiple different electrode patterns in a direction from among the first direction, the second direction, and a direction intersecting the first direction and the second direction when viewed from a direction perpendicular to the first and second electrode parts, continuous moiré fringes are not produced, and moiré fringes are not readily perceived.

Consequently, by using the above electrode sheet as an electrode sheet for a touch panel, the degradation of visibility and display quality due to moiré may be reduced compared to the related art. For this reason, a touch panel with better visibility and display quality than the related art, as well as display device, may be realized.

In addition, a touch panel according to one mode of the present invention is equipped with the above electrode sheet according to the present invention.

By equipping the touch panel with the electrode sheet, moiré fringes become more difficult to perceive, and the degradation of visibility and display quality due to moiré may be reduced compared to the related art.

In addition, a display device according to one mode of the present invention is equipped with the touch panel according to the present invention.

By equipping the display device with the touch panel, moiré fringes become more difficult to perceive, and the degradation of visibility and display quality due to moiré may be reduced compared to the related art.

Advantageous Effects of Invention

In an electrode sheet for a touch panel, a touch panel, and a display device of the present invention, by alternately arranging multiple different electrode patterns in a direction from among the first direction, the second direction, and a direction intersecting the first direction and the second direction when viewed from a direction perpendicular to the first and second electrode parts, continuous moiré fringes are not produced, and moiré fringes are not readily perceived.

For this reason, according to the above configuration, it is possible to provide an electrode sheet for a touch panel, a touch panel, and a display device capable of reducing moiré visibility and display quality degradation compared to the related art.

BRIEF DESCRIPTION OF DRAWINGS

21(b) is a plan view illustrating a pattern shape of an X pattern electrode part when viewed from a direction perpendicular to the above electrode sheet.

FIG. 27(c) is a plan view illustrating an internal pattern arrangement in the X pattern electrodes and the Y pattern electrodes illustrated in FIGS. 27(a) and 27(b).

DESCRIPTION OF EMBODIMENTS

Hereinafter, embodiments of the present invention will be described in detail.

Embodiment 1

An embodiment according to the present invention is described as follows on the basis of FIGS. 1(a) to 1(c) through FIG. 9.

Figure 3:
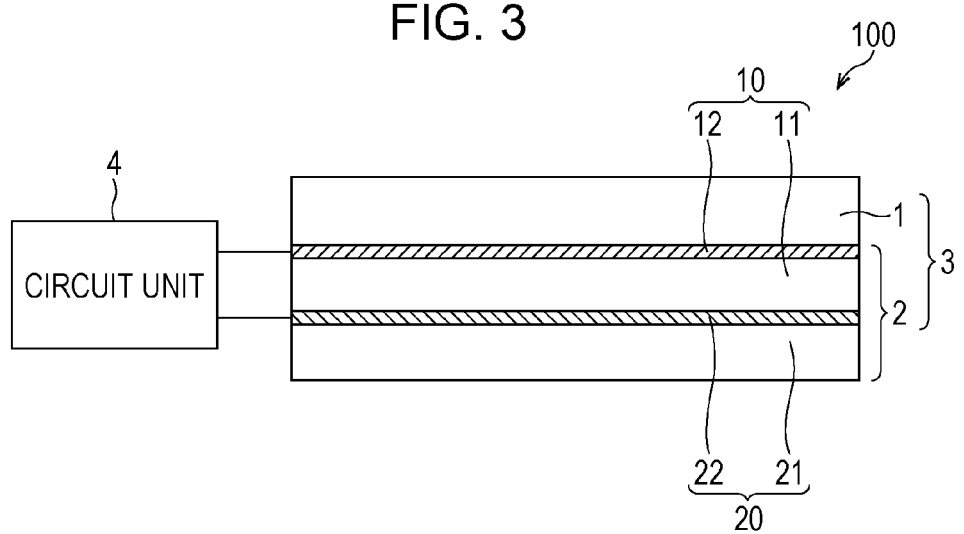
FIG. 3 is a cross-section diagram illustrating a general configuration of a touch panel according to Embodiment 1 of the present invention.
Figure 4:
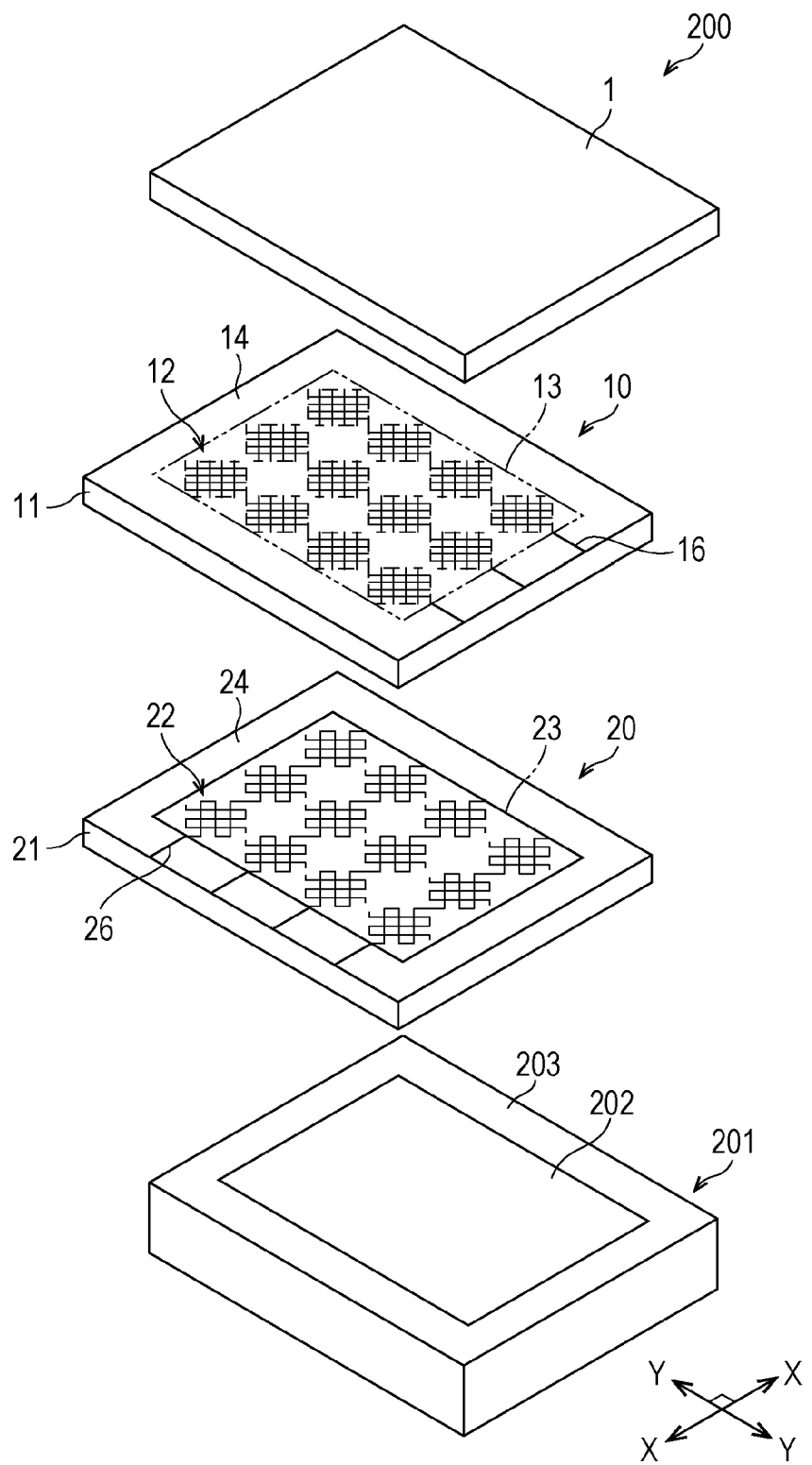
FIG. 4 is an exploded perspective view illustrating a general configuration of a display device equipped with a touch panel according to Embodiment 1 of the present invention.

FIG. 3 is a cross-section diagram illustrating a general configuration of a touch panel 100 according to the present embodiment, while FIG. 4 is an exploded perspective view illustrating a general configuration of a display device 200 equipped with a touch panel 100 as an example of electronic equipment according to the present embodiment.

<General Configuration of Touch Panel 100 and Display Device 200>

A touch panel 100 according to the present embodiment is a touch panel using the projected capacitance type of the electrostatic capacitance technique, and as illustrated in FIG. 3, is equipped with a sensor body 3 made up of a protective layer 1 and a transparent electrode sheet 2 (conducting sheet), and a circuit unit 4 made up of an integrated circuit (IC) chip or the like.

Also, a display device 200 according to the present embodiment has a configuration in which the touch panel 100 is provided on top of a display panel 201, as illustrated in FIG. 4.

Note that the above display panel 201 and the display device 200 are not particularly limited, and a liquid crystal panel and liquid crystal display device may be used therefor, for example. Additionally, the display device 200 may also be equipped with a backlight (not illustrated).

<General Configuration of Sensor Body 3>

As illustrated in FIG. 3, the sensor body 3 has a configuration in which a protective layer 1 that protects the touch panel surface (in other words, the touch surface) is pasted onto the electrode sheet 2 with an adhesive layer (not illustrated).

<General Configuration of Electrode Sheet 2>

An electrode sheet 2 according to the present embodiment is equipped with two transparent electrode films 10/20 (transparent conducting films), as illustrated in FIG. 3, for example. These transparent electrode films 10/20 are pasted together with an adhesive layer (not illustrated), for example.

The transparent electrode film 10 (first transparent electrode film) has a configuration in which an X pattern electrode layer (first pattern electrode layer) constituting an X pattern electrode part 12 is provided on top of a transparent film substrate 11 (first substrate).

The transparent conducting film 20 (first transparent electrode film) has a configuration in which a Y pattern electrode layer (second pattern electrode layer) constituting a Y pattern electrode part 22 is provided on top of a transparent film substrate 21 (second substrate).

As illustrated in FIG. 4, in a planar view (in other words, when viewed from a direction perpendicular to electrode formation face which is the primary face in the transparent electrode films 10/20), the transparent electrode films 10/20 are respectively equipped with sensor parts 13/23 placed in an area corresponding to the display screen 202 of the display panel 201, and terminal line parts 14/24 placed in an area corresponding to a bezel area 203 of the display panel 201.

As illustrated in FIG. 4, in the transparent electrode film 10, the X pattern electrode part 12 is formed in the portion corresponding to the sensor part 13, and lead lines 16 leading from the X pattern electrode part 12 are formed in the terminal line part 14.

In addition, in the transparent conducting film 20, the Y pattern electrode part 22 is formed in the portion corresponding to the sensor part 23, and lead lines 26 leading from the Y pattern electrode part 22 are formed in the terminal line part 24.

The lead lines 16/26 are position-detecting electrodes, and are detection lines for leading detection signals from the X pattern electrodes 18 and the Y pattern electrodes 28 discussed later.

Note that the lead lines 16 lead out from each X electrode 17 discussed later in the X pattern electrode part 12. Also, the lead lines 26 lead out from each Y electrode 27 discussed later in the Y pattern electrode part 22.

<Pattern Shape of X Pattern Electrode Part 12 and Y Pattern Electrode Part 22>

Figure 1:
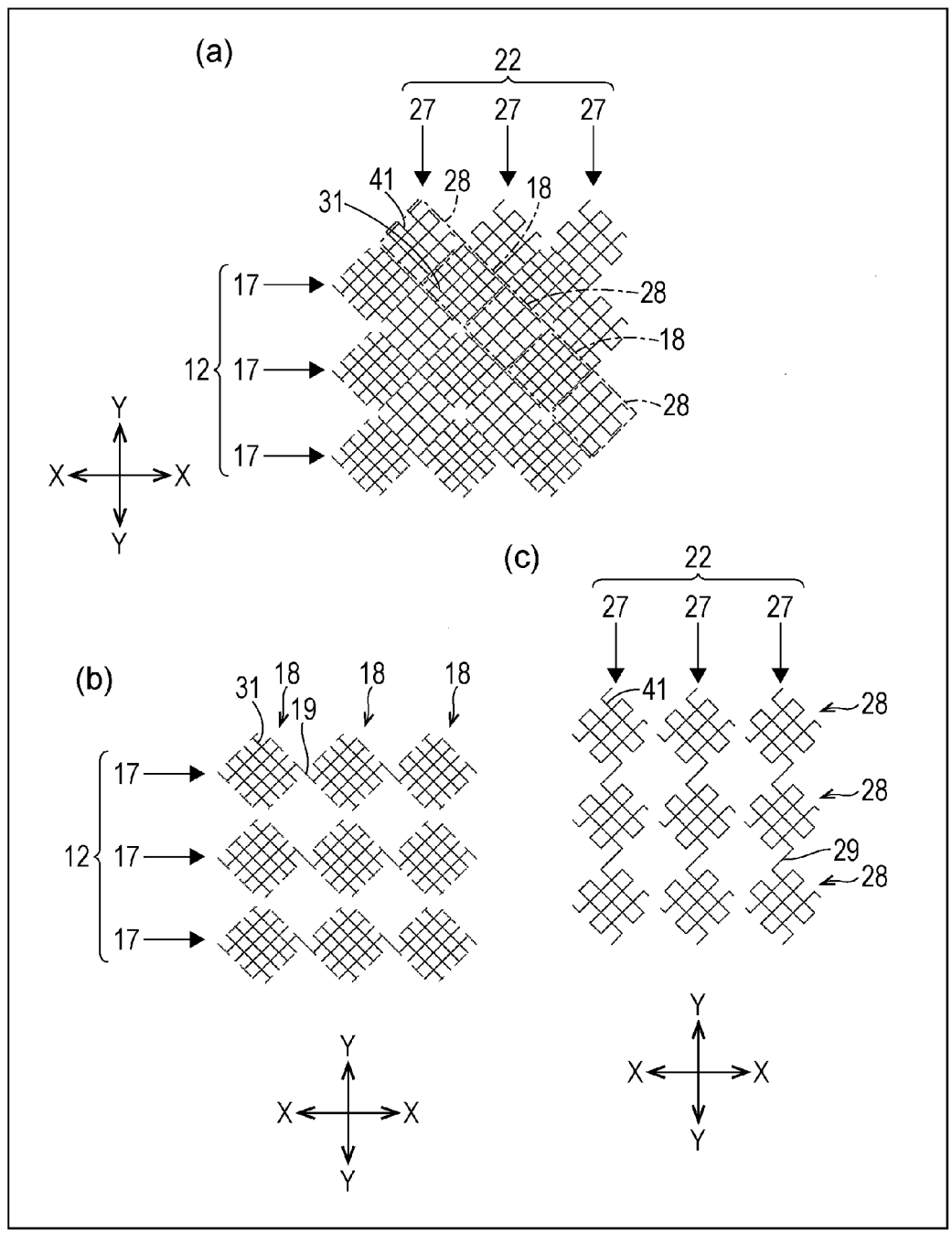
FIG. 1(a) is a plan view illustrating a pattern shape of an X pattern electrode part and a Y pattern electrode part when viewed from a direction perpendicular to an electrode sheet according to Embodiment 1 of the present invention.
FIG. 1(b) is a plan view illustrating a pattern shape of an X pattern electrode part when viewed from a direction perpendicular to the above electrode sheet.
FIG. 1(c) is a plan view illustrating a pattern shape of a Y pattern electrode part when viewed from a direction perpendicular to the above electrode sheet.

FIG. 1(*a*) is a plan view illustrating a pattern shape of the X pattern electrode part 12 and the Y pattern electrode part 22 when viewed from a direction perpendicular to the electrode sheet 2, FIG. 1(*b*) is a plan view illustrating a pattern shape of the X pattern electrode part 12 when viewed from a direction perpendicular to the electrode sheet 2, and FIG. 1(*c*) is a plan view illustrating a pattern shape of the Y pattern electrode part 22 when viewed from a direction perpendicular to the electrode sheet 2.

As illustrated in FIG. 1(*b*), in the X pattern electrode part 12 (X pattern electrode layer), X electrodes 17 extending in the X direction (that is, the X-axis direction which is the row direction (first direction)) are formed by X pattern electrode groups multiply arranged in the Y direction orthogonal to the X direction (that is, the Y-axis direction which is the column direction (second direction)).

In the X electrodes 17, approximately square X pattern electrodes 18 (first pattern electrodes), which are island electrodes constituting the X electrodes 17, are X pattern electrode lines (first pattern electrode lines) multiply connected in the X direction by connecting parts 19 at the corner parts of the X pattern electrodes 18.

Consequently, the X pattern electrode part 12 is equipped with multiple X pattern electrode line groups (first pattern electrode line groups).

The X pattern electrodes 18 are made up of a first base pattern, and the X electrodes 17 are repetitions of the X pattern electrodes 18. Consequently, the X electrodes 17 have a shape of a repeating first base pattern, and the X pattern electrode part 12 has a shape in which the first base pattern is arranged in a lattice.

Similarly, as illustrated in FIG. 1(*c*), in the Y pattern electrode part 22 (Y pattern electrode layer), Y electrodes 27 extending in the Y direction are formed by Y electrode groups multiply arranged in the X direction.

In the Y electrodes 27, approximately square Y pattern electrodes 28 (second pattern electrodes), which are island electrodes constituting the Y electrodes 27, are Y pattern electrode lines (second pattern electrode lines) multiply connected in the Y direction by connecting parts 29 at the corner parts of the Y pattern electrodes.

Consequently, the Y pattern electrode part 22 is equipped with multiple Y pattern electrode line groups (second pattern electrode line groups).

The Y pattern electrodes 28 are made up of a second base pattern, and the Y electrodes 27 are repetitions of the Y pattern electrodes 28. Consequently, the Y electrodes 27 have a shape of a repeating second base pattern, and the Y pattern electrode part 22 has a shape in which the second base pattern is arranged in a lattice.

Consequently, the X pattern electrodes 18 made up of the first base pattern and the Y pattern electrodes 28 made up of the second base pattern are alternately placed in a checkerboard pattern in a planar view when viewed from a diagonal direction.

In addition, the X pattern electrodes 18 internally include an electrode pattern periodically formed by traces 31. Similarly, the Y pattern electrodes 28 internally include an electrode pattern periodically formed by traces 41.

The X pattern electrodes 18 and the Y pattern electrodes 28 are position-detecting electrodes that detect the position of the specified coordinates of an object to be detected, such as a finger, according to changes in electrostatic capacitance.

Respective driving voltages are applied to the X pattern electrodes 18 and the Y pattern electrodes 28 from a driving circuit (not illustrated). One of the X pattern electrodes 18 and the Y pattern electrodes 28 are used as drive electrodes, while the other are used as sense electrodes.

Figure 2:
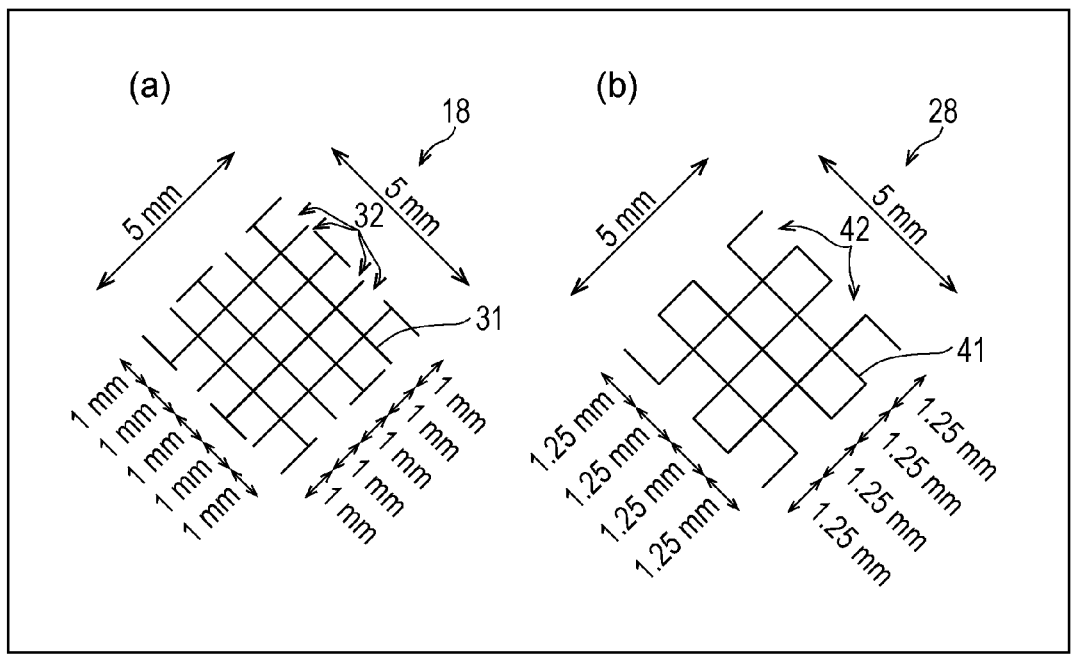
FIG. 2(a) is a plan view illustrating a pattern shape of X pattern electrodes according to Embodiment 1 of the present invention.
FIG. 2(b) is a plan view illustrating a pattern shape of Y pattern electrodes according to Embodiment 1 of the present invention.

FIG. 2(*a*) is a plan view illustrating a pattern shape of the X pattern electrodes 18, while FIG. 2(*b*) is a plan view illustrating a pattern view of the Y pattern electrodes 28.

In the present embodiment, as illustrated in FIGS. 1(*b*) and 2(*a*), a lattice pattern (small lattices) or a portion thereof is included as a first internal pattern inside the first base pattern.

The first internal pattern is formed so as to divide the first base pattern into multiple small lattices. The respective edges of the first internal pattern (small lattices) are parallel to the respective edges of the first base pattern, and are tilted 45 degrees with respect to the X direction and the Y direction, respectively.

Similarly, as illustrated in FIG. 1(*c*) and FIG. 2(*b*), a lattice pattern (small lattices) or a portion thereof is included as a second internal pattern inside the second base pattern.

The second internal pattern is formed so as to divide the second base pattern into multiple small lattices. The respective edges of the second internal pattern (small lattices) are parallel to the respective edges of the second base pattern, and are tilted 45 degrees with respect to the X direction and the Y direction, respectively.

In the present embodiment, the first base pattern and the second base pattern respectively have a square outer shape.

Note that herein, the outer shape refers to a shape obtained by joining the outermost traces in each pattern with straight lines. Also, as illustrated in FIG. 1(*a*), when the X pattern electrode layer (X pattern electrode part 12) and the Y pattern electrode layer (Y pattern electrode part 22) are overlaid, in the case in which the X pattern electrodes 18 and the Y pattern electrodes 28 are placed adjacent without gaps in a planar view, the outer shape may also refer to the shape defined by the boundaries between the X pattern electrodes 18 and the Y pattern electrodes 28.

As illustrated in FIGS. 2(*a*) and 2(*b*), the outer shapes of the first base pattern and the second base pattern are respectively square with a 5 mm edge.

Also, the first internal pattern is a square lattice with a 1 mm edge, or alternatively, a portion of a lattice whose outer shape becomes a square with a 1 mm edge in a planar view when the X pattern electrode layer (X pattern electrode part 12) and the Y pattern electrode layer (Y pattern electrode part 22) are overlaid.

In other words, each small lattice constituting the first base pattern is a square lattice with a 1 mm edge. Consequently, the first base pattern is equipped with a conducting pattern having a periodic structure with a period (trace interval) of 1 mm.

Meanwhile, the second internal pattern is a square lattice with a 1.25 mm edge, or alternatively, a portion of a lattice whose outer shape becomes a square with a 1.25 mm edge in a planar view when the X pattern electrode layer (X pattern electrode part 12) and the Y pattern electrode layer (Y pattern electrode part 22) are overlaid. In other words, each small lattice constituting the second base pattern is a square lattice with a 1.25 mm edge. Consequently, the second base pattern is equipped with a conducting pattern having a periodic structure with a period (trace interval) of 1.25 mm.

Note that herein, these respective edge lengths are taken to indicate the pitch (the distance between the center of a trace and the center of a trace neighboring that trace) between the traces 31 or the traces 41 constituting these patterns, and all of these traces 31/41 are taken to have a fixed line width. Note that herein, the line width of each of the traces 31/41 is 10 µm, respectively.

In this way, the small lattices in the first internal pattern and the small lattices in the second internal pattern described above have respectively different lattice sizes, and the trace intervals in the arrangement direction of the traces 31/41 that form each internal pattern, or in other words the intervals (periods) in the periodic direction of each periodic structured formed by the above traces 31/41, differ from each other.

Also, the first base pattern and the second base pattern have perimeter parts formed in alternating broken line shapes so that the respective perimeter parts do not overlap in a planar view when the X pattern electrode part 12 (X pattern electrode layer) and the Y pattern electrode part 22 (Y pattern electrode layer) are layered via the transparent film substrate 11 that acts as an insulating layer.

For this reason, the perimeter part of the first base pattern has trace cutaway parts 32 (trace non-formation parts) not provided with the traces 31.

Also, the perimeter part of the second base pattern has trace cutaway parts 42 (trace non-formation parts) not provided with the traces 41.

For this reason, in the above X electrodes 17 and Y electrodes 27, overlapping traces do not exist in a planar view, except for the connecting parts 19/29 (connection points).

For this reason, in the above electrode sheet 2, in a planar view, there does not occur the problem of the outermost (most peripheral) traces 31/41 in the X pattern electrodes 18 and the Y pattern electrodes 28 overlapping or being adjacently placed along the directions in which the traces 31/41 extend, thereby causing the apparent width of the traces to become larger (that is, become thicker lines) in a planar view, and consequently causing the positions of X pattern electrodes 18 and the Y pattern electrodes 28 to become noticeable and lower visibility and display quality.

In addition, according to the present embodiment, as discussed above, in the first internal pattern and the second internal pattern, the sizes of the small lattices are different. For this reason, in the first internal pattern and the second internal pattern, the periods differs as discussed earlier, and the shapes of the respective internal patterns differ between the X pattern electrodes 18 and the Y pattern electrodes 28.

For this reason, as discussed above, in an electrode sheet 2 in which an X pattern electrode part 12 and a Y pattern electrode part 22 are layered, as indicated by the double-dashed chain lines in FIG. 1(*a*), the X pattern electrodes 18 and the Y pattern electrodes 28 having square small lattices of mutually different sizes become arranged so as to alternately repeat in a diagonal direction (in other words, a direction intersecting the X direction and the Y direction) as multiple different electrode patterns in a planar view.

Figure 5:
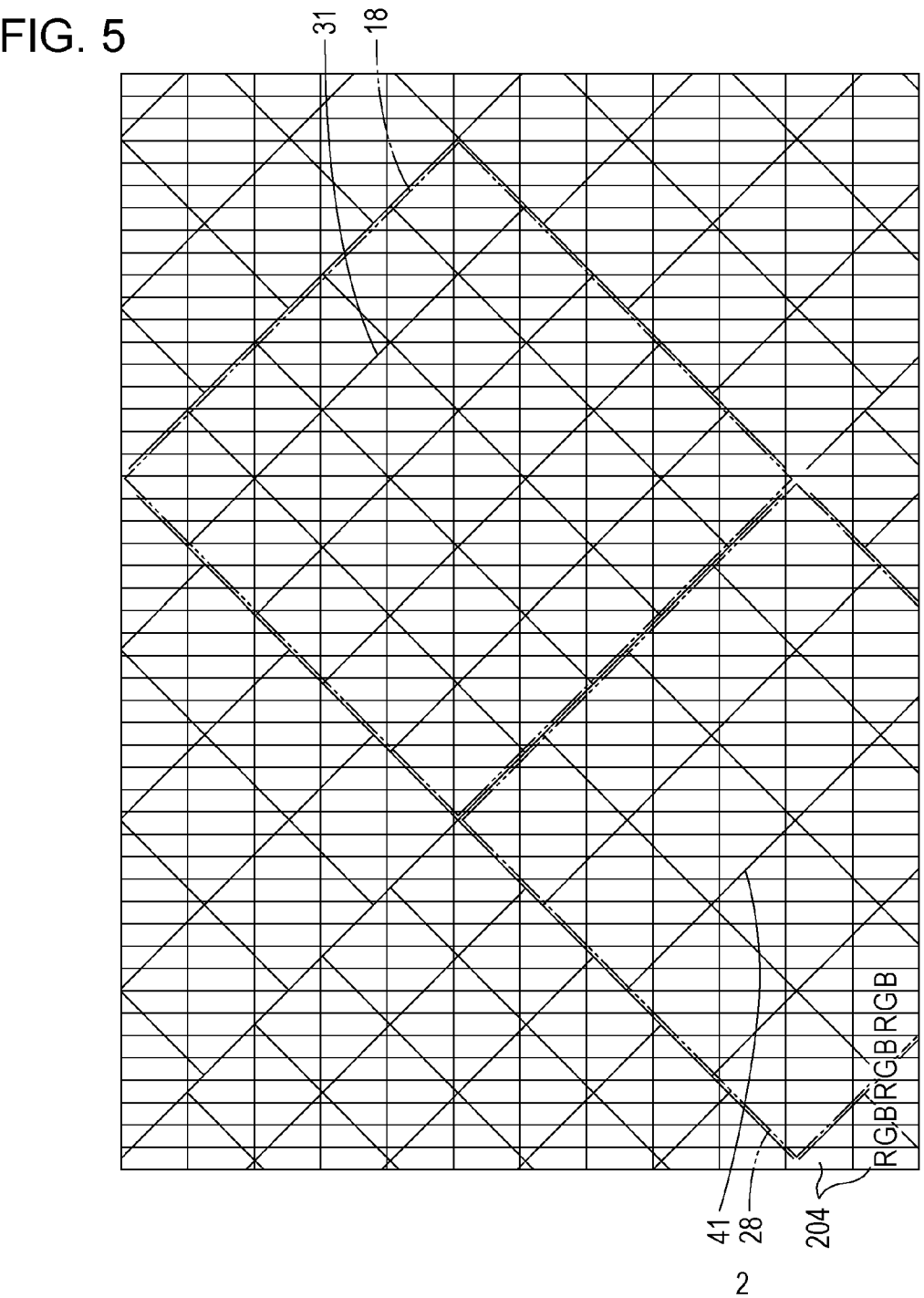
FIG. 5 is a plan view schematically illustrating the relationship between respective pixels of a display panel, and X pattern electrodes and Y pattern electrodes according to Embodiment 1 of the present invention.

Herein, FIG. 5 illustrates the relationship between respective pixels 204 of the display panel 201, and the X pattern electrodes 18 and the Y pattern electrodes 28. Note that FIG. 5 illustrates as an example the case of using a 60" full HD liquid crystal panel as the display panel 201, in which pixels 204 of each of the colors R (red), G (green), and B (blue) are formed with a pixel pitch of 0.69225 mm×0.23075 mm.

As illustrated in FIG. 5, the periodic directions of the pixels 204 of the display panel 201 are the X direction and the Y direction. Consequently, the periodic directions of the small lattices in the X pattern electrodes 18 and the Y pattern electrodes 28 described above (in other words, the arrangement directions of the traces 31/41 parallel to each edge of the X pattern electrodes 18 and the Y pattern electrodes 28) are tilted 45 degrees with respect to the periodic directions of the pixels 204 of the display panel 201, and have different periods.

Consequently, even if the X pattern electrodes 18 and the Y pattern electrodes 28 interfere with the pixels 204 of the display panel 201, the moiré fringes produced by interference between the X pattern electrodes 18 and the pixels 204, and the moiré fringes produced by interference between the Y pattern electrodes 28 and the pixels 204, have respectively different periods and periodic directions of the moiré fringes. For this reason, continuous moiré fringes are not produced, and the moiré fringes are not readily perceived.

For this reason, by using the above electrode sheet 2 as an electrode sheet for a touch panel, it is possible to realize a touch panel 100 and a display device 200 with excellent visibility and display quality.

<Method of Using Electrode Sheet 2>

In the case of using the above electrode sheet 2 in a touch panel 100, a protective layer 1 is formed by being pasted on top of the electrode sheet 2 described above with an adhesive layer (not illustrated) or the like, as discussed earlier. Additionally, each of the lead lines 16 leading out from the X pattern electrode part 12, and each of the lead lines 26 leading out from the Y pattern electrode part 22, are connected to the circuit unit 4 discussed earlier.

One of the X pattern electrodes 18 and the Y pattern electrodes 28 are used as drive electrodes, while the other are used as sense electrodes, as discussed earlier.

When a driving voltage is applied to these X pattern electrodes 18 and Y pattern electrodes 28, capacitance is formed between these X pattern electrodes 18 and Y pattern electrodes 28.

If fingertip, which is a conducting member, is made to contact the surface of the protective layer 1 as an object to be detected while in such a state, the capacitance between the X pattern electrodes 18 and the Y pattern electrodes 28 changes.

In other words, if a fingertip is made to contact the surface of the protective layer 1, respective capacitances are formed between the body (fingertip) and the X pattern electrodes 18 or Y pattern electrodes 28, thereby grounding some of the electrical lines of force via the fingertip. This indicates that the capacitance between the X pattern electrodes 18 and the Y pattern electrodes 28 in the portion contacted by the fingertip has greatly changed, and by detecting this, it is possible to detect the position contacted by the fingertip.

In other words, the Y coordinate of the fingertip on the surface of the protective layer 1 (in other words, the surface of the touch panel 100) is detected by the X pattern electrodes 18 constituting the X electrodes 17 extending in the X direction and arranged in the Y direction. Also, the X coordinate of the fingertip on the surface of the protective layer 1 is detected by the Y pattern electrodes 28 constituting the Y electrodes 27 extending in the Y direction and arranged in the X direction.

<Circuit Unit 4>

In the circuit unit 4, an IC chip, flexible printed circuit (FPC) board, or the like is used, for example.

The circuit unit 4 is equipped with a position-detecting circuit or the like (not illustrated) for detecting the coordinate position of an object to be detected.

The position-detecting circuit detects the magnitude of change in the capacitance between the X pattern electrodes 18 and the Y pattern electrodes 28 described above, and computes the position of the fingertip on the basis of this magnitude of change. Note that this computation is conducted between each of the X pattern electrodes 18 and the Y pattern electrodes 28. Consequently, even if two or more fingertips make contact at the same time, the position of each fingertip may be detected.

Note that for the above position-detecting circuit, an established circuit may be used, such as a position-detecting circuit using the mutual capacitance technique which is prevalent among capacitive touch panels, but the position-detecting circuit is not particularly limited.

<Method of Forming Each Layer>

Next, a method of forming each layer in the touch panel 100 will be described.

<Protective Layer 1>

The protective layer 1 may be, for example, a plastic film or plastic board made of a transparent resin such as polyethylene terephthalate (PET), polycarbonate (PC), or polymethyl methacrylate (PMMA), or a glass board.

The protective layer 1 may be layered on top of the electrode sheet 2 by, for example, (1) pasting the plastic film, plastic board, glass board, or the like onto the electrode sheet 2 via an adhesive layer (not illustrated), (2) laminating the above plastic film onto the electrode sheet 2, or (3) applying the material of the above protective layer 1 onto the electrode sheet 2.

In other words, the protective layer 1 may be integrated with the electrode sheet 2 by pasting via an adhesive layer, or integrated with the electrode sheet 2 by being directly layered on top of the electrode sheet 2. Stated differently, in an electrode sheet 2 according to the present embodiment, the electrode sheet 2 itself may also include the protective layer 1 on the surface thereof.

Note that the thickness of the protective layer 1 is not particularly limited, and may be configured similarly to a protective layer (protective plate, protective sheet) being used in a touch panel of the related art.

<Electrode Sheet 2>

The electrode sheet 2 may be fabricated by, for example, respectively fabricating transparent electrode films 10/20 having X pattern electrodes 18 and Y pattern electrodes 28 with desired electrode patterns formed on top of the transparent film substrates 11/21, and aligning these transparent electrode films 10/20 so that the X pattern electrodes 18 and the Y pattern electrodes 28 do not contact (electrically conduct with) each other.

Also, the X pattern electrodes 18 and the Y pattern electrodes 28 may be formed by (1) after pasting metallic foil onto the transparent film substrates 11/21, etching this pasted metallic foil with established lithography technology, (2) sputtering metal onto the transparent film substrates 11/21, or (3) printing metal paste onto the transparent film substrates 11/21.

The above transparent film substrates 11/21 may be, for example, an insulating film made of a transparent resin such as polyethylene terephthalate (PET), polycarbonate (PC), or polymethyl methacrylate (PMMA).

Also, the above metallic foil may be copper foil or the like, for example. Also, the above sputter material may be silver or the like, for example. The metal paste may be a silver paste or the like that includes silver as metal particles, for example.

These X pattern electrodes 18 and Y pattern electrodes 28 may be non-transparent electrodes, but are preferably transparent electrodes.

In the case of forming transparent electrodes as the X pattern electrodes 18 and the Y pattern electrodes 28, a transparent conducting material such as an oxide, for example, may be used as the electrode material.

The above transparent conducting material may be, for example, indium tin oxide (ITO), indium zinc oxide (IZO), zinc oxide, or tin oxide.

In addition, the above X pattern electrodes 18 and Y pattern electrodes 28 may also be metal thin-film electrodes such as graphene, or alternatively, transparent electrodes having a transparent state when made into a thin film, such as thin-film carbon electrodes.

Note that since transmittance and the power consumption of a backlight (not illustrated) in the display device 200 exist in a trade-off relationship, it is necessary to design the traces 31/41 in the X pattern electrodes 18 and the Y pattern electrodes 28 with consideration for the transmittance.

For this reason, the thickness of the X pattern electrode part 12 and the Y pattern electrode part 22 (the layer thickness of each electrode layer) may be appropriately decided according to the electrode material so as to obtain desired physical properties, and is not particularly limited. The thickness of the X pattern electrode part 12 and the Y pattern electrode part 22 may be set similarly to the layer thickness of the respective trace layers (electrode layers) in an electrode sheet being used in a touch panel of the related art, for example.

Additionally, the line widths of the traces 31/41 in the X pattern electrodes 18 and the Y pattern electrodes 28 is also not particularly limited, and may be set similarly to the line widths of traces constituting each detecting electrode in an electrode sheet being used in a touch panel of the related art, for example.

Note that in the case in which the respective traces 31/41 in the X pattern electrodes 18 and the Y pattern electrodes 28 are non-transparent metal traces, for example, if the line widths of the traces 31/41 in the X pattern electrodes 18 and the Y pattern electrodes 28 become too large, the traces 31/41 will be noticeable, and visibility and display quality will be lowered.

For this reason, the line widths of the traces 31/41 in the X pattern electrodes 18 and the Y pattern electrodes 28, particularly the line widths of the traces 31/41 in the X pattern electrodes 18 and the Y pattern electrodes 28 in the case in which the traces 31/41 in the X pattern electrodes 18 and the Y pattern electrodes 28 are non-transparent traces such as metal traces, are preferably less than or equal to 50 μm, and more preferably less than or equal to 20 μm, for example.

Also, in the area corresponding to the display screen 202 of the display panel 201 in a planar view (that is, the sensor parts 13/23 when the X pattern electrode layer and the Y pattern electrode layer are in a layered state), the proportion (aperture ratio) of the entire area occupied by the transparent part excluding the conducting part (the traces 31/41) is preferably 85% or greater from the perspective of visible light transmittance, more preferably 90% or greater, and in particular, preferably 95% or greater.

Consequently, the line widths of the traces 31/41 as well as the number of traces 31/41 in each of the X pattern electrodes 18 and each of the Y pattern electrodes 28 (in other words, the number of small lattices formed by these traces 31/41) are preferably decided so that the above aperture ratio may be achieved.

Note that the line width of the traces 31 and the line width of the traces 41 may be the same or different.

Also, the thickness of the transparent film substrates 11/21 is not particularly limited insofar as enough insulation may be ensured so that the X pattern electrode part 12 and the Y pattern electrode part 22 are not electrically coupled. The thickness of the transparent film substrates 11/21 may be set similar to an electrode 2 (conducting sheet) being used in a touch panel of the related art, for example.

<Exemplary Modification of Pattern Shape of X Pattern Electrodes 18 and Y Pattern Electrodes 28>

Note that in the present embodiment, as discussed above, the first and the second base pattern, as well as each of the small lattices that form the first and second internal patterns, all have a square shape (outer shape). However, the shapes of these patterns are not particularly limited thereto. For example, the first and the second base patterns, as well as each of the small lattices that form the first and the second internal patterns, may also each have an oblong shape, or have a polygonal shape other than a rectangular shape.

However, it is desirable that the shapes of these patterns, and particularly, the shapes of the first and the second base patterns, are shapes that become closely packed when the X pattern electrode part 12 (X pattern electrode layer) and the Y pattern electrode part 22 (Y pattern electrode layer) are layered as discussed earlier. In other words, a contiguous (interlocking) shape with no gaps between the X pattern electrodes 18 and the Y pattern electrodes 28 in a planar view is desirable.

Also, in the first and the second internal patterns, internal patterns of three or more types of differently shaped lattices may be respectively formed.

Additionally, in the present embodiment, the first base pattern and the second base pattern are taken to be squares with a 5 mm edge, the small lattices constituting the first base pattern (first internal pattern) are taken to be square lattices with a 1 mm edge, and the small lattices constituting the second base pattern (second internal pattern) are taken to be square lattices with a 1.25 mm edge, as described earlier.

However, the sizes of the respective edges of these base patterns and internal patterns as well as the number of small lattices constituting the first and the second base patterns are not particularly limited, and may be suitably set according to factors such as the size and resolution of the touch panel 100, insofar as the periods of the first internal pattern and the second internal period are set to differ in a planar view in one of the directions from among the X direction, the Y direction, and the diagonal directions intersecting the X direction and the Y direction.

Exemplary Modification 1 of Electrode Layer Placement

Figure 6:
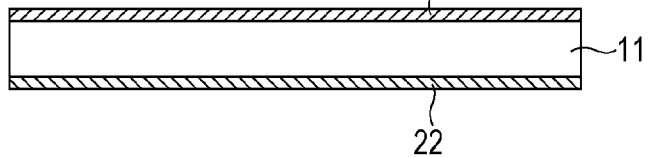
FIG. 6 is a cross-section diagram illustrating a general configuration of another electrode sheet according to Embodiment 1 of the present invention.

FIG. 6 is a cross-section diagram illustrating a general configuration of another electrode sheet 2 according to the present embodiment.

FIGS. 3 and 4 illustrate as an example a case in which the electrode sheet 2 is formed by layering a transparent electrode film 10 provided with an X pattern electrode layer (X pattern electrode part 12) on top of a transparent film substrate 11, and a transparent electrode film 20 provided with a Y pattern electrode layer (Y pattern electrode part 22) on top of a transparent film substrate 21.

However, the present embodiment is not limited thereto. For example, as illustrated in FIG. 6, the X pattern electrode layer (X pattern electrode part 129 may be formed on one major face of the transparent film substrate 11 (for example, the front face), while the Y pattern electrode layer (Y pattern electrode part 22) may be formed on another major face of the transparent film substrate 11 (for example, the rear face).

In addition, as long as insulation is ensured between the X pattern electrode part 12 and the Y pattern electrode part 22, another layer, or in other words a layer other than a substrate (for example, the transparent film substrate 11) may also be interposed between the X pattern electrode layer (X pattern electrode part 12) and the Y pattern electrode layer (Y pattern electrode part 22).

Exemplary Modification 2 of Electrode Layer Placement

Figure 7:
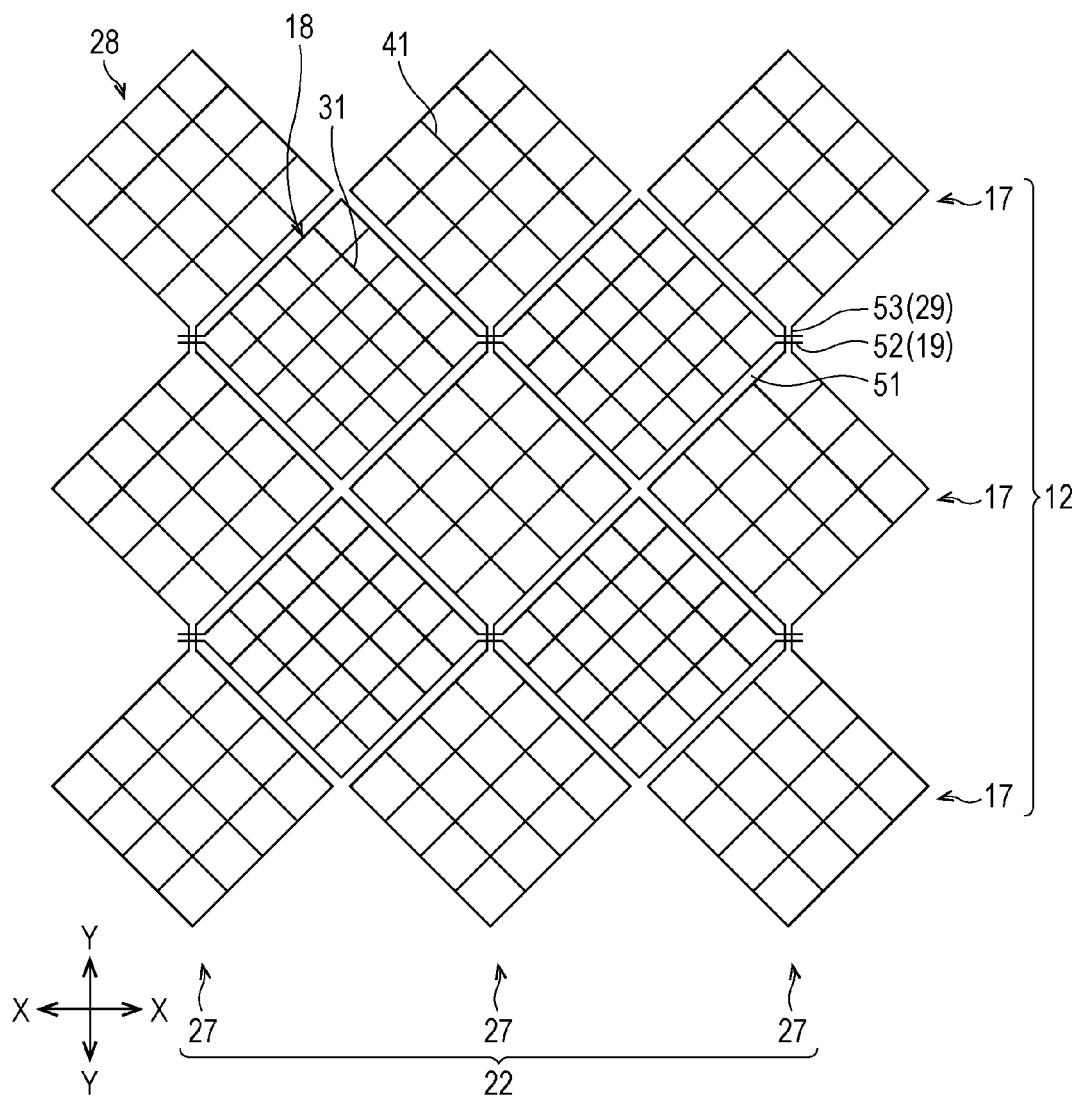
FIG. 7 is a plan view illustrating another pattern shape of an X pattern electrode part and a Y pattern electrode part when viewed from a direction perpendicular to an electrode sheet according to Embodiment 1 of the present invention.

FIG. 7 is a plan view illustrating another pattern shape of the X pattern electrode part 12 and the Y pattern electrode part 22 when viewed from a direction perpendicular to the electrode sheet 2.

FIGS. 3, 4, and 6 illustrate as an example a case in which the X pattern electrode part 12 and the Y pattern electrode part 22 are provided in different planes with transparent film substrate 11 that acts as an insulating layer sandwiched in between.

However, the present embodiment is not limited thereto, and the X pattern electrode part 12 and the Y pattern electrode part 22 may also be formed on the same plane, such as on the same face of the transparent film substrate 11, for example.

FIG. 7 illustrates as an example a case in which gaps 51 are provided between the X pattern electrodes 18 and the Y pattern electrodes 28, and provided that the connecting parts 19 between the X pattern electrodes 18 are connecting traces 52 and the connecting parts 29 between the Y pattern electrodes 28 are connecting traces 53, the X pattern electrodes 18 are connected to each other and the Y pattern electrodes 28 are connected to each other by the respective connecting traces 52/53, while in addition, the above connecting traces 53 are made to be jumpers.

In this way, by making bridge connections between electrodes of one of the X pattern electrodes 18 and the Y pattern electrodes 28 with jumpers so as to straddle in a direction intersecting the arrangement direction of the other electrodes, it is possible to form the X pattern electrode part 12 and the Y pattern electrode part 22 on the same plane without the X pattern electrodes 18 and the Y pattern electrodes 28 being electrically coupled.

Note that in this case, an insulating layer is preferably provided between the connecting traces 52 and the connecting traces 53 (that is, between the connecting traces 52 and the connecting traces 53 at the part where the connecting traces 52 and the connecting traces 53 intersect in a planar view).

In addition, an insulating layer may or may not be provided in the above gaps 51. Also, depending on the material or formation method of the protective layer 1, the protective layer 1 may also be formed so as to cover the gaps 51 described above.

Note that the size of the gaps 51 (that is, the electrode-to-electrode distance between the X pattern electrodes 18 and the Y pattern electrodes 28) is not particularly limited insofar as insulation between the X pattern electrodes 18 and the Y pattern electrodes 28 may be ensured.

Furthermore, similarly to Embodiment 1, it is desirable that the respective perimeter parts of the X pattern electrodes 18 (X pattern electrode part 12) and the Y pattern electrodes 28 (Y pattern electrode part 22) are formed in alternating broken line shapes so that the perimeter parts do not overlap each other.

<Exemplary Modification of Pattern Shape of X Pattern Electrode Part 12 and Y Pattern Electrode Part 22>

Note the present embodiment describes as an example a case in which the first base pattern and the second base pattern have perimeter parts formed in alternating broken line shapes so that the respective perimeter parts do not overlap in a planar view when the X pattern electrode part 12 (X pattern electrode layer) and the Y pattern electrode part 22 (Y pattern electrode layer) are layered.

However, according to the present embodiment, as described earlier, the X pattern electrodes 18 and the Y pattern electrodes 28 include internal patterns with mutually different periods, and thus continuous moiré fringes are not produced, and moiré fringes are not readily perceived. For this reason, visibility and display quality degradation due to moiré may be improved over the related art.

Consequently, the advantageous effect of the perimeter parts of the X pattern electrodes 18 and the Y pattern electrodes 28 being formed in alternating broken line shapes has an additional advantageous effect. Obviously, forming the perimeter parts of the X pattern electrodes 18 and the Y pattern electrodes 28 into broken line shapes as discussed above is more desirable, but is not necessarily required from the perspective of improving visibility degradation due to moiré fringes.

Comparative Example

Next, FIGS. 8(a) to 8(c) and FIG. 9 will be referenced below to describe the relationship between respective pixels of a display panel, and the X pattern electrodes and Y pattern electrodes in the case in which both the X pattern electrodes and Y pattern electrodes include square lattice-shaped patterns (small lattices) of the same size and shape as internal patterns.

Note that in this comparative example, for the sake of convenience, structural elements having the same function as the structural elements used from FIGS. 1(a) to 1(c) through FIG. 5 are given the same signs, and description thereof will be reduced or omitted.

Figure 8:
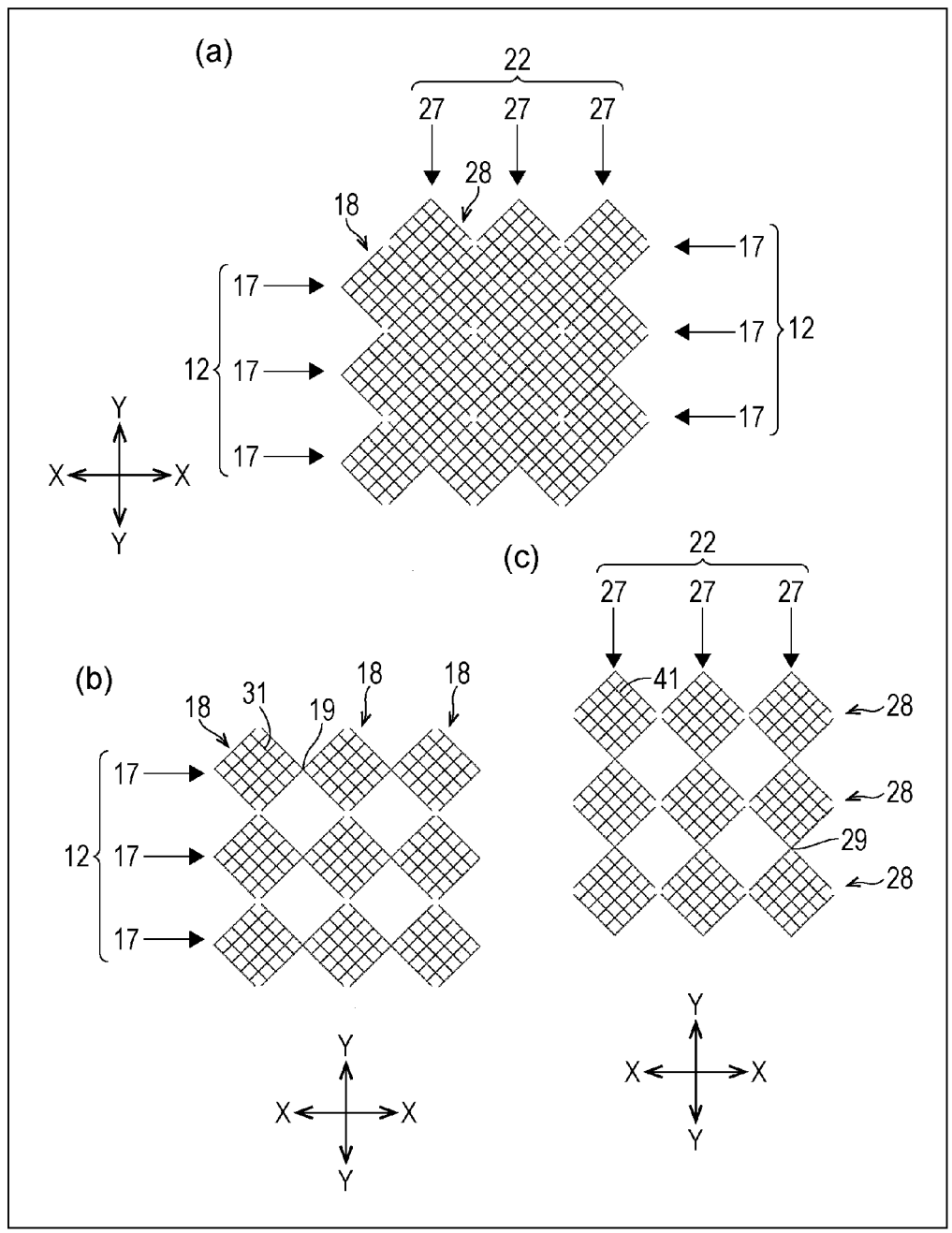
FIG. 8(a) is a plan view illustrating a pattern shape of an X pattern electrode part and a Y pattern electrode part when viewing an electrode sheet for comparison from a direction perpendicular to the electrode sheet.
FIG. 8(b) is a plan view illustrating a pattern shape of an X pattern electrode part when viewed from a direction perpendicular to the above electrode sheet for comparison.
FIG. 8(c) is a plan view illustrating a pattern shape of a Y pattern electrode part when viewed from a direction perpendicular to the above electrode sheet for comparison.

FIG. 8(a) is a plan view illustrating a pattern shape of the X pattern electrode part 12 and the Y pattern electrode part 22 when viewed from a direction perpendicular to an electrode sheet 2 according to the comparative example, FIG. 8(b) is a plan view illustrating a pattern shape of the X pattern electrode part 12 when viewed from a direction perpendicular to an electrode sheet 2 according to the comparative example, and FIG. 8(c) is a plan view illustrating a pattern shape of the Y pattern electrode part 22 when viewed from a direction perpendicular to an electrode sheet 2 according to the comparative example.

Note that in the comparative example, as illustrated in FIGS. 8(b) and 8(c), the X pattern electrodes 18 and the Y pattern electrodes 28 in the X pattern electrode part 12 and the Y pattern electrode part 22 are respectively taken to be squares with a diagonal length of 7 mm.

Figure 9:
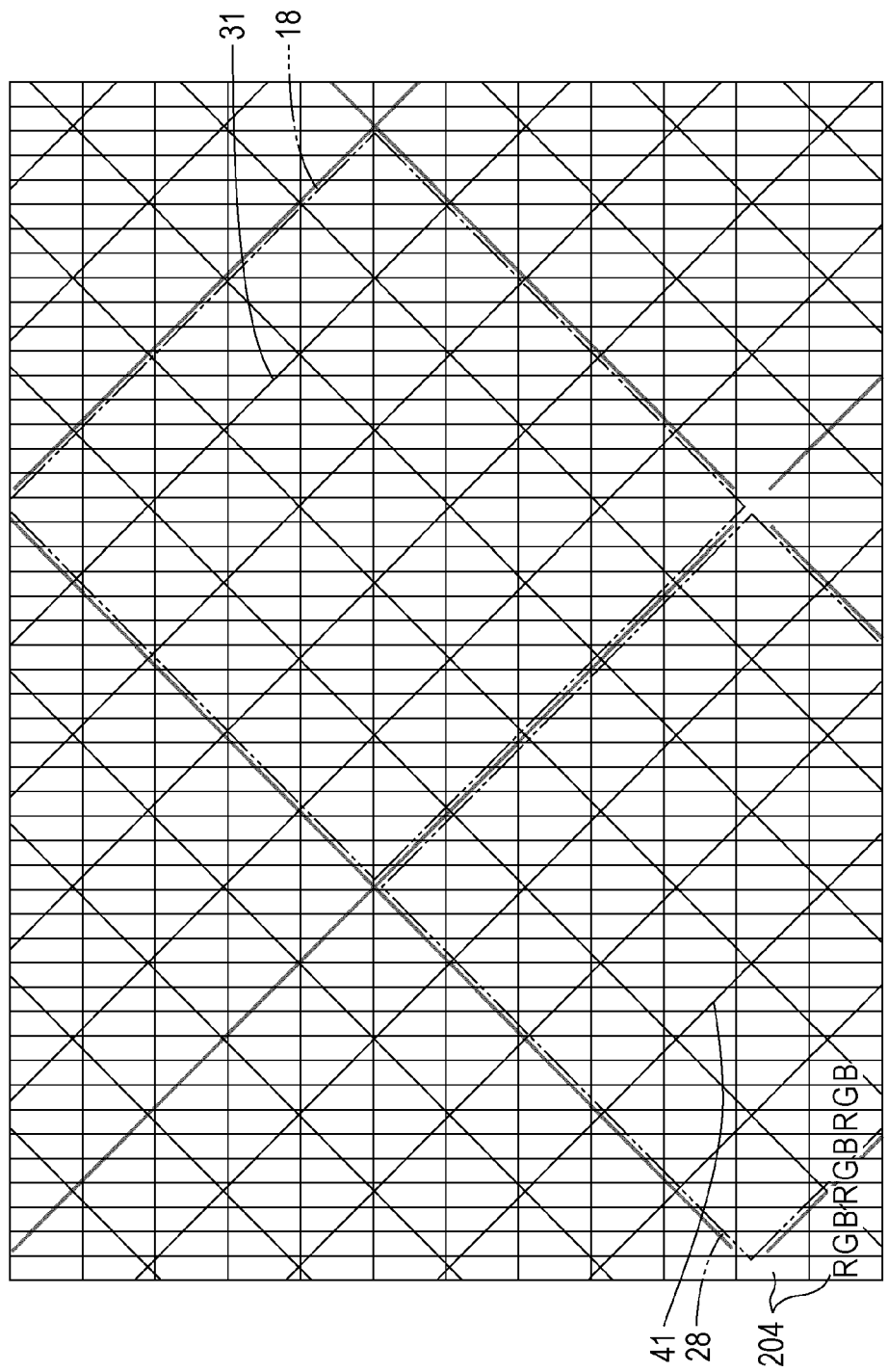
FIG. 9 is a plan view illustrating the relationship between respective pixels of a display panel, and X pattern electrodes and Y pattern electrodes in the above electrode sheet for comparison, when the electrode sheet for comparison that includes the X pattern electrode part and the Y pattern electrode part having the pattern shape illustrated in FIG. 8(a) is layered on top of the display panel.

In addition, FIG. 9 is a plan view illustrating the relationship between the respective pixels 204 of the display panel 201, and the X pattern electrodes 18 and Y pattern electrodes 28 according to the comparative example, when the electrode sheet 2 that includes the X pattern electrode part 12 and the Y pattern electrode part 22 having the pattern shape illustrated in FIG. 8(a) according to the comparative example is stacked on top of the display panel 201.

Note that FIG. 9 likewise illustrates as an example the case of using a 60" full HD liquid crystal panel as the display panel 201, in which pixels 204 of each of the colors R (red), G (green), and B (blue) are formed with a pixel pitch of 0.69225 mm×0.23075 mm.

As illustrated in FIGS. 8(a) to 8(c) and FIG. 9, in the case in which the X pattern electrodes 18 and the Y pattern electrodes 28 both include square lattice-shaped patterns of the same size and shape as internal patterns, a continuous periodic lattice pattern is arranged on top of the obtained touch panel 100 when the X pattern electrode part 12 (X pattern electrode layer) and the Y pattern electrode part 22 (Y pattern electrode layer) are layered similarly as in FIGS. 3 and 4.

Consequently, the moiré fringes produced by interference between the X pattern electrodes 18 and the pixels 204, and the moiré fringes produced by interference between the Y pattern electrodes 28 and the pixels 204, are the same.

For this reason, in the case of using the electrode sheet 2 according to the comparative example as an electrode sheet for a touch panel, continuous moiré fringes are produced, and the moiré fringes are readily perceived. For this reason, display quality suffers significantly.

Embodiment 2

Another embodiment of the present invention is described as follows on the basis of FIGS. 10(a) to 10(c) through FIG. 12. Note that in the present embodiment, the points that differ from Embodiment 1 will be described. Additionally, for the sake of convenience, structural elements having the same function as the structural elements used in Embodiment 1 are given the same signs, and description thereof will be reduced or omitted.

<Pattern Shape of X Pattern Electrode Part 12 and Y Pattern Electrode Part 22>

FIG. 10(a) is a plan view illustrating a pattern shape of the X pattern electrode part 12 and the Y pattern electrode part 22 when viewed from a direction perpendicular to the electrode sheet 2, FIG. 10(b) is a plan view illustrating a pattern shape of the X pattern electrode part 12 when viewed from a direction perpendicular to the electrode sheet 2, and FIG. 10(c) is a plan view illustrating a pattern shape of the Y pattern electrode part 22 when viewed from a direction perpendicular to the electrode sheet 2.

The X pattern electrodes 18 according to the present embodiment are made up of a third base pattern. Meanwhile, the Y pattern electrodes 28 are made up of a pattern obtained by rotating the third base pattern by 90 degrees (rotational movement).

FIG. 11(a) is a plan view illustrating a pattern shape of the X pattern electrodes 18, while FIG. 11(b) is a plan view illustrating a pattern shape of the Y pattern electrodes 28.

As illustrated in FIGS. 11(a) and 11(b), the X pattern electrodes 18 internally include an electrode pattern periodically formed by traces 31. In addition, the Y pattern electrodes 28 internally include an electrode pattern periodically formed by traces 41 having a pattern obtained by rotating the traces 31 by 90 degrees.

Inside the third base pattern, rectangular lattice-shaped patterns (small lattices) or a portion thereof made up of the above traces 31 or 41 are formed as a third internal pattern.

The third internal pattern is formed so as to divide the third base pattern into multiple small lattices. The respective edges of the third internal pattern (small lattices) are parallel to the respective edges of the third base pattern, and are tilted 45 degrees with respect to the X direction and the Y direction, respectively.

Figure 11:
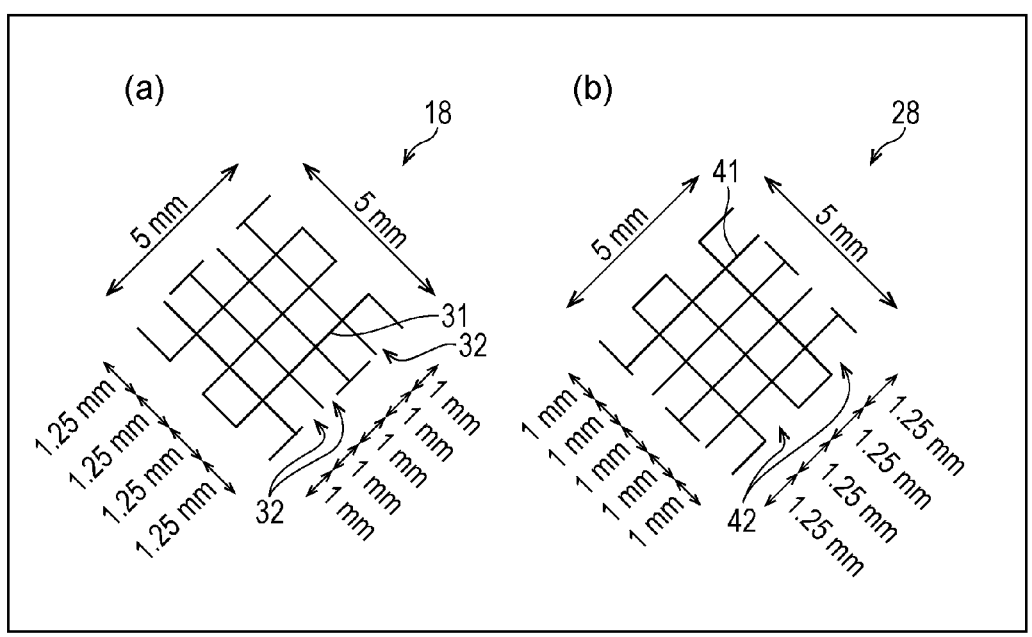
FIG. 11(a) is a plan view illustrating a pattern shape of X pattern electrodes according to Embodiment 2 of the present invention.
FIG. 11(b) is a plan view illustrating a pattern shape of Y pattern electrodes according to Embodiment 2 of the present invention.

As illustrated in FIGS. 11(*a*) and 11(*b*), the outer shape of the third base pattern is square with a 5 mm edge.

Meanwhile, the third internal pattern is a rectangular lattice whose adjacent edges (two edges that form a right angle) are respectively 1 mm and 1.25 mm long, or alternatively, a portion of a lattice whose outer shape becomes a rectangle whose adjacent edges are 1 mm and 1.25 mm in a planar view when the X pattern electrode layer (X pattern electrode part 12) and the Y pattern electrode layer (Y pattern electrode part 22) are overlaid. In other words, each small lattice constituting the third base pattern is a rectangular lattice whose adjacent edge lengths are respectively 1 mm and 1.25 mm. Consequently, the third base pattern is equipped with a conducting pattern having a periodic structure with a period (trace interval) of 1.25 mm, and a periodic structure with a period (trace interval) of 1 mm, in mutually orthogonal directions.

Note that in the present embodiment, in a planar view, provided that the rightward direction of a straight line parallel to the X direction is taken to be 0 degrees, and an angle is defined in the counterclockwise direction, the period of the small lattices in a direction parallel to 45 degrees in the X pattern electrodes 18 and the period of the small lattices in a direction parallel to 135 degrees in the Y pattern electrodes 28 are taken to be 1 mm, while the period of the small lattices in a direction parallel to 135 degrees in the X pattern electrodes 18 and the period of the small lattices in a direction parallel to 45 degrees in the Y pattern electrodes 28 are taken to be 1.25 mm.

Note that the line widths of the respective traces 31/41 constituting these patterns are set similarly to Embodiment 1.

Also, the third base pattern has perimeter parts formed in broken line shapes so that the perimeter parts do not overlap with the perimeter parts of the third base pattern rotated 90 degrees in a planar view when the X pattern electrode part 12 (X pattern electrode layer) and the Y pattern electrode part 22 (Y pattern electrode layer) are layered. In other words, in the third base pattern, the outermost traces (traces 31/41) are formed so as to become alternating broken line shapes between adjacent X pattern electrodes 18 and Y pattern electrodes 28 (that is, between non-rotated patterns and 90-degree rotated patterns).

For this reason, the perimeter parts of the third base pattern likewise has trace cutaway parts (trace cutaway parts 32/42) not provided with traces (traces 31/41), and likewise in an electrode sheet 2 according to the present embodiment, overlapping traces do not exist in the X electrodes 17 and the Y electrodes 27 except at the connecting parts 19/29 (connection points) in a planar view. For this reason, an electrode sheet 2 according to the present embodiment likewise does not have the problem of lowered visibility due to line thickness.

In addition, according to the present embodiment, the length of the third internal pattern is different depending on the direction, and the long-axis orientation (the orientation of the long edge) of the third internal pattern mutually differs between the X pattern electrodes 18 and the Y pattern electrodes 28, as discussed above. For this reason, the interval (period) of traces 31/41 are mutually different in the same direction between the X pattern electrodes 18 and the Y pattern electrodes 28.

Figure 10:
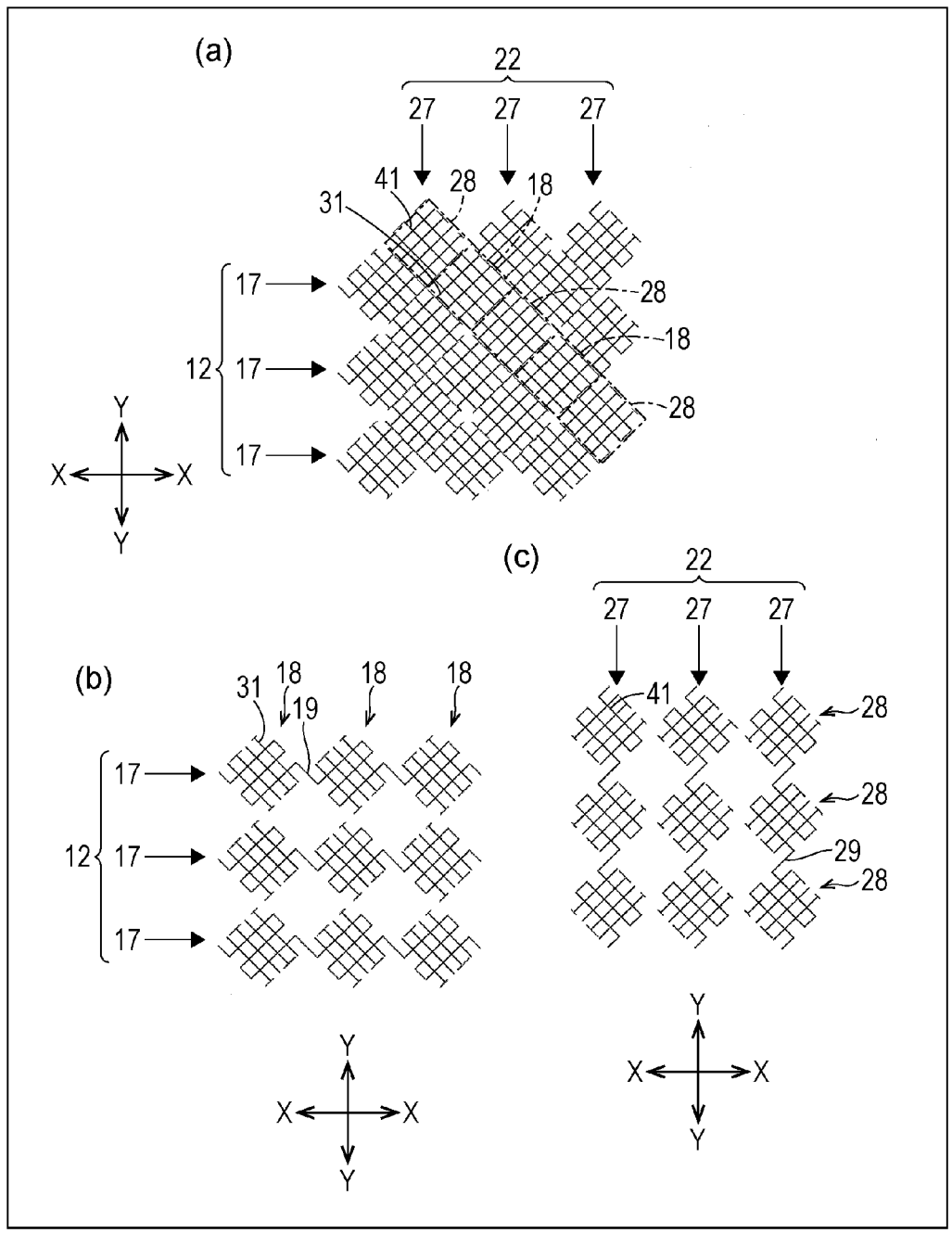
FIG. 10(a) is a plan view illustrating a pattern shape of an X pattern electrode part and a Y pattern electrode part when viewed from a direction perpendicular to an electrode sheet according to Embodiment 2 of the present invention.
FIG. 10(b) is a plan view illustrating a pattern shape of an X pattern electrode part when viewed from a direction perpendicular to the above electrode sheet.
FIG. 10(c) is a plan view illustrating a pattern shape of a Y pattern electrode part when viewed from a direction perpendicular to the above electrode sheet.

For this reason, as discussed above, in an electrode sheet 2 in which an X pattern electrode part 12 and a Y pattern electrode part 22 are layered, as indicated by the double-dashed chain lines in FIG. 10(*a*), the X pattern electrodes 18 and the Y pattern electrodes 28 having rectangular small lattices mutually rotated by 90 degrees become arranged so as to alternately repeat in a diagonal direction (in other words, a direction intersecting the X direction and the Y direction) as multiple different electrode patterns in a planar view.

Figure 12:
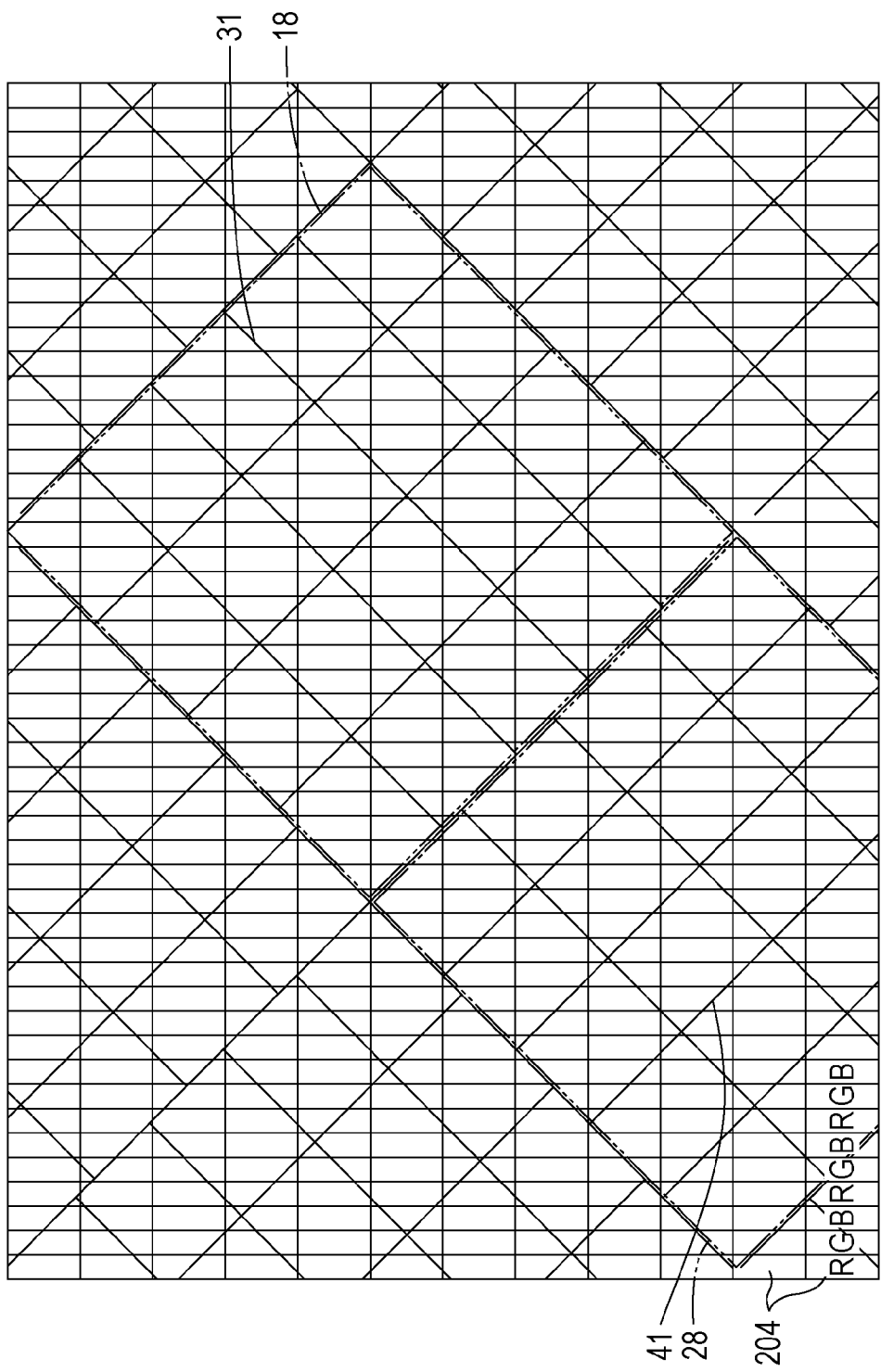
FIG. 12 is a plan view schematically illustrating the relationship between respective pixels of a display panel, and X pattern electrodes and Y pattern electrodes according to Embodiment 2 of the present invention.

Herein, FIG. 12 illustrates the relationship between respective pixels 204 of the display panel 201, and the X pattern electrodes 18 and the Y pattern electrodes 28. Note that FIG. 12 likewise illustrates as an example the case of using a 60" full HD liquid crystal panel as the display panel 201, in which pixels 204 of each of the colors R (red), G (green), and B (blue) are formed with a pixel pitch of 0.69225 mm×0.23075 mm.

As illustrated in FIG. 12, the periodic directions of the pixels 204 of the display panel 201 are the X direction and the Y direction. Consequently, in the X pattern electrodes 18 and the Y pattern electrodes 28 described above, a rectangular third internal pattern is repeatedly placed while being rotated 90 degrees as discussed above, while in addition, the periodic direction of the third internal pattern (in other words, the arrangement directions of the traces 31/41 parallel to each edge of the X pattern electrodes 18 and the Y pattern electrodes 28) are tilted 45 degrees with respect to the periodic directions of the pixels 204 of the display panel 201.

Consequently, even if the X pattern electrodes 18 and the Y pattern electrodes 28 interfere with the pixels 204 of the display panel 201, the moiré fringes produced by interference between the X pattern electrodes 18 and the pixels 204, and the moiré fringes produced by interference between the Y pattern electrodes 28 and the pixels 204, have respectively different periods and periodic directions of the moiré fringes. For this reason, continuous moiré fringes are not produced, and the moiré fringes are difficult to recognize.

For this reason, by using the above electrode sheet 2 as an electrode sheet for a touch panel, it is possible to realize a touch panel 100 and a display device 200 with excellent visibility and display quality.

Additionally, as discussed above, since the X pattern electrodes 18 and the Y pattern electrodes 28 are both made up of the third base pattern, and have a relationship in which this third base pattern is rotated, the density of traces inside the base pattern is constant between the X pattern electrode part 12 and the Y pattern electrode part 22.

For this reason, according to the present embodiment, a uniform electric field/capacitance between the X electrodes 17 and the Y electrodes 27 is formed. Consequently, by using the above electrode sheet 2 as an electrode sheet for a touch panel, the position detection precision of the touch panel 100 may be easily ensured.

Exemplary Modifications

Note that likewise in the present embodiment, the outer shapes of the third base pattern are all square, as discussed above. However, likewise in the present embodiment, the shape (outer shape) of the third base pattern is not limited thereto, and may be given various shapes, as described in Embodiment 1.

However, in the present embodiment, it is likewise desirable that the outer shape of the above third base pattern is a shape that becomes closely packed when the X pattern electrode part 12 and the Y pattern electrode part 22 are layered as discussed earlier.

Also, in the present embodiment, the shape (outer shape) of the third internal pattern is taken to be a rectangular lattice, but is not limited thereto. The third base pattern may also form three or more lattice-shaped internal patterns with different shapes.

Also, in the present embodiment, the X pattern electrodes 18 and the Y pattern electrodes 28 are taken to be patterns obtained by mutually rotating the third base pattern by 90 degrees, but the present embodiment is not limited thereto. The X pattern electrodes 18 and the Y pattern electrodes 28 may also be configured to respectively include rectangular internal patterns with mutually different sizes.

Additionally, the present embodiment likewise illustrates as an example a case in which the perimeter parts of the X pattern electrodes 18 and the Y pattern electrodes 28 are formed in broken line shapes, but as explained in Embodiment 1, forming the perimeter parts of the X pattern electrodes 18 and the Y pattern electrodes 28 into broken line shapes is not necessarily required.

Additionally, the present embodiment is likewise not limited to the above modification, and may also be modified similarly to Embodiment 1.

Embodiment 3

Yet another embodiment of the present invention is described as follows on the basis of FIGS. 13(a) to 13(c) through FIG. 15. Note that in the present embodiment, the points that differ from Embodiments 1 and 2 will be described. Additionally, for the sake of convenience, structural elements having the same function as the structural elements used in Embodiments 1 and 2 are given the same signs, and description thereof will be reduced or omitted.

<Pattern Shape of X Pattern Electrode Part 12 and Y Pattern Electrode Part 22>

Figure 13:
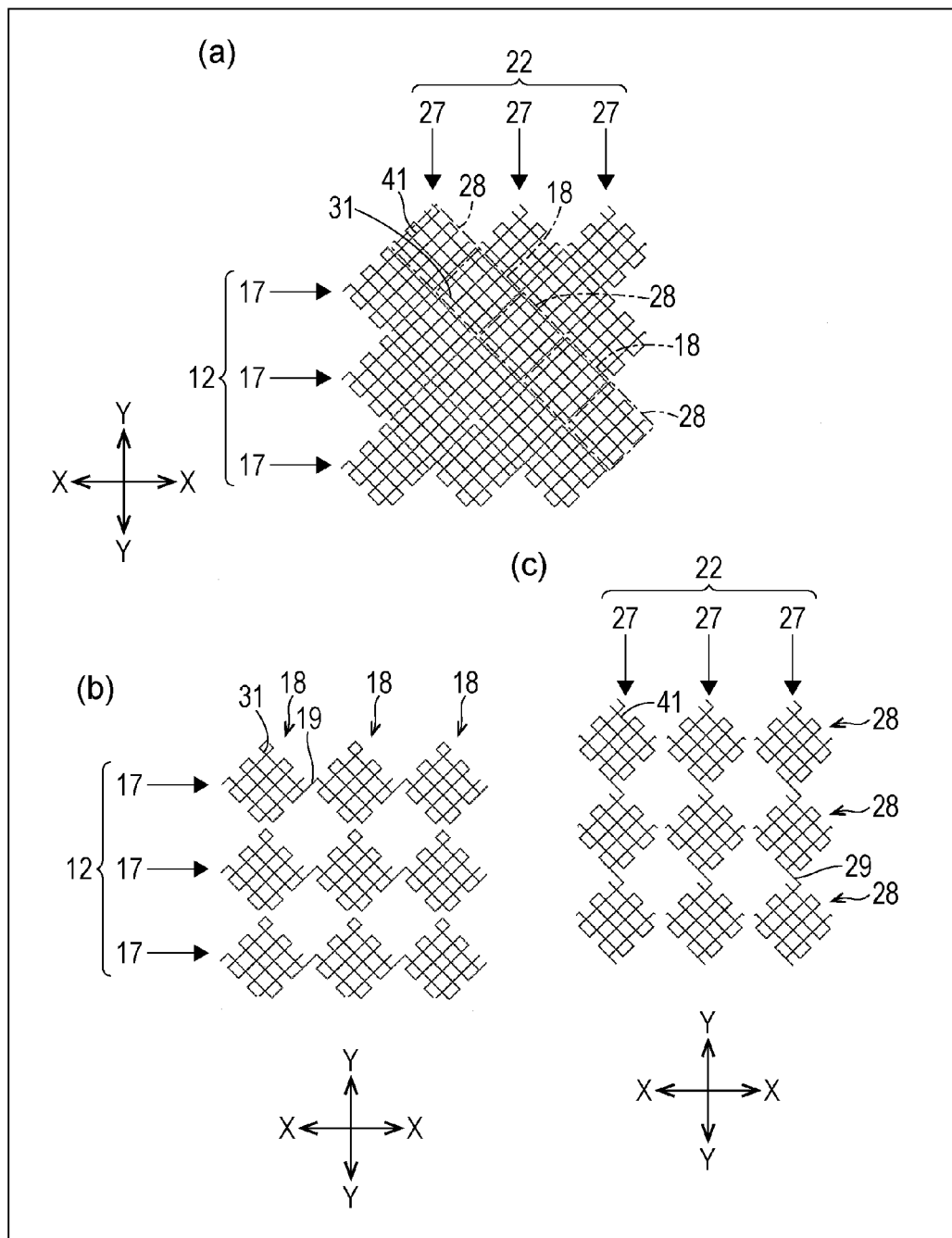
FIG. 13(a) is a plan view illustrating a pattern shape of an X pattern electrode part and a Y pattern electrode part when viewed from a direction perpendicular to an electrode sheet according to Embodiment 3 of the present invention.
FIG. 13(b) is a plan view illustrating a pattern shape of an X pattern electrode part when viewed from a direction perpendicular to the above electrode sheet.
FIG. 13(c) is a plan view illustrating a pattern shape of a Y pattern electrode part when viewed from a direction perpendicular to the above electrode sheet.

FIG. 13(a) is a plan view illustrating a pattern shape of the X pattern electrode part 12 and the Y pattern electrode part 22 when viewed from a direction perpendicular to the electrode sheet 2, FIG. 13(b) is a plan view illustrating a pattern shape of the X pattern electrode part 12 when viewed from a direction perpendicular to the electrode sheet 2, and FIG. 13(c) is a plan view illustrating a pattern shape of the Y pattern electrode part 22 when viewed from a direction perpendicular to the electrode sheet 2.

The X pattern electrodes 18 according to the present embodiment are made up of a fourth base pattern. Meanwhile, the Y pattern electrodes 28 according to the present embodiment are made up of a fifth base pattern.

Figure 14:
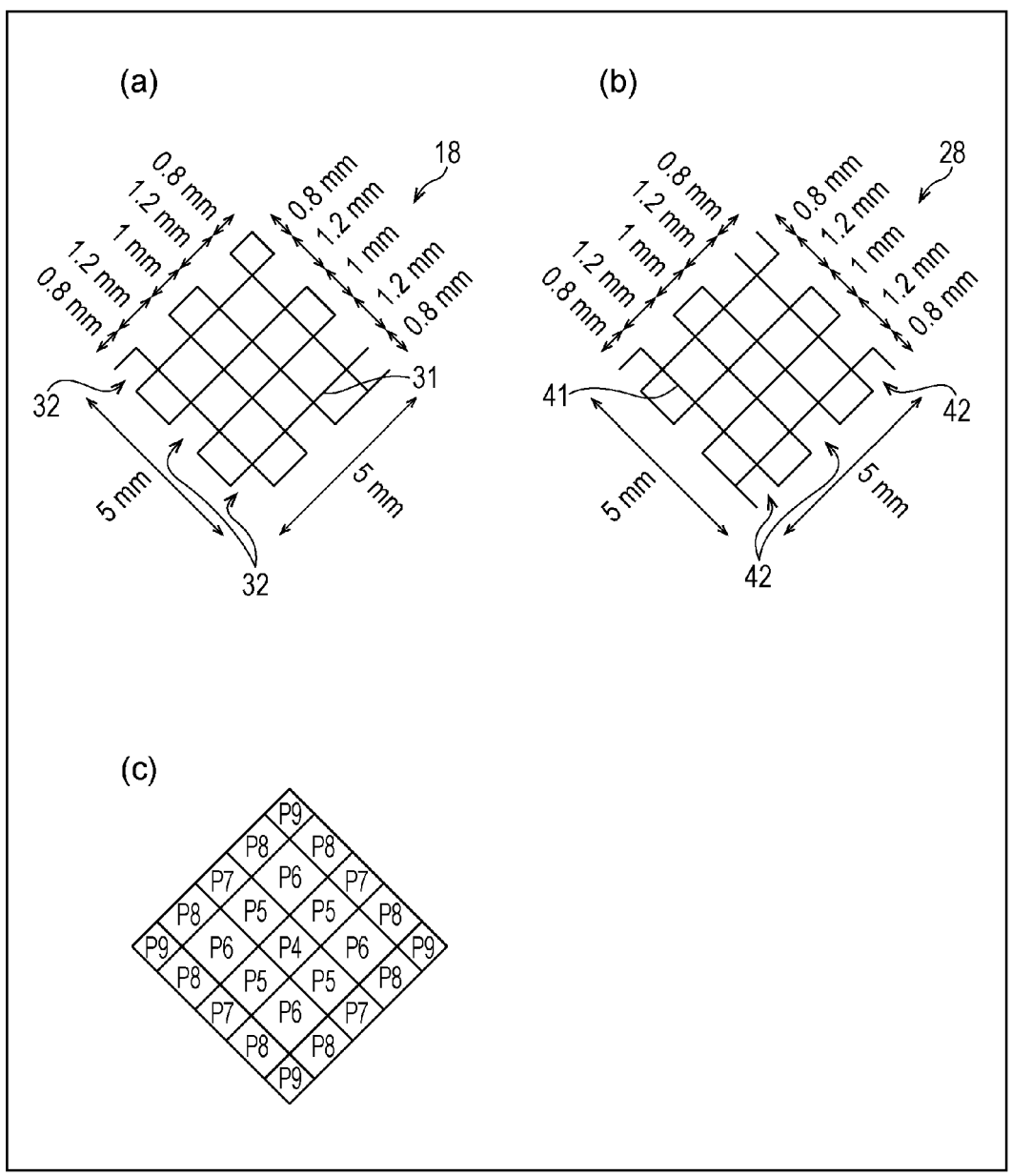
FIG. 14(a) is a plan view illustrating a pattern shape of X pattern electrodes according to Embodiment 3 of the present invention.
FIG. 14(b) is a plan view illustrating a pattern shape of Y pattern electrodes according to Embodiment 3 of the present invention.
FIG. 14(c) is a plan view illustrating an internal pattern arrangement in the X pattern electrodes and the Y pattern electrodes illustrated in FIGS. 14(a) and 14(b).

FIG. 14(a) is a plan view illustrating a pattern shape of the X pattern electrodes 18, FIG. 14(b) is a plan view illustrating a pattern shape of the Y pattern electrodes 28, and FIG. 14(c) is a plan view illustrating an internal pattern arrangement in the X pattern electrodes 18 and the Y pattern electrodes 28.

As illustrated in FIG. 14(a), the X pattern electrodes 18 internally include an electrode pattern periodically formed by traces 31. Also, as illustrated in FIG. 14(b), the Y pattern electrodes 28 internally include an electrode pattern periodically formed by traces 41.

Also, as illustrated in FIGS. 13(a) to 13(c) and FIGS. 14(a) to 14(c), six types of lattice-shaped patterns (small lattices) with mutually different sizes or a portion thereof are respectively included as fourth to ninth internal patterns inside the fourth base pattern and the fifth base pattern. In FIG. 14(c), the fourth to ninth internal patterns are labeled P4 to P9 in order.

As illustrated in FIG. 14(c), the fourth to ninth internal patterns are formed so as to respectively divide the fourth and fifth base patterns into multiple small lattices. The respective edges of the respective internal patterns (small lattices) provided in each base pattern are parallel to the respective edges of each base pattern, and are tilted 45 degrees with respect to the X direction and the Y direction, respectively.

As illustrated in FIGS. 14(a) and 14(b), the outer shapes of the fourth and fifth base patterns are respectively square with a 5 mm edge.

In addition, the outer shapes of the fourth internal pattern, the sixth internal pattern, and the ninth internal pattern are square with 1 mm, 1.2 mm, and 0.8 mm edges in order, respectively. The outer shape of the fifth internal pattern is a rectangle with respective edges of 1 mm and 1.2 mm. The outer shape of the seventh internal pattern is a rectangle with respective edges of 1 mm and 0.8 mm. The outer shape of the eighth internal pattern is a rectangle with respective edges of 1.2 mm and 0.8 mm.

Note that the line widths of the respective traces 31/41 constituting these patterns are set similarly to Embodiment 1.

Also, the fourth base pattern and the fifth base pattern have perimeter parts formed in alternating broken line shapes so that the respective perimeter parts do not overlap in a planar view when the X pattern electrode part 12 (X pattern electrode layer) and the Y pattern electrode part 22 (Y pattern electrode layer) are layered.

For this reason, the perimeter part of the fourth base pattern has trace cutaway parts 32 (trace non-formation parts) not provided with the traces 31, and the perimeter part of the fifth base pattern has trace cutaway parts 42 (trace non-formation parts) not provided with the traces 41.

For this reason, in the above X electrodes 17 and Y electrodes 27, overlapping traces do not exist in a planar view, except for the connecting parts 19/29 (connection points), similarly to Embodiments 1 and 2.

In addition, on an electrode sheet 2 according to the present embodiment, as illustrated in FIG. 13(a) and FIG. 14(b), multiple square or rectangular internal patterns (the fourth to ninth internal patterns are arranged so as to respectively repeat in the X direction, the Y direction, and the diagonal directions in a planar view.

Figure 15:
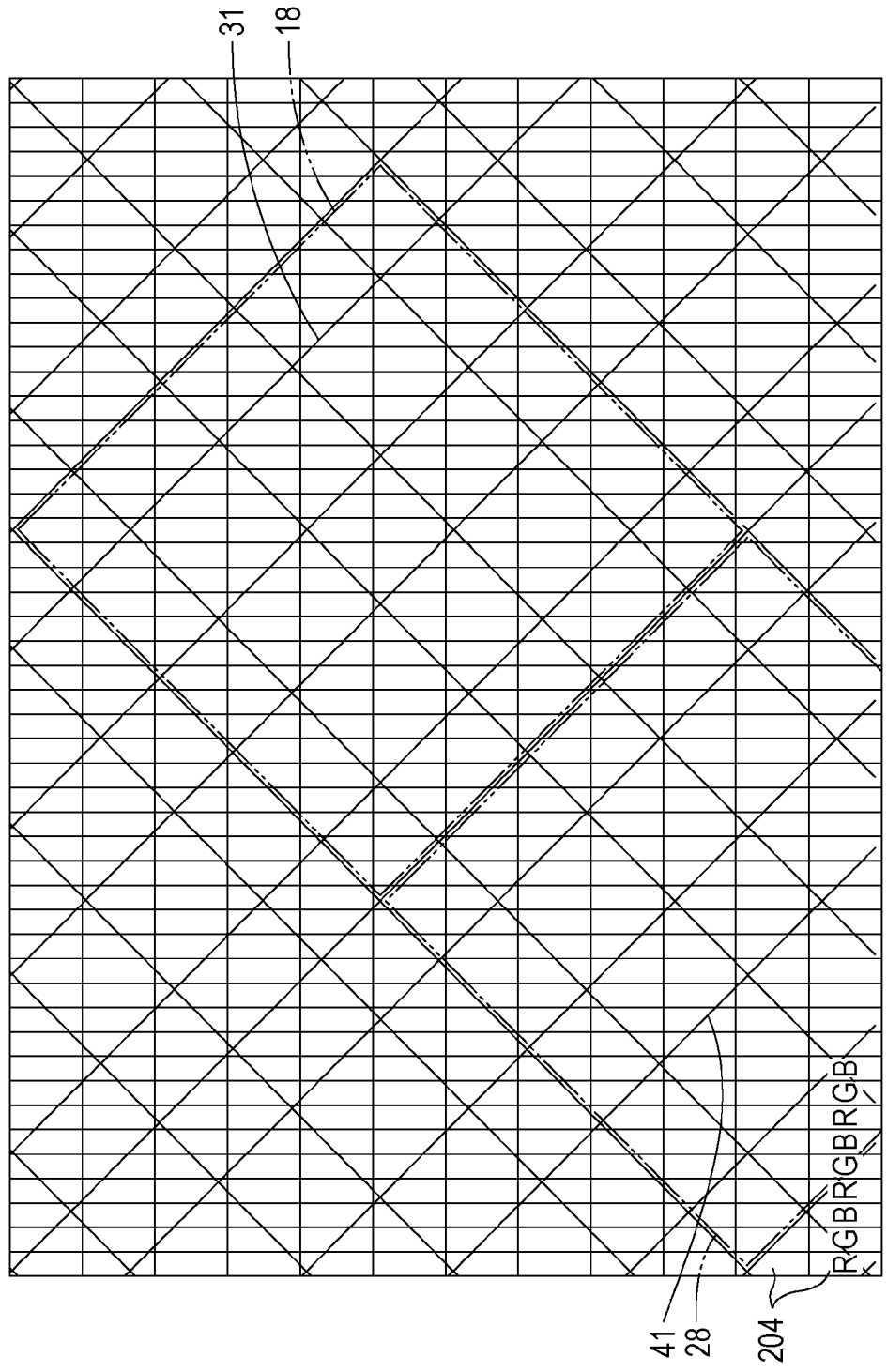
FIG. 15 is a plan view schematically illustrating the relationship between respective pixels of a display panel, and X pattern electrodes and Y pattern electrodes according to Embodiment 3 of the present invention.

Herein, FIG. 15 illustrates the relationship between respective pixels 204 of the display panel 201, and the X pattern electrodes 18 and the Y pattern electrodes 28. Note that FIG. 15 likewise illustrates as an example the case of using a 60" full HD liquid crystal panel as the display panel 201, in which pixels 204 of each of the colors R (red), G (green), and B (blue) are formed with a pixel pitch of 0.69225 mm×0.23075 mm.

According to the present embodiment, as illustrated in FIG. 15, the above X pattern electrodes 18 and Y pattern electrodes 28 are respectively equipped with lattice-shaped internal patterns with multiple different sizes, or in other words multiple internal patterns with different periods, which are made up of the traces 31 or the traces 41. Also, the periodic directions of each internal pattern (in other words, the arrangement directions of the traces 31/41 parallel to each edge of the X pattern electrodes 18 and the Y pattern electrodes 28) are tilted 45 degrees with respect to the periodic directions of the pixels 204 of the display panel 201.

Consequently, even if the X pattern electrodes 18 and the Y pattern electrodes 28 interfere with the pixels 204 of the display panel 201, the moiré fringes produced by interference between the X pattern electrodes 18 and the pixels 204, and the moiré fringes produced by interference between the Y pattern electrodes 28 and the pixels 204, have respectively different periods and periodic directions of the moiré fringes. For this reason, continuous moiré fringes are not produced, and the moiré fringes are difficult to recognize.

For this reason, by using the above electrode sheet 2 as an electrode sheet for a touch panel, it is possible to realize a touch panel 100 and a display device 200 with excellent visibility and display quality.

Also, according to the present embodiment, as illustrated in FIGS. 14(a) and 14(b), the density of the traces 31/41 constituting the respective internal patterns in the X pattern electrodes 18 and the Y pattern electrodes 28 is constant. Moreover, the trace patterns of the traces 31/41 approximately match between the X pattern electrodes 18 and the Y pattern electrodes 28.

For this reason, according to the present embodiment, a uniform electric field/capacitance between the X electrodes 17 and the Y electrodes is formed. Consequently, by using the above electrode sheet 2 as an electrode sheet for a touch panel, the position detection precision of the touch panel 100 may be easily ensured.

Exemplary Modifications

Note that in the present embodiment, as discussed above, the outer shapes of the fourth and fifth base patterns are all square. However, likewise in the present embodiment, the shapes (outer shapes) of the fourth and fifth base patterns are not limited thereto, and may be given various shapes, as described in Embodiments 1 and 2.

However, in the present embodiment, it is likewise desirable that the outer shapes of the above fourth and fifth base patterns are shapes that become closely packed when the X pattern electrode part 12 and the Y pattern electrode part 22 are layered as discussed earlier.

Also, in the present embodiment, the internal patterns are taken to be the same between the fourth and the fifth base patterns, but the fourth base pattern and the fifth base pattern may also have mutually different internal patterns. For example, only of the base patterns may internally include two or more types of lattice-shaped internal patterns with different shapes or sizes.

Also, in the present embodiment, the fourth to ninth internal patterns are taken to be square or rectangular lattices, but the shapes (outer shapes) of the internal patterns are not limited thereto, and it is sufficient for two or more types of lattice-shaped internal patterns with different shapes to be formed.

Additionally, the present embodiment likewise illustrates as an example a case in which the perimeter parts of the X pattern electrodes 18 and the Y pattern electrodes 28 are formed in broken line shapes, but as explained in Embodiment 1, forming the perimeter parts of the X pattern electrodes 18 and the Y pattern electrodes 28 into broken line shapes is not necessarily required.

Consequently, the same base pattern may be used in the above X pattern electrodes 18 and Y pattern electrodes 28, and patterns obtained by mutually rotating the same base pattern by 90 degrees (rotational movement) may be used.

Additionally, the present embodiment is likewise not limited to the above modification, and may also be modified similarly to Embodiments 1 and 2.

Embodiment 4

Yet another embodiment of the present invention is described as follows on the basis of FIGS. 16(a) to 16(c) and FIGS. 17(a) to 17(b). Note that in the present embodiment, the points that differ from Embodiments 1 to 3 will be described. Additionally, for the sake of convenience, structural elements having the same function as the structural elements used in Embodiments 1 to 3 are given the same signs, and description thereof will be reduced or omitted.

<Pattern Shape of X Pattern Electrode Part 12 and Y Pattern Electrode Part 22>

Figure 16:
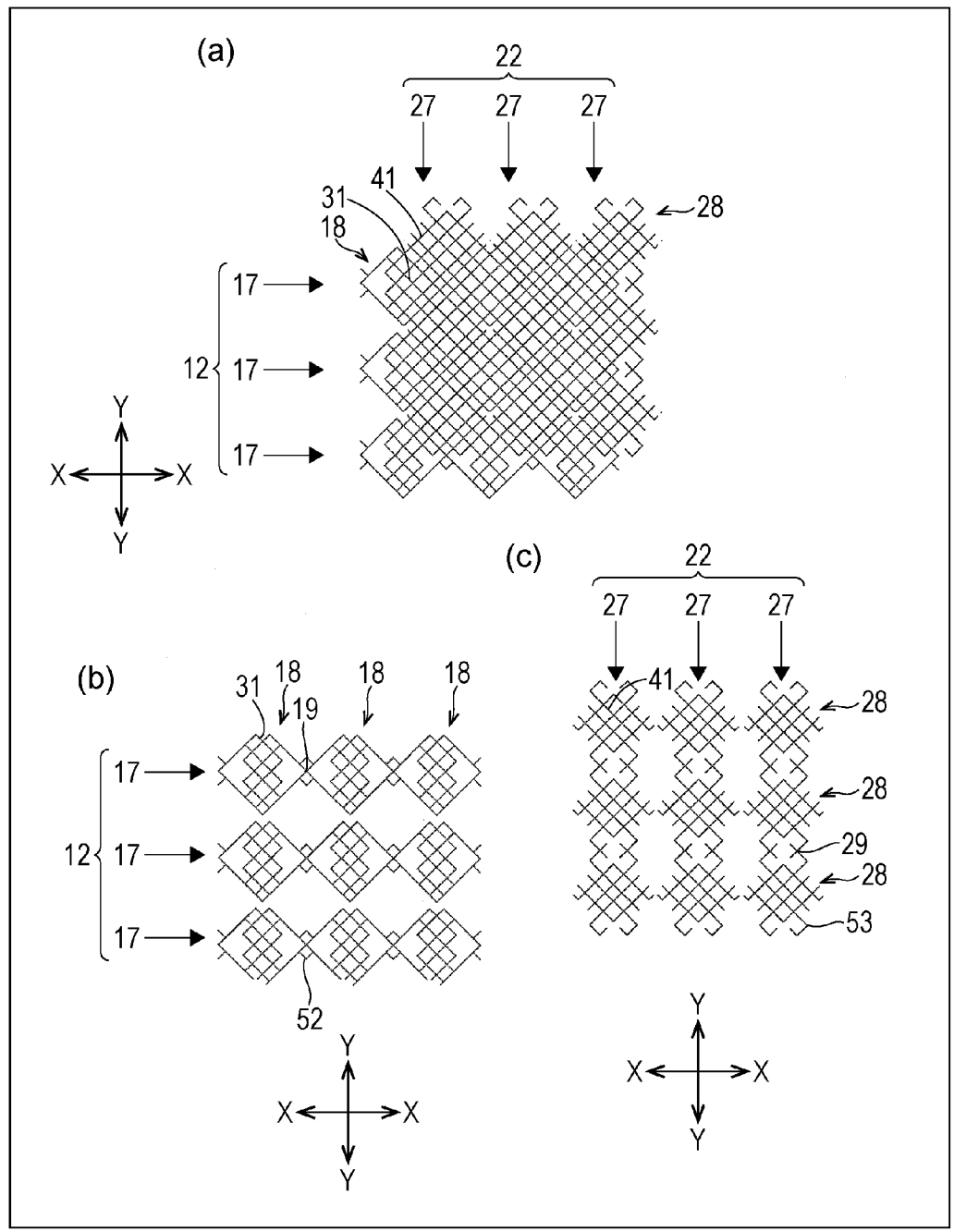
FIG. 16(a) is a plan view illustrating a pattern shape of an X pattern electrode part and a Y pattern electrode part when viewed from a direction perpendicular to an electrode sheet according to Embodiment 4 of the present invention.
FIG. 16(b) is a plan view illustrating a pattern shape of an X pattern electrode part when viewed from a direction perpendicular to the above electrode sheet.
FIG. 16(c) is a plan view illustrating a pattern shape of a Y pattern electrode part when viewed from a direction perpendicular to the above electrode sheet.

FIG. 16(a) is a plan view illustrating a pattern shape of the X pattern electrode part 12 and the Y pattern electrode part 22 when viewed from a direction perpendicular to the electrode sheet 2, FIG. 16(b) is a plan view illustrating a pattern shape of the X pattern electrode part 12 when viewed from a direction perpendicular to the electrode sheet 2, and FIG. 16(c) is a plan view illustrating a pattern shape of the Y pattern electrode part 22 when viewed from a direction perpendicular to the electrode sheet 2.

The X pattern electrodes 18 according to the present embodiment are made up of a sixth base pattern. Meanwhile, the Y pattern electrodes 28 according to the present embodiment are made up of a seventh base pattern.

Figure 17:
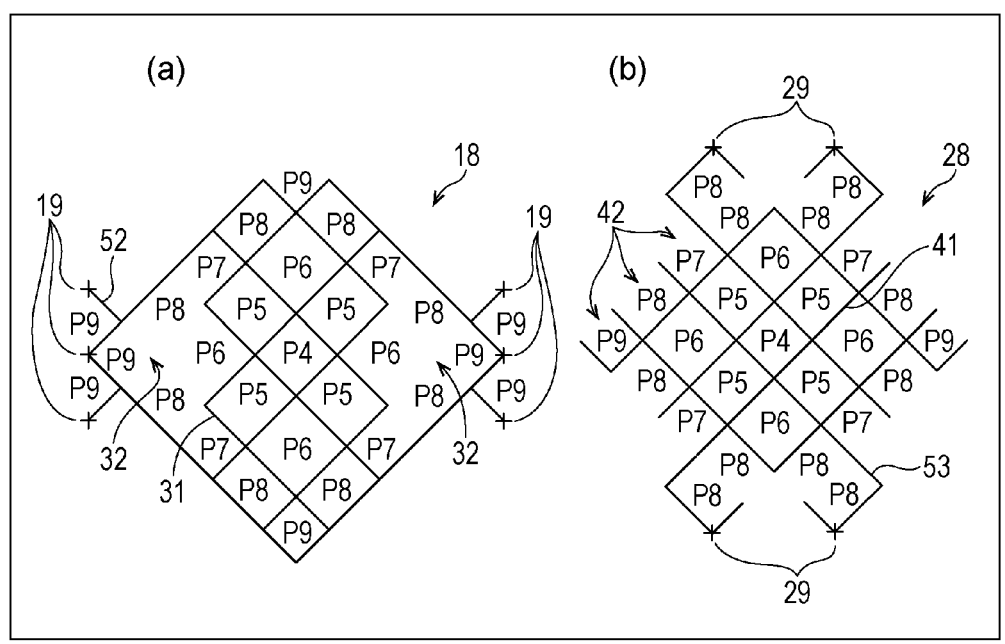
FIG. 17(a) is a plan view illustrating a pattern shape of X pattern electrodes according to Embodiment 4 of the present invention.
FIG. 17(b) is a plan view illustrating a pattern shape of Y pattern electrodes according to Embodiment 4 of the present invention.

FIG. 17(a) is a plan view illustrating a pattern shape of the X pattern electrodes 18, while FIG. 17(b) is a plan view illustrating a pattern shape of the Y pattern electrodes 28.

As illustrated in FIG. 17(a), the X pattern electrodes 18 internally include an electrode pattern periodically formed by traces 31. Also, as illustrated in FIG. 17(b), the Y pattern electrodes 28 internally include an electrode pattern periodically formed by traces 41.

Also, as illustrated in FIGS. 16(a) to 16(c) and FIGS. 17(a) to 17(b), six types of lattice-shaped patterns (small lattices) with mutually different sizes or a portion thereof are respectively included inside the sixth base pattern and the seventh base pattern.

Note that the lengths of the respective edges of each of the above base patterns as well as the shapes (outer shapes and sizes) of the above six types of lattice-shaped patterns (small lattices) are the same as the fourth to ninth internal patterns of the X pattern electrodes 18 and the Y pattern electrodes 28 in Embodiment 3.

Accordingly, in the present embodiment, the same internal patterns as the fourth to ninth internal patterns will be designated the fourth to ninth internal patterns in order, and description thereof will be reduced or omitted.

Note that in FIGS. 17(a) and 17(b), these fourth to ninth internal patterns are labeled P4 to P9 in order. Note that in FIGS. 17(a) and 17(b), on the outside of the base patterns, there are jointly illustrated the internal patterns (small lattices) of adjacent X pattern electrodes 18 and the Y pattern electrodes 28 in a planar view when the X pattern electrode part 12 (X pattern electrode layer) and the Y pattern electrode part 22 (Y pattern electrode layer) are layered. Also, in the present embodiment, the line widths of the respective traces 31/41 constituting these patterns are likewise set similarly to Embodiment 1.

In addition, the sixth base pattern includes multiple connecting parts 19 between the X pattern electrodes 18, as illustrated in FIG. 17(a). In addition, the seventh base pattern includes multiple connecting parts 29 between the pattern electrodes 28, as illustrated in FIG. 17(b). Note that in FIGS. 17(a) and 17(b), the connection points of the connecting parts 19/29 are respectively indicated with "+".

Also, in the present embodiment, the connecting parts 19 between the X pattern electrodes 18 are connecting traces 52, the connecting parts 29 between the Y pattern electrodes 28 are connecting traces 53, and the X pattern electrodes 18 are connected to each other and the Y pattern electrodes 28 are connected to each other by the respective connecting traces 52/53.

In other words, in the present embodiment, as illustrated in FIG. 16(b) and FIG. 17(a), when the outer shape of the sixth base pattern is considered to be a square like the fourth base pattern, the X pattern electrodes 18 are connected to each other by connecting traces 52 extending out from the outermost traces 31 in the sixth base pattern.

Also, as illustrated in FIG. 16(c) and FIG. 17(b), when the outer shape of the seventh base pattern is considered to be a square like the fifth base pattern, the Y pattern electrodes 28 are connected to each other by connecting traces 53 extending out from the outermost traces 41 in the seventh base pattern.

In this way, by respectively providing multiple connecting parts 19/29 among the X pattern electrodes 18 and among the Y pattern electrodes 28, the occurrence of fabrication errors due to breaks in the patterns (that is, breaks in the traces 31/41) may be minimized.

Also, in the present embodiment, as illustrated in FIG. 16(a), the X pattern electrodes 18 and the Y pattern electrodes 28 are arranged so that there are no gaps between the X pattern electrodes 18 and the Y pattern electrodes 28 in a planar view when the X pattern electrode part 12 and the Y pattern electrode part 22 are layered.

For this reason, in the present embodiment, perimeter parts are formed in alternating broken line shapes so that the respective perimeter parts do not overlap in a planar view when the X pattern electrode part 12 (X pattern electrode layer) and the Y pattern electrode part 22 (Y pattern electrode layer) are layered, while in addition, trace cutaway parts 32/42 are provided inside each base pattern, or in other words, in portions other than the outermost edges, so that the traces 31/41 in the X pattern electrodes 18 and the Y pattern electrodes 28 that are adjacent in a planar view do not overlap with the connecting traces 52/53 in adjacent X pattern electrodes 18 and Y pattern electrodes 28.

For this reason, in the above X electrodes 17 and Y electrodes 27, overlapping traces do not exist in a planar view, except for the connecting parts 19/29 (connection points), similarly to Embodiments 1 to 3.

Note that the outer shapes of the internal patterns in the X pattern electrodes 18 and the Y pattern electrodes 28 according to the present embodiment are the same as the fourth to ninth internal patterns in the X pattern electrodes 18 and the Y pattern electrodes 28 in Embodiment 3, as discussed above. For this reason, the relationship between respective pixels 204 of the display panel 201, and the X pattern electrodes 18 and Y pattern electrodes 28, in an electrode sheet 2 according to the present embodiment is the same as FIG. 15 in Embodiment 3. Consequently, in the present embodiment, illustration of the above relationship is omitted.

In this way, according to the present embodiment, since the relationship between respective pixels 204 of the display panel 201, and the X pattern electrodes 18 and Y pattern electrodes 28, is the same as Embodiment 3, advantageous effects similar to Embodiment 3 may be obtained.

Also, in an electrode sheet 2 according to the present embodiment, by respectively providing multiple connecting parts 19/29 among the X pattern electrodes 18 and among the Y pattern electrodes 28 as described above, yield is improved over an electrode sheet 2 according to Embodiment 3. For this reason, the present embodiment exhibits the additional advantageous effect of being able to improve the yield of the electrode sheet 2, the touch panel 100, and the display panel 201 compared to Embodiment 3.

In addition, the present embodiment likewise illustrates as an example a case in which trace cutaway parts 32/42 are provided at the perimeter parts of each base pattern and inside each base pattern, so that the traces 31/41 in X pattern electrodes 18 and Y pattern electrodes 28 that are adjacent in a planar view do not overlap with the connecting traces 52/53 in adjacent X pattern electrodes 18 and Y pattern electrodes 28. However, it is not necessarily required to form the trace cutaway parts 32/42 so that the traces 31/41 in the X pattern electrodes 18 and the Y pattern electrodes 28 that are adjacent in a planar view do not overlap with the connecting traces 52/53 in adjacent X pattern electrodes 18 and Y pattern electrodes 28.

Consequently, the same base pattern may be used in the above X pattern electrodes 18 and Y pattern electrodes 28, and patterns obtained by mutually rotating the same base pattern by 90 degrees (rotational movement) may be used.

Addition, in the sixth base pattern and the seventh base pattern, in order for the traces 31/41 and the connecting traces 52/53 to not overlap in a planar view, trace cutaway parts in which the portions overlapping with the connecting traces 52/53 in a planar view have been removed may be formed inside either one of the base patterns, or trace cutaway parts in which the portions overlapping with the connecting traces 52/53 in a planar view have been removed may be formed inside both of the base patterns.

Note that, although omitted from the description, as the foregoing description demonstrates, the present embodiment obviously may be modified similarly to Embodiment 3.

Also, likewise in Embodiments 1 to 3, the above X electrodes 17 and Y electrodes 27 may be configured to respectively include multiple connecting parts 19/29 (multiple connecting traces 52/53, multiple connection points) among adjacent X pattern electrodes 18 or Y pattern electrodes 28, as discussed above. In this case, trace cutaway parts 32/42 obviously may also be provided inside the X pattern electrodes 18 and the Y pattern electrodes 28 as discussed above, so that the traces 31/41 in X pattern electrodes 18 and Y pattern electrodes 28 that are adjacent in a planar view do not overlap with the connecting traces 52/53 in adjacent X pattern electrodes 18 and Y pattern electrodes 28.

Embodiment 5

Yet another embodiment of the present invention is described as follows on the basis of FIGS. 18(a) to 18(c) through FIG. 20. Note that in the present embodiment, the points that differ from Embodiments 1 to 4 will be described. Additionally, for the sake of convenience, structural elements having the same function as the structural elements used in Embodiments 1 to 4 are given the same signs, and description thereof will be reduced or omitted.

<Pattern Shape of X Pattern Electrode Part 12 and Y Pattern Electrode Part 22>

FIG. 18(a) is a plan view illustrating a pattern shape of the X pattern electrode part 12 and the Y pattern electrode part 22 when viewed from a direction perpendicular to the electrode sheet 2, FIG. 18(b) is a plan view illustrating a pattern shape of the X pattern electrode part 12 when viewed from a direction perpendicular to the electrode sheet 2, and FIG. 18(c) is a plan view illustrating a pattern shape of the Y pattern electrode part 22 when viewed from a direction perpendicular to the electrode sheet 2.

The X pattern electrodes 18 according to the present embodiment are made up of an eighth base pattern. Meanwhile, the Y pattern electrodes 28 according to the present embodiment are made up of a ninth base pattern.

Figure 19:
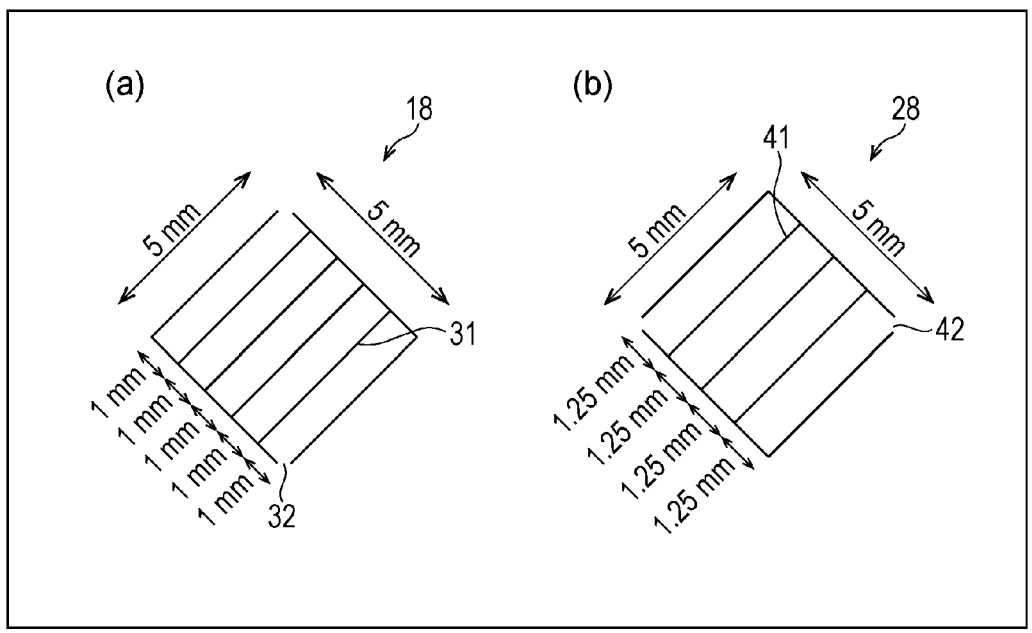
FIG. 19(a) is a plan view illustrating a pattern shape of X pattern electrodes according to Embodiment 5 of the present invention.
FIG. 19(b) is a plan view illustrating a pattern shape of Y pattern electrodes according to Embodiment 5 of the present invention.

FIG. 19(*a*) is a plan view illustrating a pattern shape of the X pattern electrodes 18, while FIG. 19(*b*) is a plan view illustrating a pattern shape of the Y pattern electrodes 28.

As illustrated in FIG. 19(*a*), the X pattern electrodes 18 internally include an electrode pattern periodically formed by traces 31. Also, as illustrated in FIG. 19(*b*), the Y pattern electrodes 28 internally include an electrode pattern periodically formed by traces 41.

The traces 31 are provided parallel to an edge of the eighth base pattern, so as to divide the eighth base pattern into multiple small lattices in a diagonal direction. Similarly, the traces 41 are provided parallel to an edge of the ninth base pattern, so as to divide the ninth base pattern into multiple small lattices in a diagonal direction.

In other words, whereas in Embodiments 1 to 3 the traces 31/41 have net-like patterns, the traces 31/41 according to the present embodiment have striped patterns.

Figure 18:
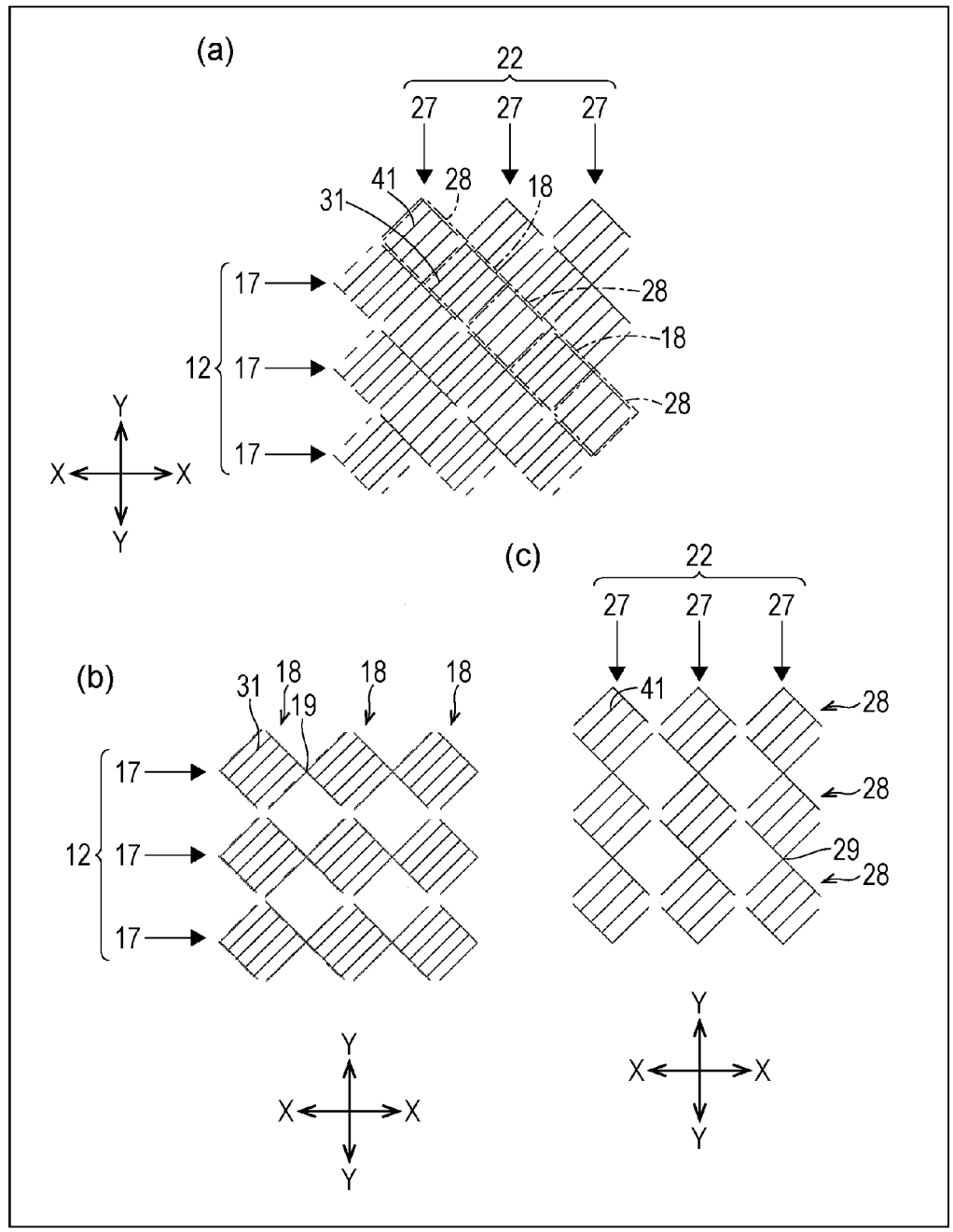
FIG. 18(a) is a plan view illustrating a pattern shape of an X pattern electrode part and a Y pattern electrode part when viewed from a direction perpendicular to an electrode sheet according to Embodiment 5 of the present invention.
FIG. 18(b) is a plan view illustrating a pattern shape of an X pattern electrode part when viewed from a direction perpendicular to the above electrode sheet.
FIG. 18(c) is a plan view illustrating a pattern shape of a Y pattern electrode part when viewed from a direction perpendicular to the above electrode sheet.

In the present embodiment, as illustrated in FIGS. 18(*b*) and 19(*a*), a lattice pattern (small lattices) made up of traces 31 arranged in the above striped pattern or a portion thereof is included as a 10th internal pattern inside the eighth base pattern.

Also, as illustrated in FIGS. 18(*c*) and 19(*b*), a lattice pattern (small lattices) made up of traces 41 arranged in the above striped pattern or a portion thereof is included as a 11th internal pattern inside the ninth base pattern.

Note that likewise in the present embodiment, the respective edges of the 10th and 11th internal patterns (small lattices) are tilted 45 degrees with respect to the X direction and the Y direction, respectively.

As illustrated in FIGS. 19(*a*) and 19(*b*), the outer shapes of the eighth and ninth base patterns are square with a 5 mm edge, the period of the 10th internal pattern is 1 mm, and the period of the 11th internal pattern is 1.25 mm.

Note that in the present embodiment, in a planar view, provided that the rightward direction of a straight line parallel to the X direction is taken to be 0 degrees, and an angle is defined in the counterclockwise direction, the period of the small lattices in a direction parallel to the 135-degree direction in the X pattern electrodes 18 is taken to be 1 mm, while the period of the small lattices in a direction parallel to 135 degrees in the Y pattern electrodes 28 is taken to be 1.25 mm. In other words, the 10th internal pattern is a rectangular lattice whose adjacent edges (two edges that form a right angle) are respectively 1 mm and 5 mm long, while the 11th internal pattern is a rectangular lattice whose adjacent edges (two edges that form a right angle) are respectively 1.25 mm and 5 mm long.

In addition, the line widths of the respective traces 31/41 constituting these patterns are set similarly to Embodiment 1.

In this way, according to the present embodiment, multiple 10th internal patterns respectively having the same shape (outer shape and size) are provided inside the X pattern electrodes 18, while multiple 11th internal patterns respectively having the same shape (outer shape and size) are provided inside the Y pattern electrodes 28. However, the lattice sizes are respectively different between the 10th internal pattern and the 11th internal pattern, and for this reason, the periods and shapes differ.

For this reason, likewise in the present embodiment, in an electrode sheet 2 in which an X pattern electrode part 12 and a Y pattern electrode part 22 are layered, as illustrated in FIG. 18(*a*), the X pattern electrodes 18 and the Y pattern electrodes 28 made up of traces 31/41 with mutually different periods become arranged so as to alternately repeat in a diagonal direction as multiple different electrode patterns in a planar view.

Figure 20:
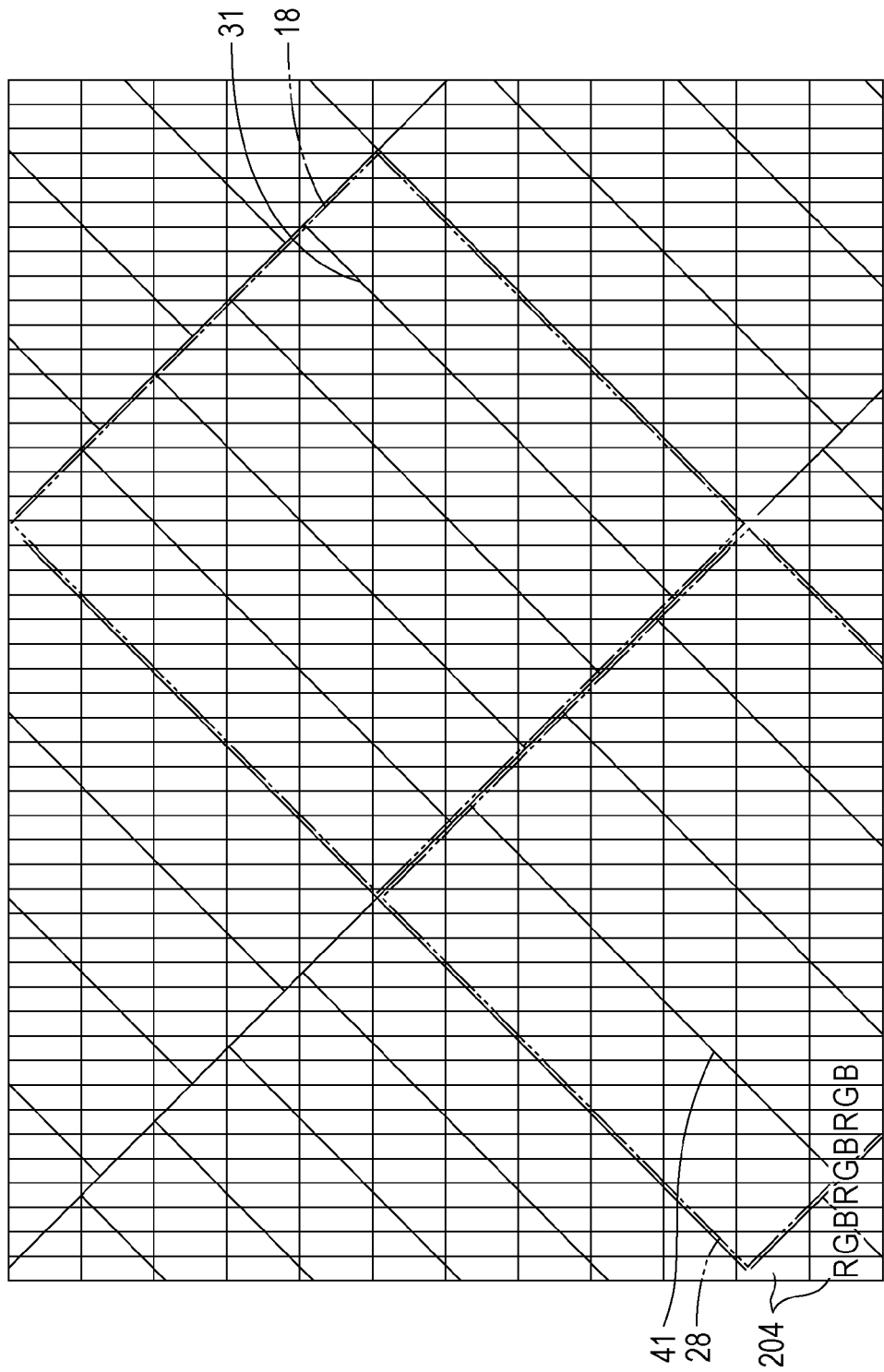
FIG. 20 is a plan view schematically illustrating the relationship between respective pixels of a display panel, and X pattern electrodes and Y pattern electrodes according to Embodiment 5 of the present invention.

Herein, FIG. 20 illustrates the relationship between respective pixels 204 of the display panel 201, and the X pattern electrodes 18 and the Y pattern electrodes 28. Note that FIG. 20 likewise illustrates as an example the case of using a 60" full HD liquid crystal panel as the display panel 201, in which pixels 204 of each of the colors R (red), G (green), and B (blue) are formed with a pixel pitch of 0.69225 mm×0.23075 mm.

According to the present embodiment, as illustrated in FIG. 20, the periodic directions of the small lattices made up of the traces 31/41 in the above X pattern electrodes 18 and Y pattern electrodes 28 are tilted 45 degrees with respect to the periodic directions of the pixels 204 of the display panel 201, and furthermore, the periods differ from each other.

Consequently, likewise in the present embodiment, even if the X pattern electrodes 18 and the Y pattern electrodes 28 interfere with the pixels 204 of the display panel 201, the moiré fringes produced by interference between the X pattern electrodes 18 and the pixels 204, and the moiré fringes produced by interference between the Y pattern electrodes 28 and the pixels 204, have respectively different periods and periodic directions of the moiré fringes. For this reason, continuous moiré fringes are not produced, and the moiré fringes are difficult to recognize.

For this reason, by using the above electrode sheet 2 as an electrode sheet for a touch panel, it is possible to realize a touch panel 100 and a display device 200 with excellent visibility and display quality.

Exemplary Modifications

Note that in the present embodiment, as illustrated in FIGS. 18(*a*) to 18(*c*) and FIGS. 19(*a*) to 19(*b*), trace cutaway parts 32/42 are provided just to ensure insulation between X pattern electrodes 18 that are adjacent in the Y direction, and also to ensure insulation between Y pattern electrodes 28 that are adjacent in the X direction. However, the present embodiment is not limited thereto.

Likewise in the present embodiment, similarly to Embodiments 1 to 4, the eighth base pattern and the ninth base pattern may also have perimeter parts formed in alternating broken line shapes so that the respective perimeter parts do not overlap in a planar view when the X pattern electrode part 12 (X pattern electrode layer) and the Y pattern electrode part 22 (Y pattern electrode layer) are layered. Consequently, similarly to Embodiments 1 to 3, it may be configured so that in the above X electrodes 17 and Y electrodes 27, overlapping traces do not exist in a planar view, except for the connecting parts 19/29 (connection points).

In addition, in the present embodiment, the period of the 10th internal pattern is taken to be 1 mm, while the period of the internal pattern of the 11th internal pattern is taken to be 1.25 mm. However, the reverse is also acceptable, and it is sufficient for the respective periods of the 10th internal pattern and the 11th internal pattern to differ.

Additionally, the present embodiment is likewise not limited to the above modification, and may also be modified similarly to Embodiments 1 to 4.

Embodiment 6

Figure 21:
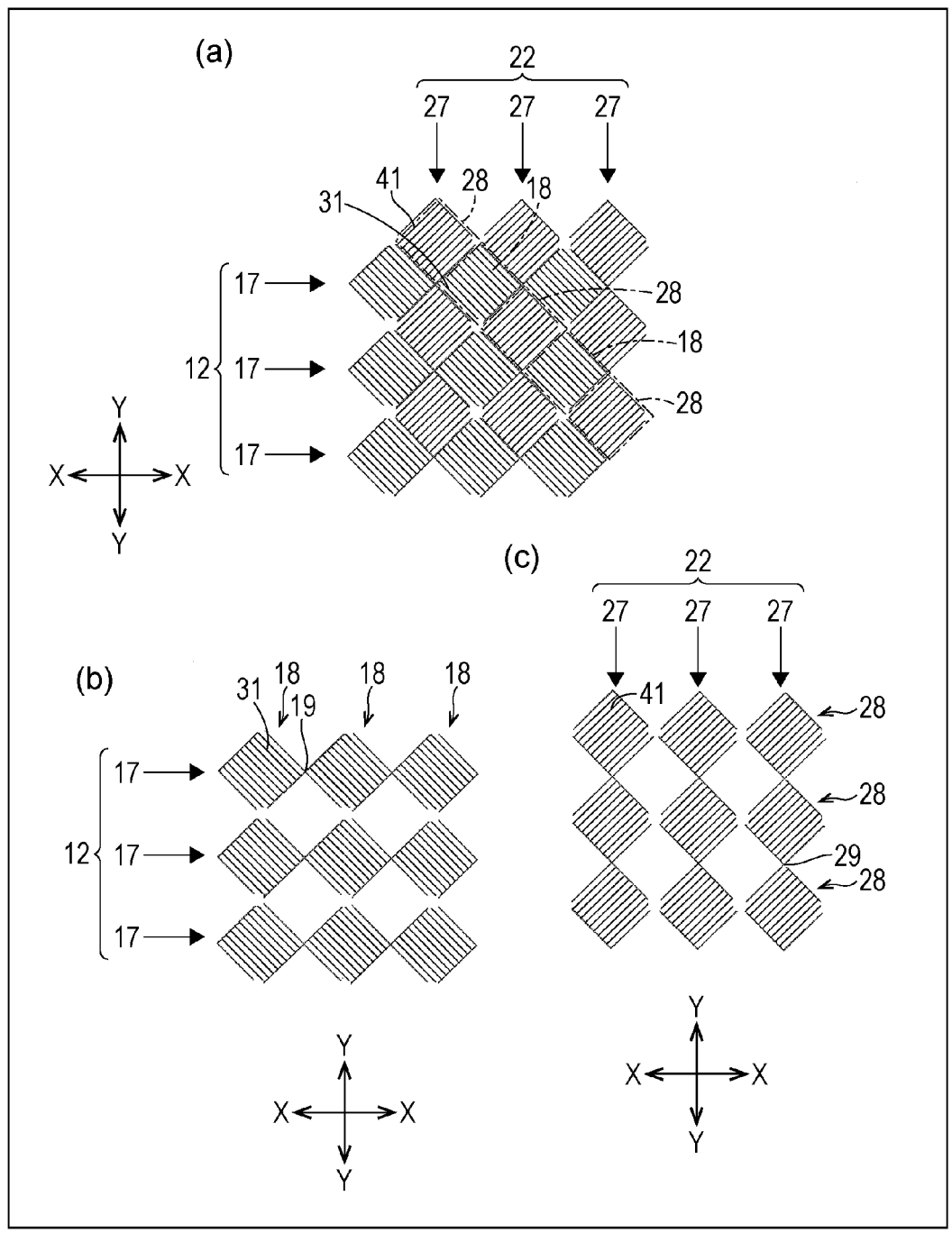
FIG. 21(a) is a plan view illustrating a pattern shape of an X pattern electrode part and a Y pattern electrode part when viewed from a direction perpendicular to an electrode sheet according to Embodiment 6 of the present invention, FIG.
FIG. 21(c) is a plan view illustrating a pattern shape of a Y pattern electrode part when viewed from a direction perpendicular to the above electrode sheet.

Yet another embodiment of the present invention is described as follows on the basis of FIGS. 21(*a*) to 21(*c*) through FIG. 24. Note that in the present embodiment, the points that differ from Embodiments 1 to 5 will be described. Additionally, for the sake of convenience, structural elements having the same function as the structural elements used in Embodiments 1 to 5 are given the same signs, and description thereof will be reduced or omitted.

<Pattern Shape of X Pattern Electrode Part 12 and Y Pattern Electrode Part 22>

FIG. 21(a) is a plan view illustrating a pattern shape of the X pattern electrode part 12 and the Y pattern electrode part 22 when viewed from a direction perpendicular to the electrode sheet 2, FIG. 21(b) is a plan view illustrating a pattern shape of the X pattern electrode part 12 when viewed from a direction perpendicular to the electrode sheet 2, and FIG. 21(c) is a plan view illustrating a pattern shape of the Y pattern electrode part 22 when viewed from a direction perpendicular to the electrode sheet 2.

The X pattern electrodes 18 according to the present embodiment are made up of a 10th base pattern. Meanwhile, the Y pattern electrodes 28 are made up of a pattern obtained by rotating the 10th base pattern by 90 degrees (rotational movement).

Figure 22:
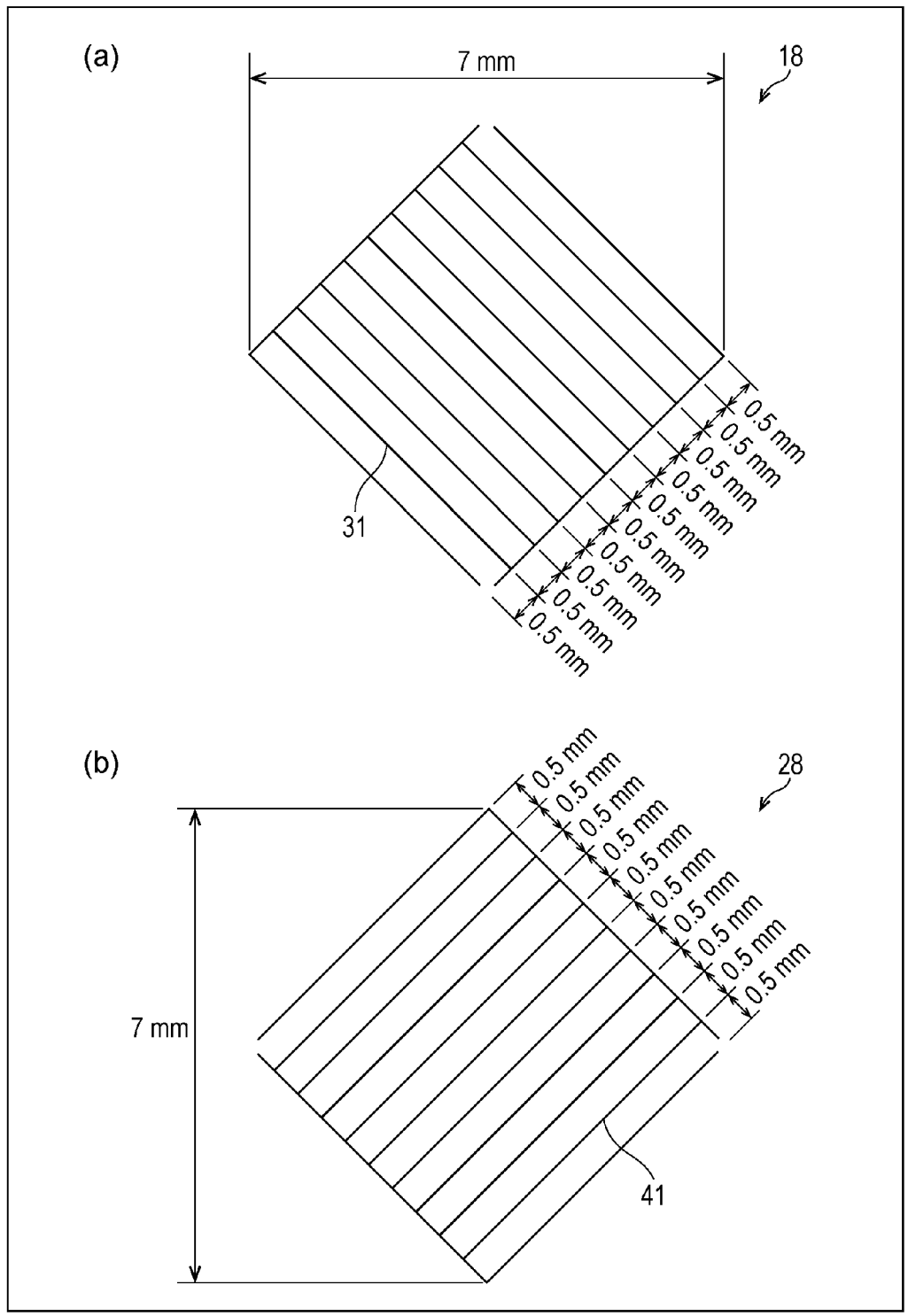
FIG. 22(a) is a plan view illustrating a pattern shape of X pattern electrodes according to Embodiment 6 of the present invention.
FIG. 22(b) is a plan view illustrating a pattern shape of Y pattern electrodes according to Embodiment 6 of the present invention.

FIG. 22(a) is a plan view illustrating a pattern shape of the X pattern electrodes 18, while FIG. 22(b) is a plan view illustrating a pattern shape of the Y pattern electrodes 28.

As illustrated in FIG. 22(a), the X pattern electrodes 18 internally include an electrode pattern periodically formed by traces 31. Also, as illustrated in FIG. 22(b), the Y pattern electrodes 28 internally include an electrode pattern periodically formed by traces 41.

As illustrated in FIGS. 22(a) and 22(b), in the present embodiment, the traces 31/41 likewise have a striped pattern, similarly to Embodiment 5.

Inside the 10th base pattern, rectangular lattice-shaped patterns (small lattices) or a portion thereof made up of the above traces 31 or 41 are formed as a 12th internal pattern.

Also, likewise in the present embodiment, the respective edges of the 12th internal pattern (small lattices), or in other words, the traces 31/41, are tilted 45 degrees with respect to the X direction and the Y direction, respectively.

However, the periodic directions of the internal patterns (that is, the diagonal directions of the traces 31/41) differ between the X pattern electrodes 18 and the Y pattern electrodes 28, as illustrated in FIGS. 21(a) to 21(c) and FIGS. 22(a) to 22(b).

As illustrated in FIGS. 22(a) and 22(b), the outer shape of the 10th base pattern is square with a diagonal length of 7 mm, and the period of the 12th internal pattern is 1 mm.

Also, in a planar view, provided that the rightward direction of a straight line parallel to the X direction is taken to be 0 degrees, and an angle is defined in the counterclockwise direction, the periodic direction of the X pattern electrodes 18 is taken to be a direction parallel to 45 degrees, while the periodic direction of the Y pattern electrodes 28 is taken to be a direction parallel to 135 degrees.

Note that the line widths of the respective traces 31/41 constituting these patterns are set similarly to Embodiment 1.

Figure 23:
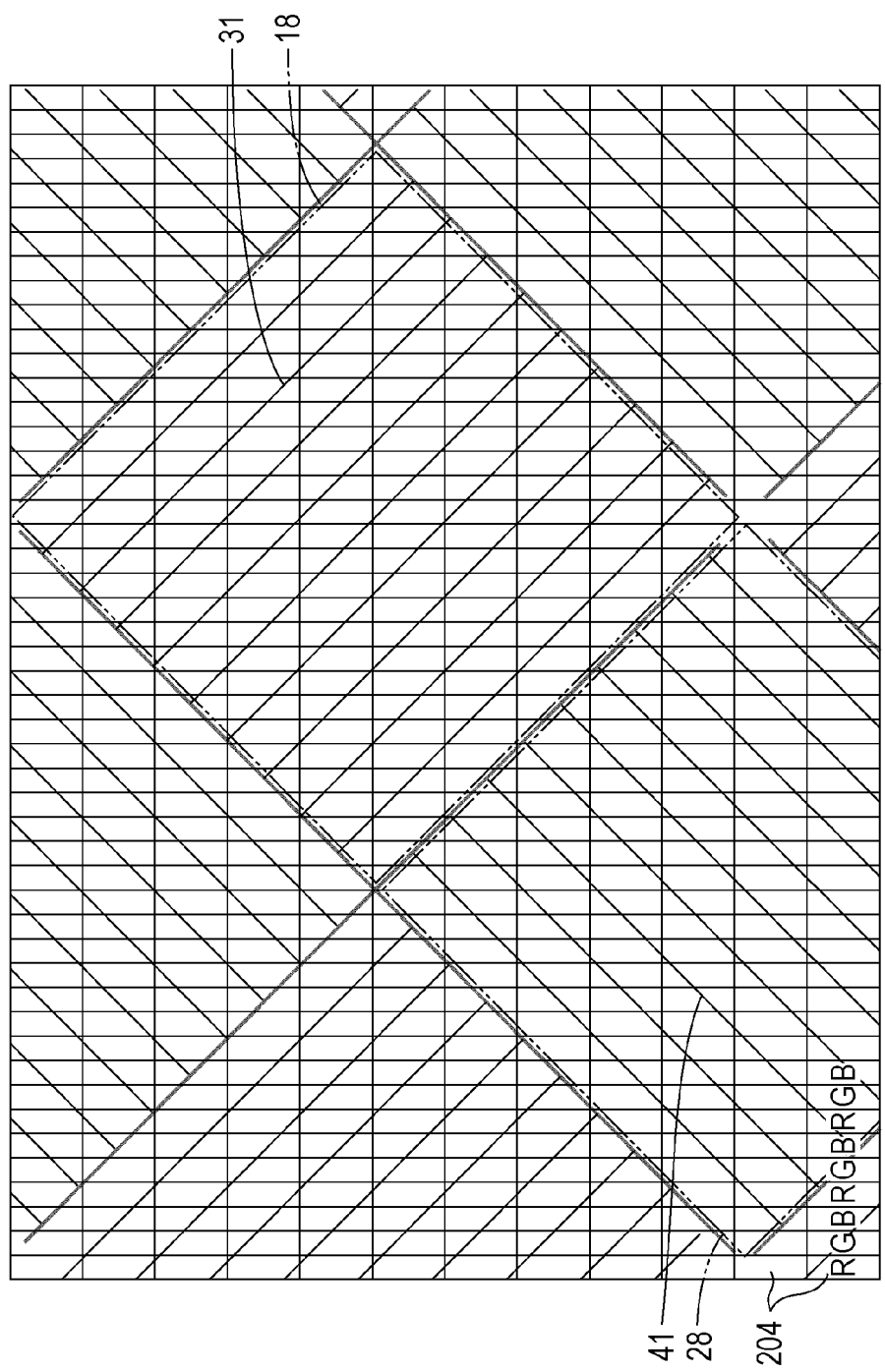
FIG. 23 is a plan view schematically illustrating the relationship between respective pixels of a display panel, and X pattern electrodes and Y pattern electrodes according to Embodiment 6 of the present invention.

Herein, FIG. 23 illustrates the relationship between respective pixels 204 of the display panel 201, and the X pattern electrodes 18 and the Y pattern electrodes 28. Note that FIG. 23 likewise illustrates as an example the case of using a 60" full HD liquid crystal panel as the display panel 201, in which pixels 204 of each of the colors R (red), G (green), and B (blue) are formed with a pixel pitch of 0.69225 mm×0.23075 mm.

According to the present embodiment, as illustrated in FIG. 23, the rectangular 12th internal pattern made up of striped traces 31/41 are arranged to repeat while being rotated 90 degrees so that the respective traces 31/41 are orthogonal, while in addition, the periodic directions thereof are tilted 45 degrees with respect to the periodic directions of the pixels 204 of the display panel 201.

Consequently, likewise in the present embodiment, even if the X pattern electrodes 18 and the Y pattern electrodes 28 interfere with the pixels 204 of the display panel 201, the moiré fringes produced by interference between the X pattern electrodes 18 and the pixels 204, and the moiré fringes produced by interference between the Y pattern electrodes 28 and the pixels 204, have respectively different periods and periodic directions of the moiré fringes. For this reason, continuous moiré fringes are not produced, and the moiré fringes are difficult to recognize.

For this reason, by using the above electrode sheet 2 as an electrode sheet for a touch panel, it is possible to realize a touch panel 100 and a display device 200 with excellent visibility and display quality.

Modification 1 of Pattern Shape of X Pattern Electrode Part 12 and Y Pattern Electrode Part 22

In the present embodiment, as described above, the Y pattern electrodes 28 are patterns obtained by rotating the X pattern electrodes 18 by 90 degrees. However, the present embodiment is not limited thereto, and the X pattern electrodes 18 and the Y pattern electrodes 28 may also have differing patterns.

In other words, in the present embodiment, the period of the traces 31/41 is the same, and only the tilt direction is changed, but as illustrated in Embodiment 5, the traces 31 and the traces 41 may also have mutually different periods.

For example, the 10th internal pattern and the 11th internal pattern in the eighth base pattern and the ninth base pattern described in Embodiment 5 may not only have different periods of the traces 31/41, but also have the tilt directions (extension directions) of the traces 31/41 mutually differ by 90 degrees so that the respective traces 31/41 are orthogonal. In so doing, synergistic effects make moiré fringes even more difficult to perceive.

Figure 24:
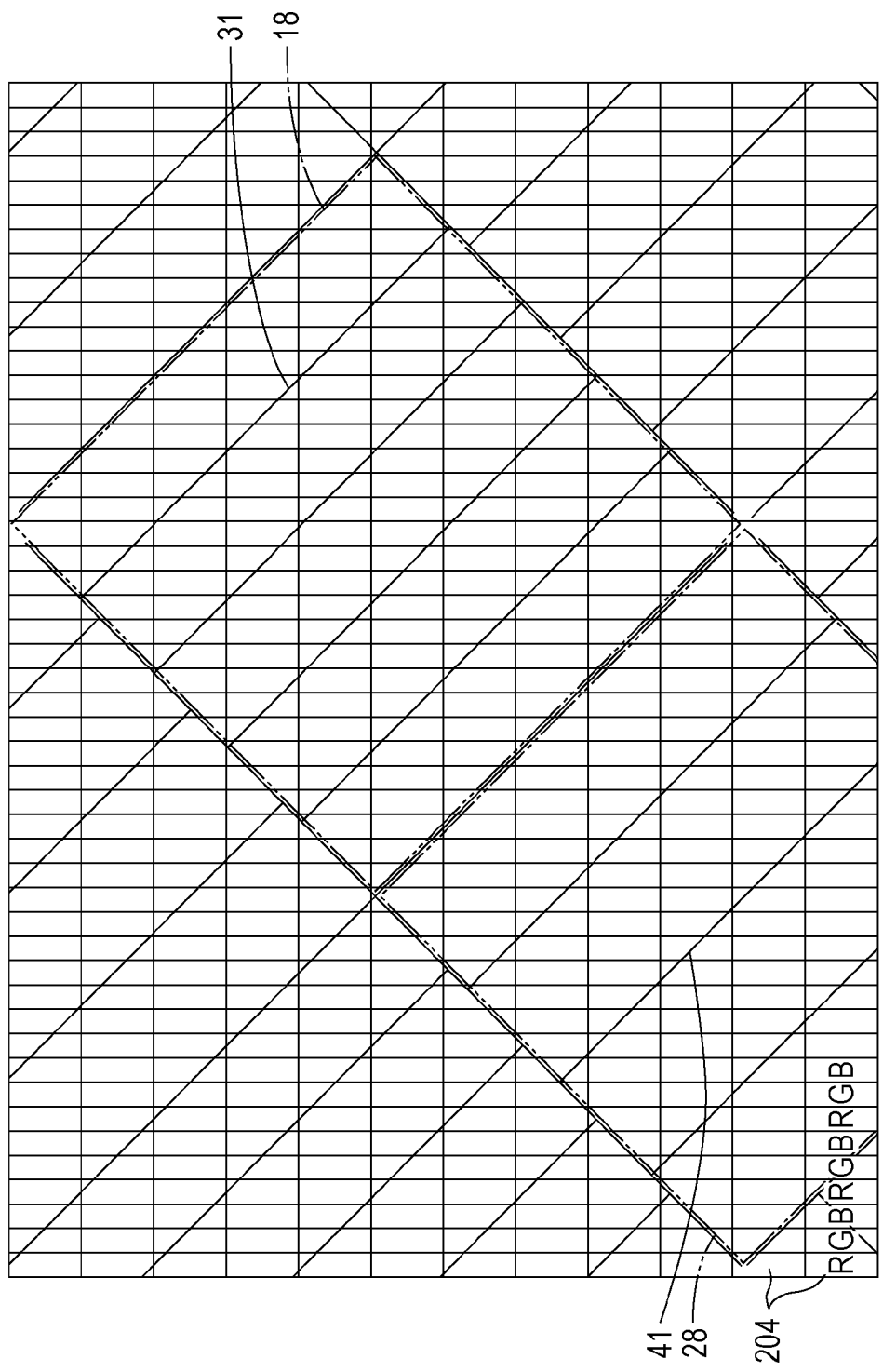
FIG. 24 is a plan view schematically illustrating the relationship between respective pixels of a display panel, and X pattern electrodes and Y pattern electrodes when using the electrode sheet described in an exemplary modification of Embodiment 6 of the present invention.

FIG. 24 is a plan view schematically illustrating the relationship between the respective pixels 204 of the display panel 201, and the X pattern electrodes 18 and Y pattern electrodes 28 when the X pattern electrodes 18 are configured with an 11th base pattern having a 13th internal pattern in which the tilt direction of the traces 31 differs by 90 degrees from the eighth base pattern so that the respective traces 31/41 are orthogonal in Embodiment 5.

In other words, the 11th base pattern is a square with a 5 mm edge, and the 13th internal pattern has a 1 mm period in a planar view, provided that the rightward direction of a straight line parallel to the X direction is taken to be 0 degrees, and an angle is defined in the counterclockwise direction.

In this way, by making the periodic directions as well as the periods of the internal patterns (traces 31/41) differ between the X pattern electrodes 18 and the Y pattern electrodes 28, it is possible to realize a touch panel 100 and a display device 200 with even more excellent visibility and display quality compared to the case in which only one of the periodic direction and period differs.

Modification 2 of Pattern Shape of X Pattern Electrode Part 12 and Y Pattern Electrode Part 22

In addition, in the present embodiment, as illustrated in FIGS. 21(a) to 21(c) and FIGS. 22(a) to 22(b), trace cutaway parts 32/42 are provided just to ensure insulation between X pattern electrodes 18 that are adjacent in the Y direction, and also to ensure insulation between Y pattern electrodes 28 that are adjacent in the X direction. However, the present embodiment is not limited thereto.

Likewise in the present embodiment, and similarly to Embodiment 3, for example, the 10th base pattern may also have perimeter parts formed in broken line shapes so that the perimeter parts do not overlap with the perimeter parts of the 10th base pattern rotated 90 degrees in a planar view when the X pattern electrode part 12 (X pattern electrode layer) and the Y pattern electrode part 22 (Y pattern electrode layer) are layered. In other words, in the 10th base pattern, the outermost traces (traces 31/41) may be formed so as to become alternating broken line shapes between adjacent X pattern electrodes 18 and Y pattern electrodes 28 (that is, between non-rotated patterns and 90-degree rotated patterns). Consequently, similarly to other embodiments, it may be configured so that in the above X electrodes 17 and Y electrodes 27, overlapping traces do not exist in a planar view, except for the connecting parts 19/29 (connection points).

Modification 3 of Pattern Shape of X Pattern Electrode Part 12 and Y Pattern Electrode Part 22

Also, in the present embodiment, the respective base patterns are taken to be square as discussed above, but likewise in the present embodiment, the shape (outer shape) of each base pattern is not limited thereto, and may be given various shapes, as described in Embodiment 1.

However, in the present embodiment, it is likewise desirable that the outer shape of each base pattern is a shape that becomes closely packed when the X pattern electrode part 12 and the Y pattern electrode part 22 are layered.

Also, in the present embodiment, as discussed above, the internal pattern of the X pattern electrodes 18 is parallel to an edge of each base pattern, and the internal pattern of the Y pattern electrodes 28 is configured to be orthogonal to the internal pattern of the X pattern electrodes 18. However, the configuration is not limited thereto, and since it is sufficient for both periodic directions to differ from each other, the respective internal patterns are not necessarily required to be parallel to an edge of each base pattern. Also, the X pattern electrodes 18 and the Y pattern electrodes 28 may also include three or more types of internal patterns.

Additionally, the present embodiment is likewise not limited to the above modification, and may also be modified similarly to Embodiments 1 to 5.

Embodiment 7

Yet another embodiment of the present invention is described as follows on the basis of FIGS. 25(a) to 25(c) through FIG. 27. Note that in the present embodiment, the points that differ from Embodiments 1 to 6 will be described. Additionally, for the sake of convenience, structural elements having the same function as the structural elements used in Embodiments 1 to 6 are given the same signs, and description thereof will be reduced or omitted.

<Pattern Shape of X Pattern Electrode Part 12 and Y Pattern Electrode Part 22>

Figure 25:
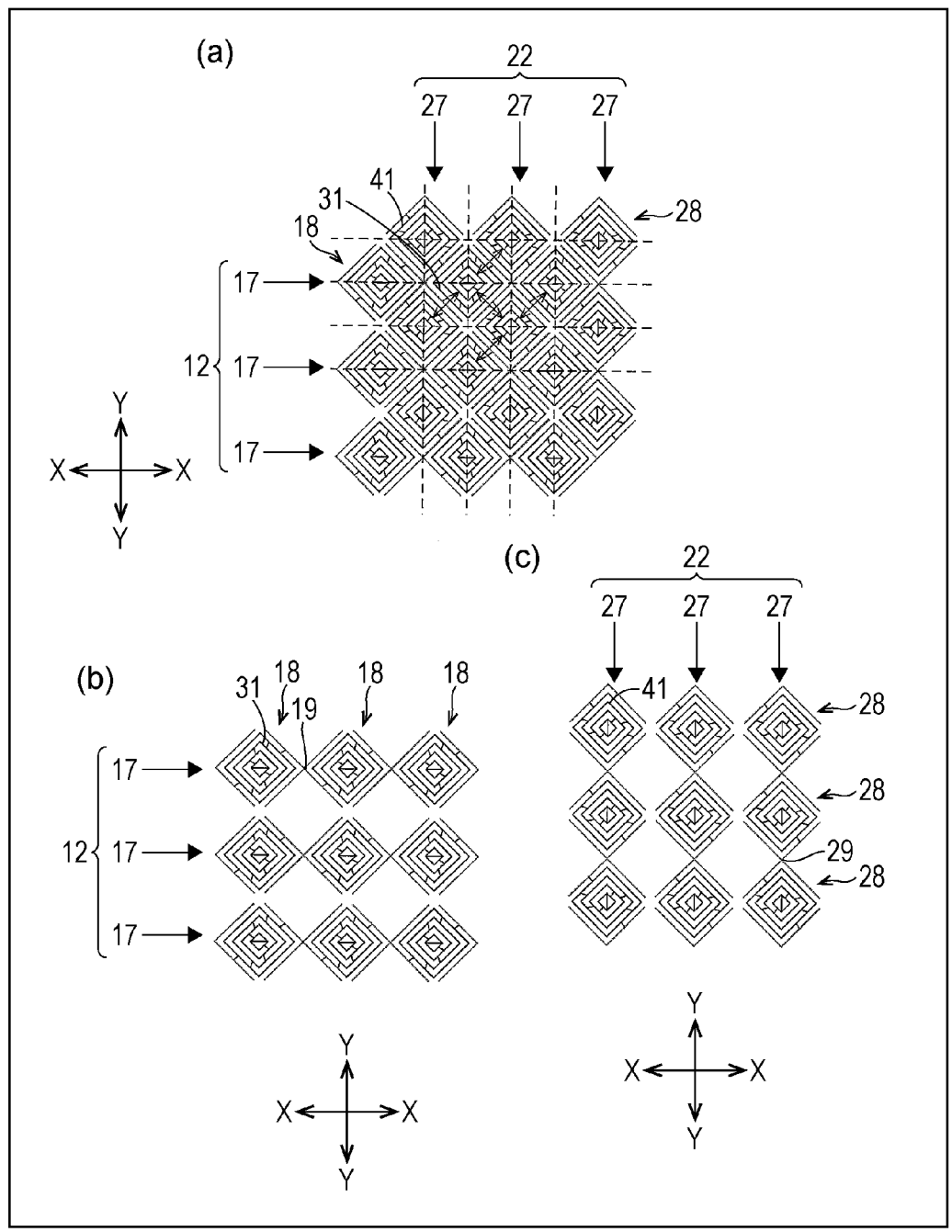
FIG. 25(a) is a plan view illustrating a pattern shape of an X pattern electrode part and a Y pattern electrode part when viewed from a direction perpendicular to an electrode sheet according to Embodiment 7 of the present invention.
FIG. 25(b) is a plan view illustrating a pattern shape of an X pattern electrode part when viewed from a direction perpendicular to the above electrode sheet.
FIG. 25(c) is a plan view illustrating a pattern shape of a Y pattern electrode part when viewed from a direction perpendicular to the above electrode sheet.

FIG. 25(a) is a plan view illustrating a pattern shape of the X pattern electrode part 12 and the Y pattern electrode part 22 when viewed from a direction perpendicular to the electrode sheet 2, FIG. 25(b) is a plan view illustrating a pattern shape of the X pattern electrode part 12 when viewed from a direction perpendicular to the electrode sheet 2, and FIG. 25(c) is a plan view illustrating a pattern shape of the Y pattern electrode part 22 when viewed from a direction perpendicular to the electrode sheet 2.

The X pattern electrodes 18 according to the present embodiment are made up of a 12th base pattern. Meanwhile, the Y pattern electrodes 28 are made up of a pattern obtained by rotating the 12th base pattern by 90 degrees (rotational movement).

Figure 26:
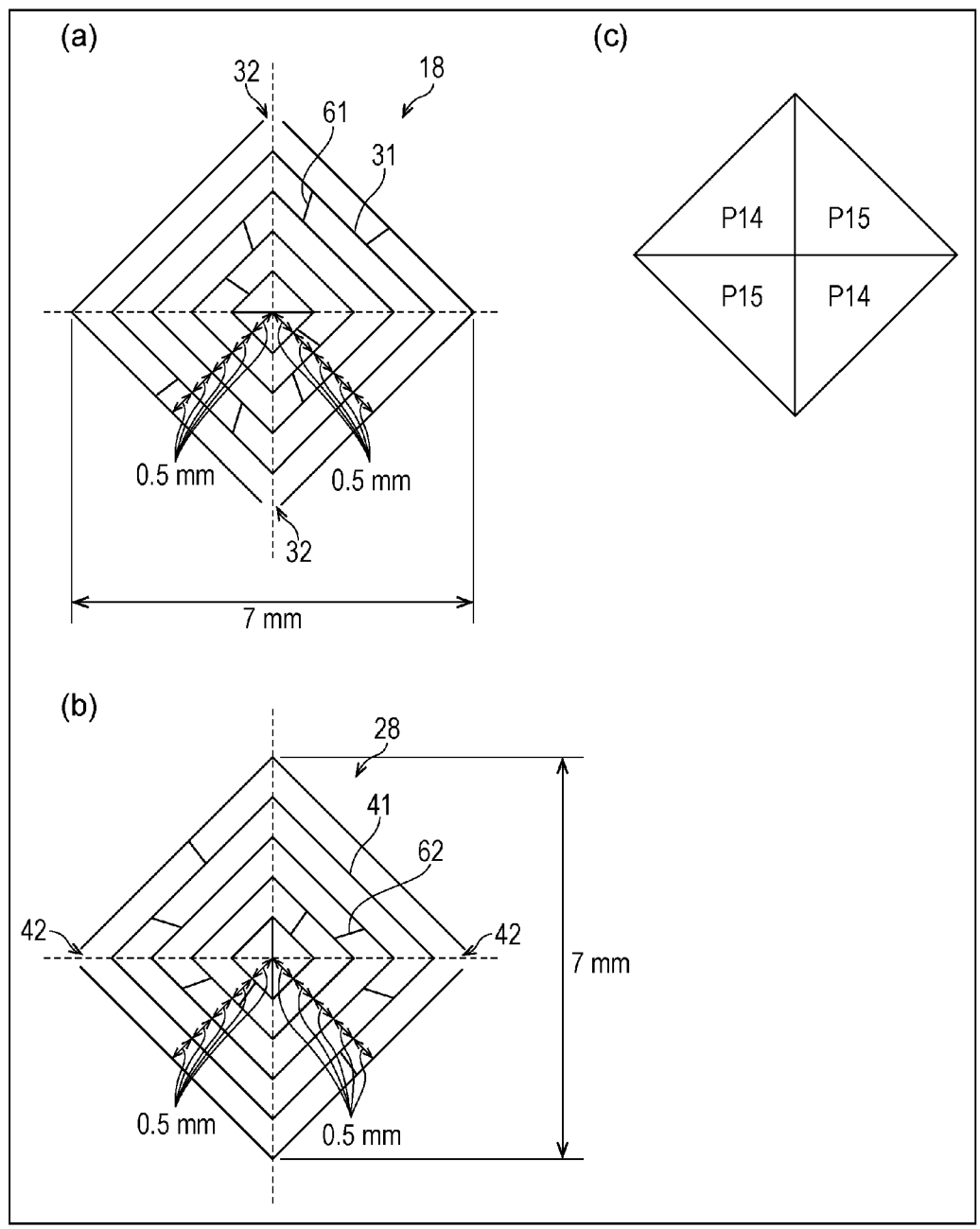
FIG. 26(a) is a plan view illustrating a pattern shape of X pattern electrodes according to Embodiment 7 of the present invention.
FIG. 26(b) is a plan view illustrating a pattern shape of Y pattern electrodes according to Embodiment 7 of the present invention.

FIG. 26(a) is a plan view illustrating a pattern shape of the X pattern electrodes 18, FIG. 26(b) is a plan view illustrating a pattern shape of the Y pattern electrodes 28, and FIG. 26(c) is a plan view illustrating an internal pattern arrangement in the X pattern electrodes 18 and the Y pattern electrodes 28.

As illustrated in FIG. 26(a), the X pattern electrodes 18 internally include an electrode pattern periodically formed by traces 31. Also, as illustrated in FIG. 26(b), the Y pattern electrodes 28 internally include an electrode pattern periodically formed by traces 41.

The outer shape of the 12th base pattern is a square lattice, with each edge made up of a trace. Inside the 12th base pattern, there are formed multiple traces having a trace pattern parallel to one edge of the 12th base pattern, and a trace pattern parallel to an edge adjacent to the above one edge (that is, an edge extending in a different direction than the above one edge). Also, inside the 12th base pattern, joining traces that electrically join these traces are provided.

More specifically, the traces 31 provided inside the X pattern electrodes 18 respectively have geometrically similar shapes to the outer shape of the X pattern electrodes 18 (that is, the outer shape of the 12th base pattern), and are concentrically formed so as to have shapes that are successively reduced farther inward in the X pattern electrodes 18, while also be joined together by joining traces 61.

Also, the traces 41 provided inside the Y pattern electrodes 28 respectively have geometrically similar shapes to the outer shape of the Y pattern electrodes 28 (that is, the outer shape of the 12th base pattern), and are concentrically formed so as to have shapes that are successively reduced farther inward in the Y pattern electrodes 28, while also be joined together by joining traces 62.

For this reason, the 12th base pattern internally includes a periodic pattern having periodic directions in directions perpendicular to the outer traces forming the outer shape thereof.

For this reason, the 12th base pattern is equipped with two types of internal patterns arranged so as to quarter the 12th base pattern as illustrated by the broken lines in FIGS. 26(a) and 26(b), with mutually orthogonal periodic directions.

Hereinafter, in the 12th base pattern, provided that the rightward direction of a straight line parallel to the X direction is taken to be 0 degrees, and an angle is defined in the counterclockwise direction in a planar view, the internal pattern whose periodic direction is in a direction parallel to 135 degrees will be designated the 14th internal pattern, while the internal pattern whose periodic direction is in a direction parallel to 45 degrees will be designated the 15th internal pattern. In FIG. 26(c), the 14th and 15th internal patterns are labeled P14 and P15 in order.

In this way, in the present embodiment, the X pattern electrodes 18 and the Y pattern electrodes 28 internally include multiple areas having 14th and 15th internal patterns as different electrode patterns, respectively.

For this reason, in an electrode sheet 2 in which an X pattern electrode part 12 and a Y pattern electrode part 22 are layered, as illustrated by the arrows in FIG. 25(a), the 14th internal pattern and 15th internal pattern with mutually different periodic directions become arranged so as to alternately repeat in the X direction and the Y direction as multiple different electrode patterns in a planar view.

Note that likewise in the present embodiment, the respective edges of the respective internal patterns provided in the 12th base pattern are parallel to the respective edges of the 12th base pattern, and are tilted 45 degrees with respect to the X direction and the Y direction, respectively.

As illustrated in FIGS. 26(a) and 26(b), the outer shape of the 12th base pattern is square with a diagonal length of 7 mm, and the period (trace interval) of the 14th and 15th internal patterns is each 0.5 mm.

Note that the line widths of the respective traces 31/41 constituting these patterns are set similarly to Embodiment 1.

Figure 27:
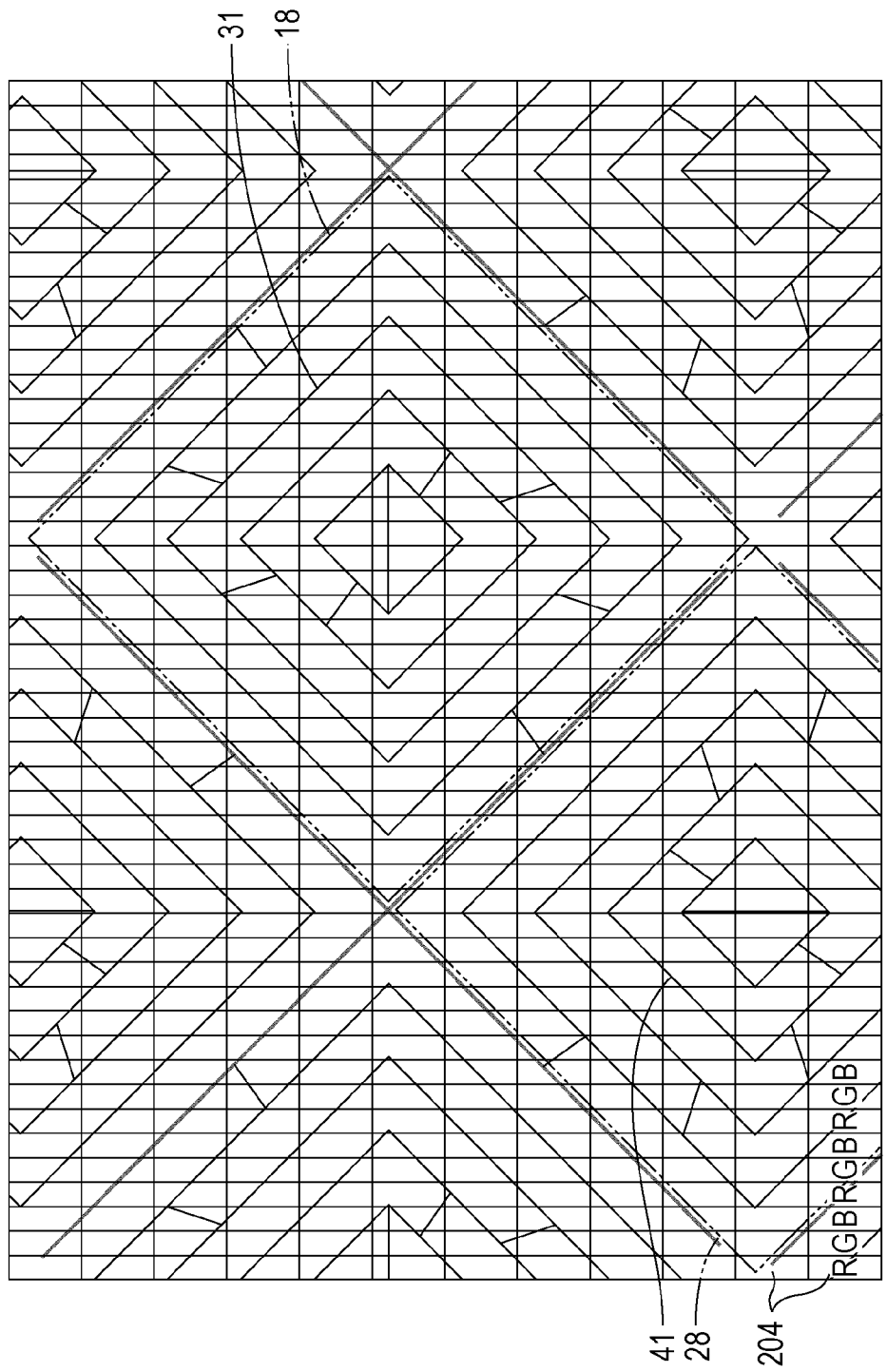
FIG. 27 is a plan view schematically illustrating the relationship between respective pixels of a display panel, and X pattern electrodes and Y pattern electrodes according to Embodiment 7 of the present invention.

Herein, FIG. 27 illustrates the relationship between respective pixels 204 of the display panel 201, and the X pattern electrodes 18 and the Y pattern electrodes 28. Note that FIG. 27 likewise illustrates as an example the case of using a 60" full HD liquid crystal panel as the display panel 201, in which pixels 204 of each of the colors R (red), G (green), and B (blue) are formed with a pixel pitch of 0.69225 mm×0.23075 mm.

According to the present embodiment, in the 12th base pattern, as illustrated in FIG. 26(a) and FIG. 27, mutually different 14th and 15th internal patterns whose periodic directions are mutually orthogonal are arranged so as to repeat in the X direction and Y direction, while in addition, the periodic directions thereof are tilted 45 degrees with respect to the periodic directions of the pixels 204 of the display panel 201.

Consequently, likewise in the present embodiment, even if the X pattern electrodes 18 and the Y pattern electrodes 28 interfere with the pixels 204 of the display panel 201, the moiré fringes produced by interference between the X pattern electrodes 18 and the pixels 204, and the moiré fringes produced by interference between the Y pattern electrodes 28 and the pixels 204, have respectively different periods and periodic directions of the moiré fringes. For this reason, continuous moiré fringes are not produced, and the moiré fringes are difficult to recognize.

Also, according to the present embodiment, inside the 12th base pattern, multiple traces 31 or traces 41 laid out so as to have geometrically similar shapes to the outer shape of the 12th base pattern are respectively arranged concentrically.

Consequently, inside the 12th base pattern, the traces 31/41 are provided in a uniform arrangement so as to spread out in an approximately radial manner, while in addition, the X pattern electrodes 18 and the Y pattern electrodes 28 have approximately matching trace patterns.

For this reason, according to the present embodiment, a uniform electric field/capacitance between the X electrodes 17 and the Y electrodes is formed. Consequently, by using the above electrode sheet 2 as an electrode sheet for a touch panel, the position detection precision of the touch panel 100 may be easily ensured.

For this reason, by using the above electrode sheet 2 as an electrode sheet for a touch panel, it is possible to realize a touch panel 100 and a display device 200 with excellent visibility and display quality as well as position detection precision.

Exemplary Modifications

Note that likewise in the present embodiment, the Y pattern electrodes 28 are taken to be patterns obtained by rotating the X pattern electrodes 18 by 90 degrees, but the present embodiment is not limited thereto. The X pattern electrodes 18 and the Y pattern electrodes 28 may also include different patterns.

In other words, although in the present embodiment the period of the traces 31/41 is the same, the traces 31 and the traces 41 may also have mutually different periods. In so doing, synergistic effects make moiré fringes even more difficult to perceive, similarly to Embodiment 6.

Also, likewise in the present embodiment, the outer shapes of the 12th base pattern are all taken to be square as discussed above, but the shape (outer shape) of the 12th base pattern is not limited thereto, and may be given various shapes, similarly to the other embodiments.

However, in the present embodiment, it is likewise desirable that the outer shape of the above 12th base pattern is a shape that becomes closely packed when the X pattern electrode part 12 and the Y pattern electrode part 22 are layered as discussed earlier.

In addition, in the present embodiment, the 14th and 15th internal patterns are taken to be parallel to respective edges of the 12th base pattern, but are not limited thereto. It is sufficient to form multiple areas with different periodic directions inside the 12th base pattern. Also, in the 12th base pattern, three or more types of differently shaped internal patterns may also be formed.

Also, likewise in the present embodiment, as illustrated in FIGS. 25(a) to 25(c) and FIGS. 26(a) to 26(b), trace cutaway parts 32/42 are provided just to ensure insulation between X pattern electrodes 18 that are adjacent in the Y direction, and also to ensure insulation between Y pattern electrodes 28 that are adjacent in the X direction. However, the present embodiment is not limited thereto.

Likewise in the present embodiment, the 12th base pattern may also have perimeter parts formed in broken line shapes so that the perimeter parts do not overlap with the perimeter parts of the 12th base pattern rotated 90 degrees in a planar view when the X pattern electrode part 12 (X pattern electrode layer) and the Y pattern electrode part 22 (Y pattern electrode layer) are layered. Consequently, similarly to other embodiments, it may be configured so that in the above X electrodes 17 and Y electrodes 27, overlapping traces do not exist in a planar view, except for the connecting parts 19/29 (connection points).

Additionally, the present embodiment is likewise not limited to the above modification, and the present embodiment likewise may be modified similarly to Embodiments 1 to 6.

Embodiment 8

Yet another embodiment of the present invention is described as follows on the basis of FIGS. 28(a) to 28(c) through FIG. 30. Note that in the present embodiment, the points that differ from Embodiments 1 to 7 will be described. Additionally, for the sake of convenience, structural elements having the same function as the structural elements used in Embodiments 1 to 7 are given the same signs, and description thereof will be reduced or omitted.

<Pattern Shape of X Pattern Electrode Part 12 and Y Pattern Electrode Part 22>

FIG. 28(a) is a plan view illustrating a pattern shape of the X pattern electrode part 12 and the Y pattern electrode part 22 when viewed from a direction perpendicular to the electrode sheet 2, FIG. 28(b) is a plan view illustrating a pattern shape of the X pattern electrode part 12 when viewed from a direction perpendicular to the electrode sheet 2, and FIG. 28(c) is a plan view illustrating a pattern shape of the Y pattern electrode part 22 when viewed from a direction perpendicular to the electrode sheet 2.

Figure 29:
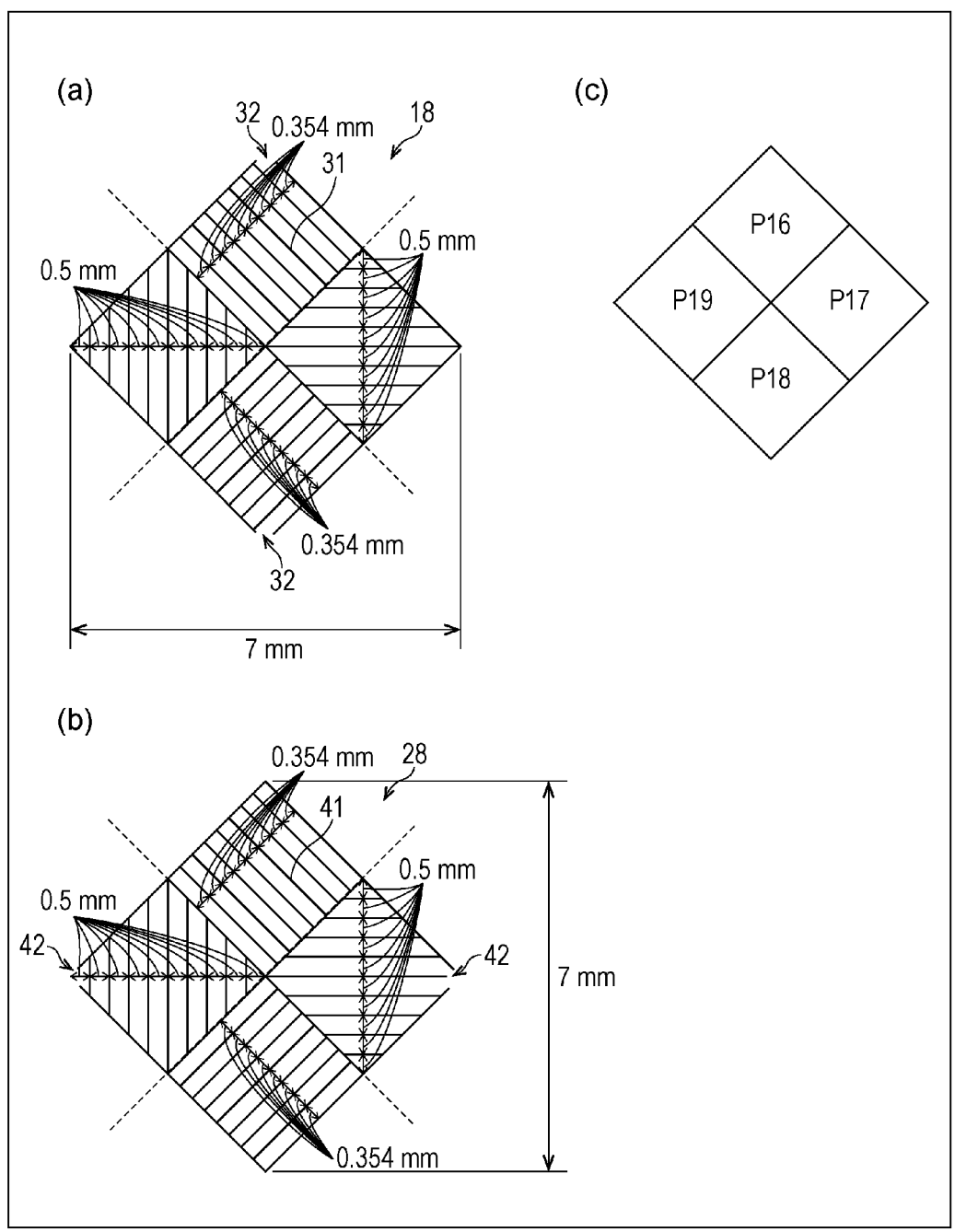
FIG. 29(a) is a plan view illustrating a pattern shape of X pattern electrodes according to Embodiment 8 of the present invention.
FIG. 29(b) is a plan view illustrating a pattern shape of Y pattern electrodes according to Embodiment 8 of the present invention.
FIG. 29(c) is a plan view illustrating an internal pattern arrangement in the X pattern electrodes and the Y pattern electrodes illustrated in FIGS. 29(a) and 29(b).

Also, FIG. 29(*a*) is a plan view illustrating a pattern shape of the X pattern electrodes 18, FIG. 29(*b*) is a plan view illustrating a pattern shape of the Y pattern electrodes 28, and FIG. 29(*c*) is a plan view illustrating an internal pattern arrangement in the X pattern electrodes 18 and the Y pattern electrodes 28.

The X pattern electrodes 18 and the Y pattern electrodes 28 according to the present embodiment are respectively made up of a 13th base pattern.

The 13th base pattern is equipped with four types of internal patterns arranged so as to quarter the 13th base pattern as illustrated by the broken lines in FIGS. 29(*a*) and 29(*b*), with mutually different periodic directions.

More specifically, the outer shape of the 13th base pattern is a square lattice, with each edge made up of a trace. Inside the 13th base pattern, there are formed multiple traces having a trace pattern parallel to one edge of the 13th base pattern, a trace pattern tilted 45 degrees with respect to the above one edge, a trace pattern parallel to an edge adjacent to the above one edge (that is, an edge extending in a different direction than the above one edge), and a trace pattern tilted 45 degrees with respect to the edge adjacent to the above one edge.

Hereinafter, in the 13th base pattern, provided that the rightward direction of a straight line parallel to the X direction is taken to be 0 degrees, and an angle is defined in the counterclockwise direction in a planar view, the internal pattern whose periodic direction is in a direction parallel to 135 degrees will be designated the 16th internal pattern, the internal pattern whose periodic direction is in a direction parallel to 0 degrees will be designated the 17th internal pattern, the internal pattern whose periodic direction is in a direction parallel to 45 degrees will be designated the 18th internal pattern, and the internal pattern whose periodic direction is in a direction parallel to 90 degrees will be designated the 19th internal pattern. In FIG. 29(*c*), the 16th to 19th internal patterns are labeled P16 to P19 in order.

In this way, in the present embodiment, the X pattern electrodes 18 and the Y pattern electrodes 28 internally include multiple areas having 16th to 19th internal patterns as different electrode patterns, respectively.

Figure 28:
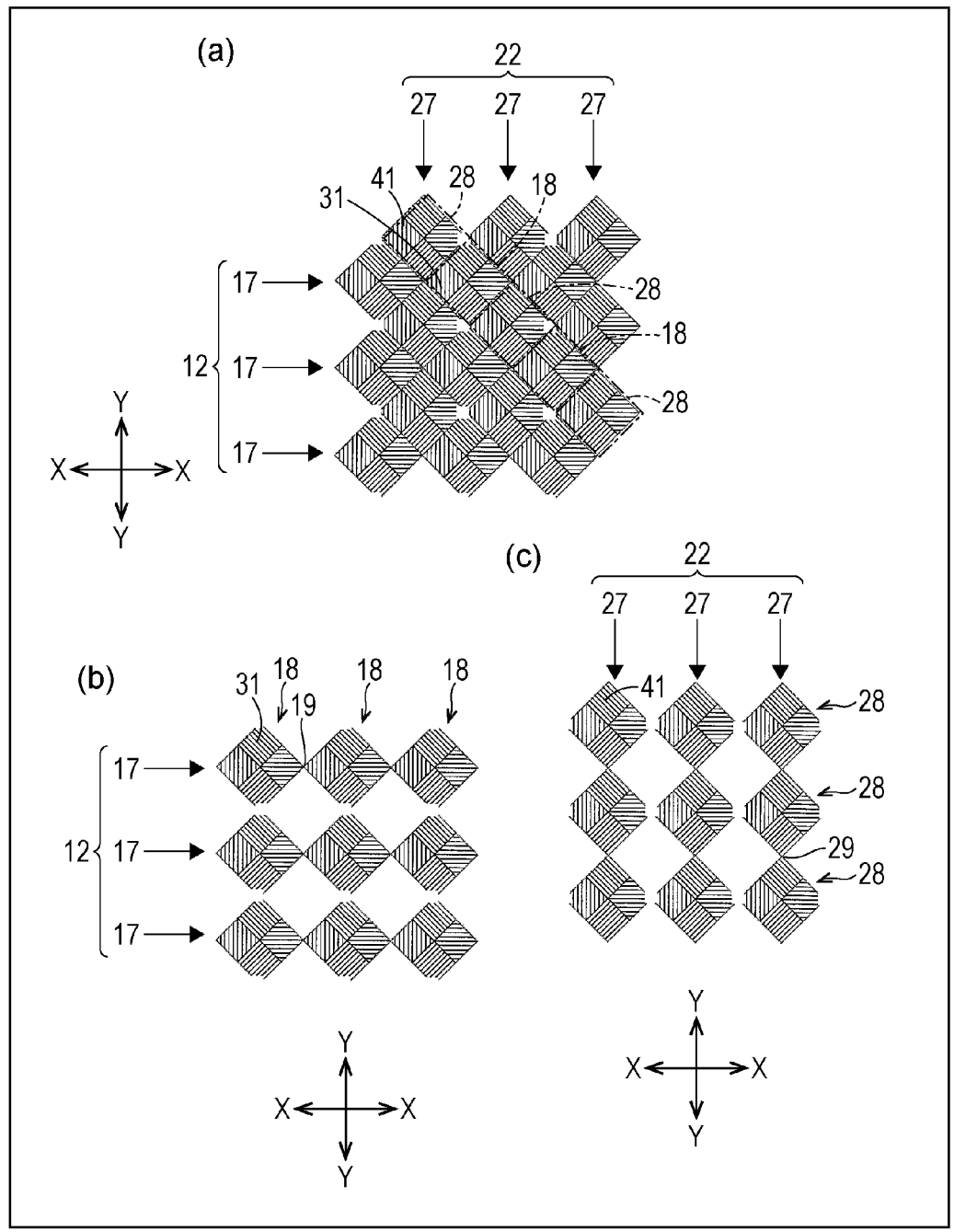
FIG. 28(a) is a plan view illustrating a pattern shape of an X pattern electrode part and a Y pattern electrode part when viewed from a direction perpendicular to an electrode sheet according to Embodiment 8 of the present invention.
FIG. 28(b) is a plan view illustrating a pattern shape of an X pattern electrode part when viewed from a direction perpendicular to the above electrode sheet.
FIG. 28(c) is a plan view illustrating a pattern shape of a Y pattern electrode part when viewed from a direction perpendicular to the above electrode sheet.

The X pattern electrodes 18 and the Y pattern electrodes 28 are all made up of the 13th base pattern, and as illustrated in FIGS. 28(*a*) to 28(*c*) and FIGS. 29(*a*) to 29(*b*), have exactly the same shape, except that trace cutaway parts 32 are provided in a corner in the Y direction of the 13th base pattern in order to ensure insulation between X pattern electrodes 18 that are adjacent in the Y direction, whereas trace cutaway parts 42 are provided in a corner in the X direction of the 13th base pattern in order to ensure insulation between Y pattern electrodes 28 that are adjacent in the X direction.

However, according to the present embodiment, since the four internal patterns that quarter the X pattern electrodes 18 and the Y pattern electrodes 28 all have mutually different patterns as discussed above, in an electrode sheet 2 formed by layering the X pattern electrode part 12 and the Y pattern electrode part 22, as illustrated in FIG. 28, the 16th to 19th internal patterns having mutually different periodic directions become respectively arranged so as to alternately repeat in the X direction, the Y direction, and the diagonal directions as multiple different electrode patterns in a planar view.

Note that likewise in the present embodiment, the respective edges of the respective internal patterns provided in the 13th base pattern are parallel to the respective edges of the 14th base pattern, and are tilted 45 degrees with respect to the X direction and the Y direction, respectively.

As illustrated in FIGS. 29(*a*) and 29(*b*), the outer shape of the 13th base pattern is square with diagonal length of 7 mm, the period (trace interval) of the 16th and 18th internal patterns is 0.354 mm for each, and the period (trace interval) of the 17th and 19th internal patterns is 0.5 mm for each. Note that the line widths of the respective traces 31/41 constituting these patterns are set similarly to Embodiment 1.

Figure 30:
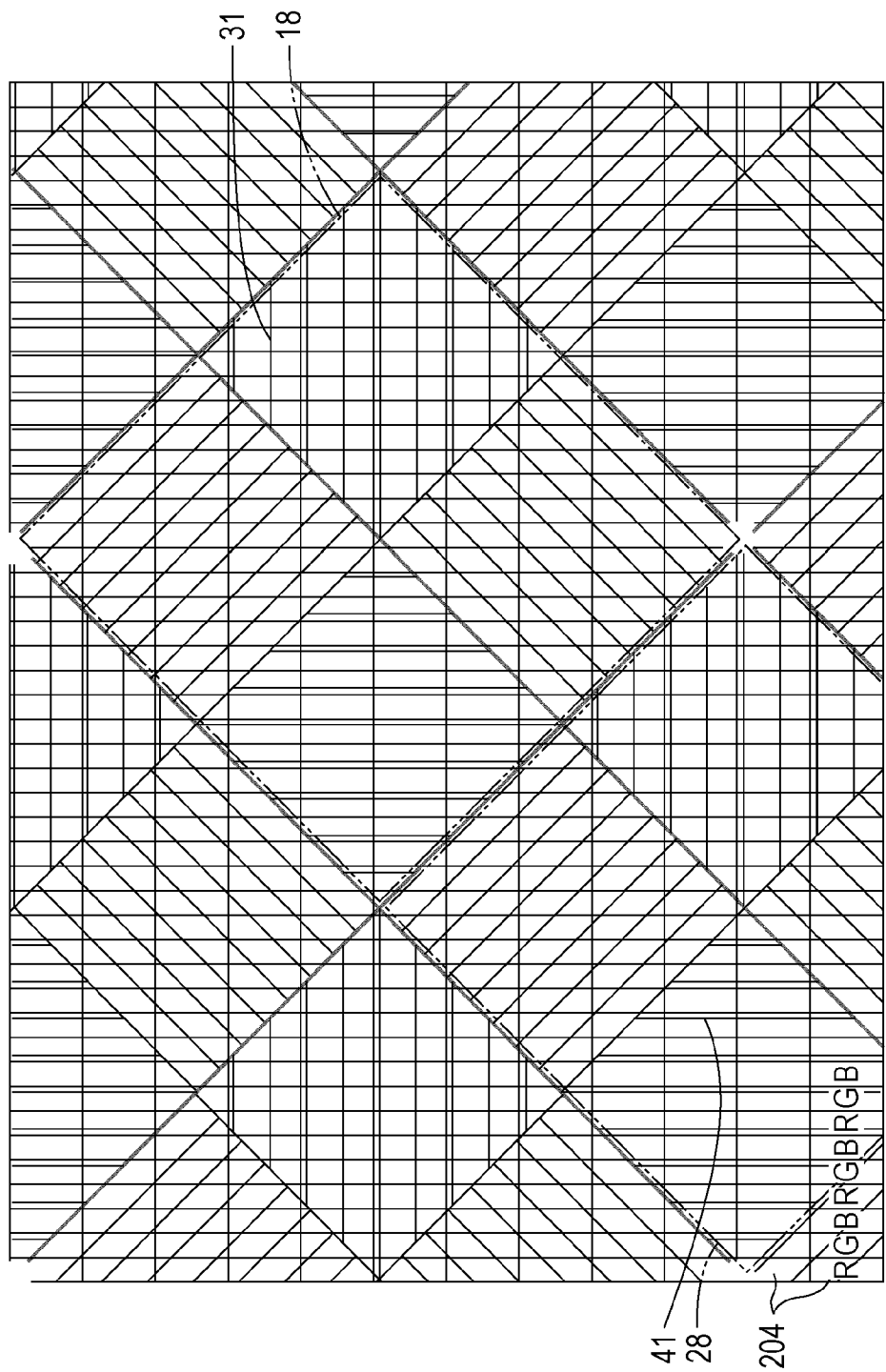
FIG. 30 is a plan view schematically illustrating the relationship between respective pixels of a display panel, and X pattern electrodes and Y pattern electrodes according to Embodiment 8 of the present invention.
Figure 31:
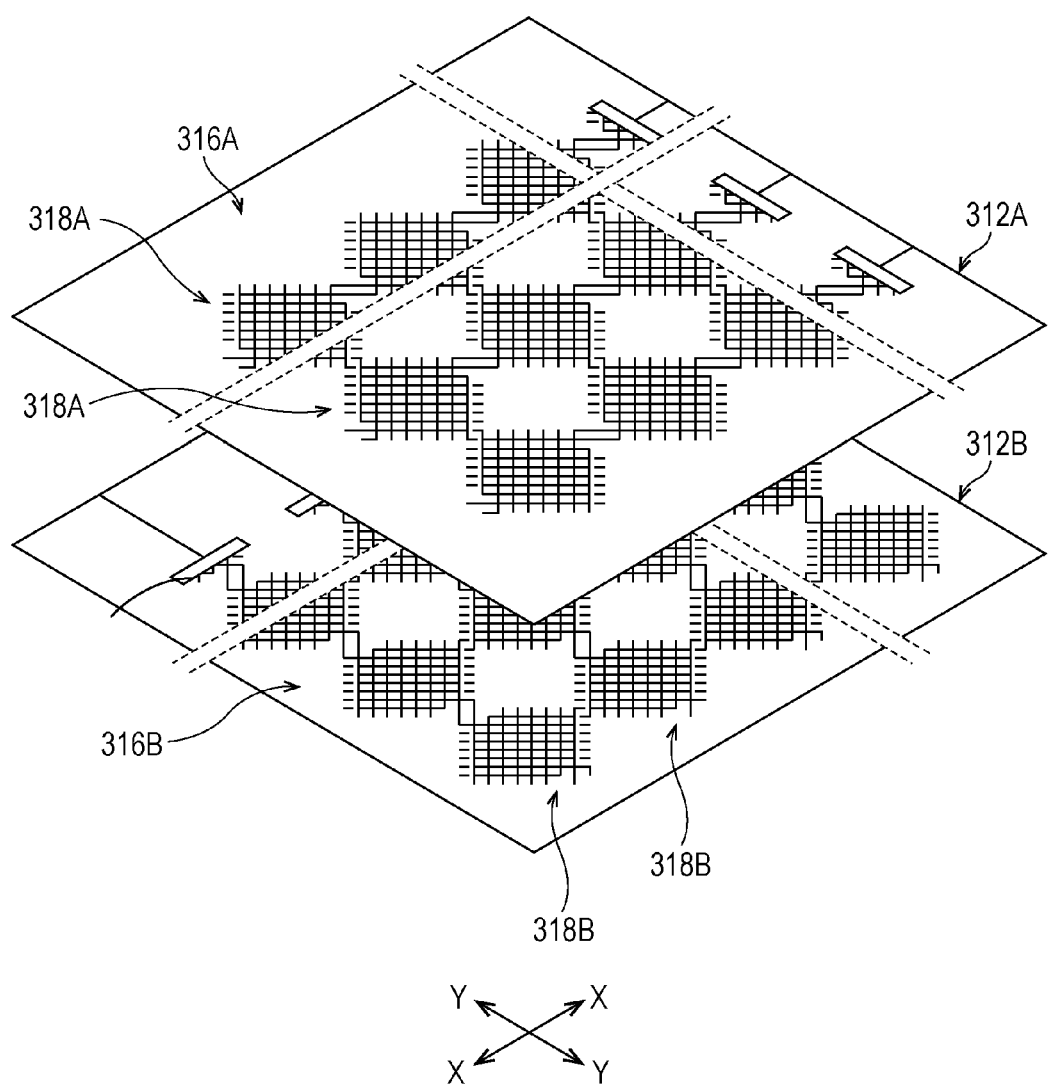
FIG. 31 is an exploded perspective view illustrating a general configuration of the principal part of a conducting sheet described in PTL 1.
Figure 32:
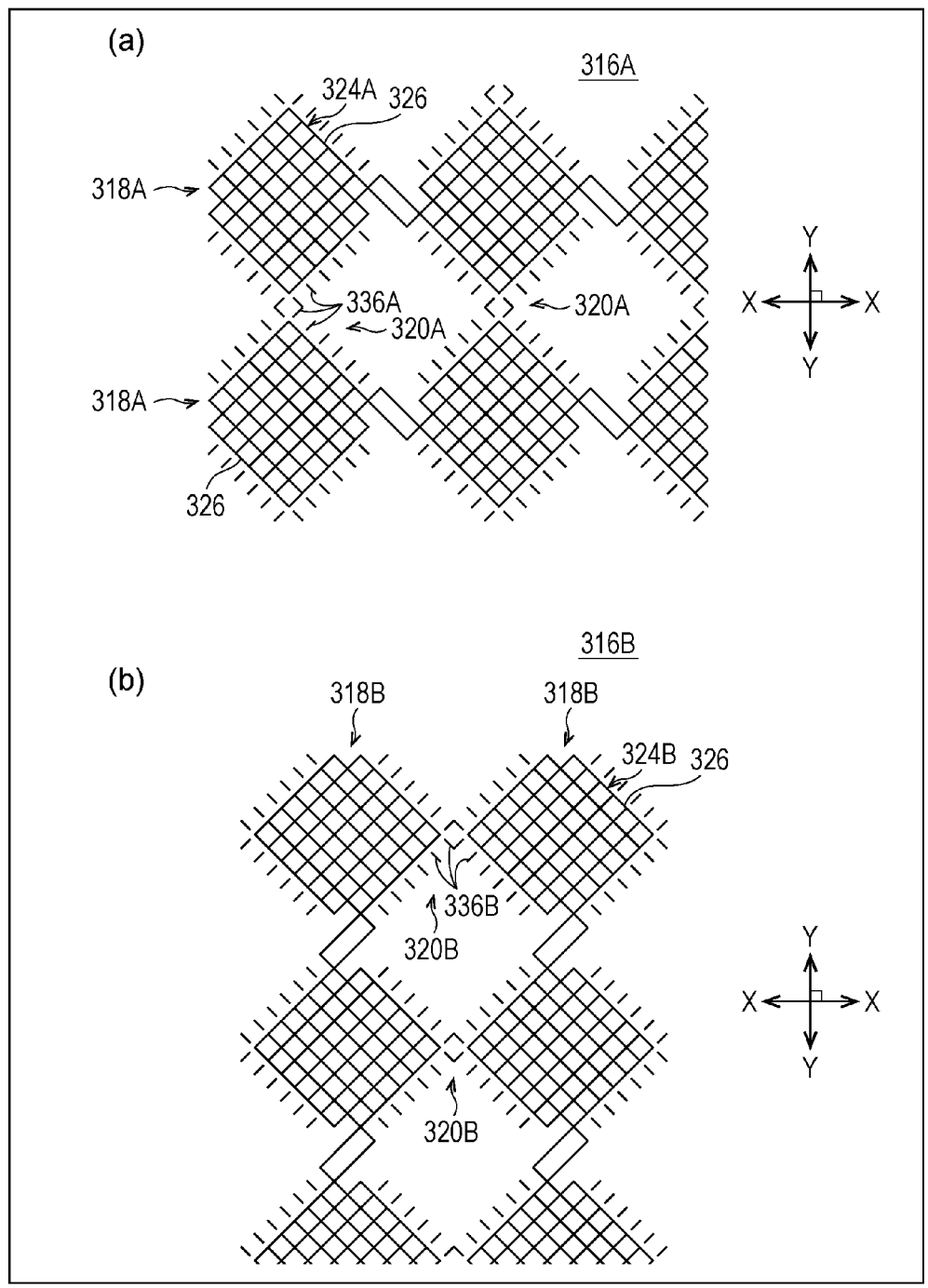
FIG. 32(a) is a plan view illustrating an example pattern of the first conducting part on the first transparent substrate illustrated in FIG. 31.
FIG. 32(b) is a plan view illustrating an example pattern of the second conducting part on the second transparent substrate illustrated in FIG. 31.
Figure 33:
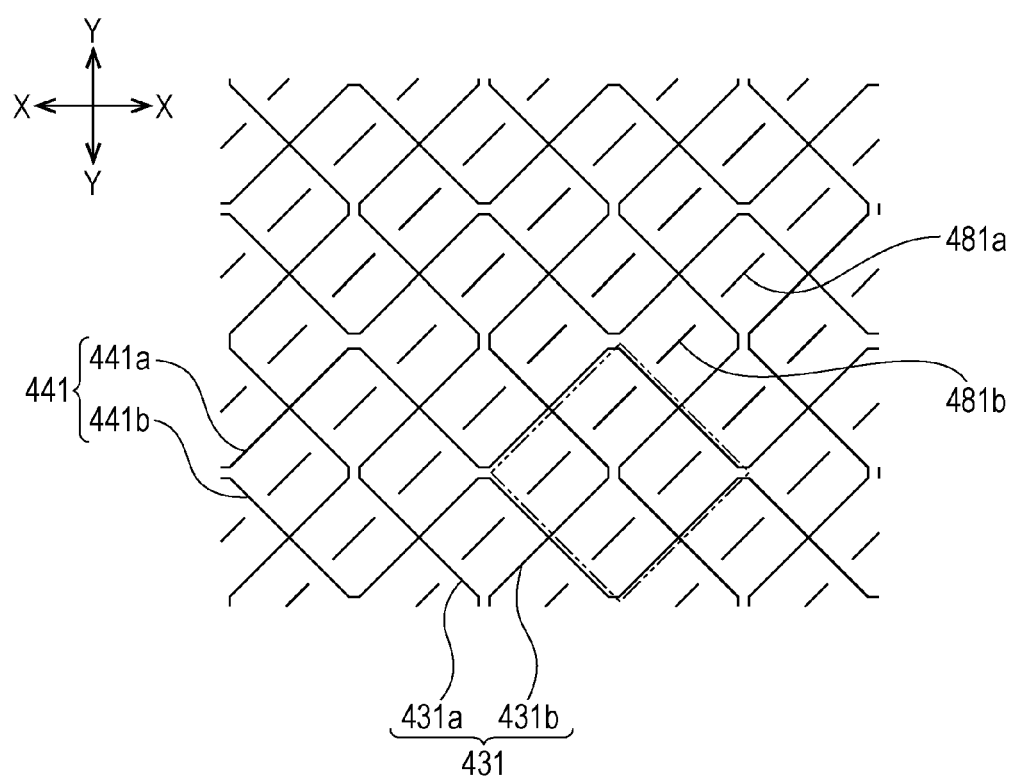
FIG. 33 is a plan view illustrating a general configuration of the principal part of a conducting sheet used in a touch panel described in PTL 7.
Figure 34:
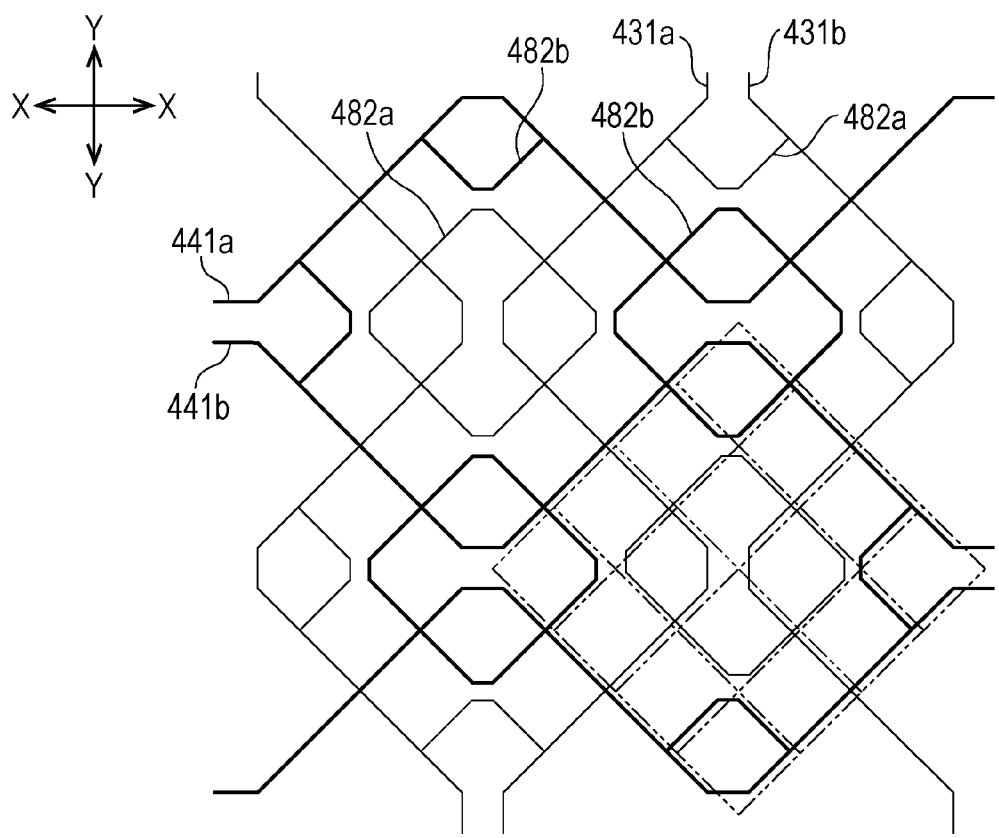
FIG. 34 is a plan view illustrating a general configuration of the principal part of another conducting sheet used in a touch panel described in PTL 7.

Herein, FIG. 30 illustrates the relationship between respective pixels 204 of the display panel 201, and the X pattern electrodes 18 and the Y pattern electrodes 28. Note that FIG. 30 likewise illustrates as an example the case of using a 60" full HD liquid crystal panel as the display panel 201, in which pixels 204 of each of the colors R (red), G (green), and B (blue) are formed with a pixel pitch of 0.69225 mm×0.23075 mm.

According to the present embodiment, in the 13th base pattern, as illustrated in FIG. 28(*a*) and FIG. 30, 16th to 19th internal patterns respectively tilted 45 degrees (periodic direction) away from each other are arranged so as to repeat in the X direction, the Y direction, and the diagonal directions, while in addition, the periodic directions thereof are tilted 45 degrees with respect to the periodic directions of the pixels 204 of the display panel 201.

Consequently, likewise in the present embodiment, even if the X pattern electrodes 18 and the Y pattern electrodes 28 interfere with the pixels 204 of the display panel 201, the moiré fringes produced by interference between the X pattern electrodes 18 and the pixels 204, and the moiré fringes produced by interference between the Y pattern electrodes 28 and the pixels 204, have respectively different periods and periodic directions of the moiré fringes. For this reason, continuous moiré fringes are not produced, and the moiré fringes are difficult to recognize.

In addition, according to the present embodiment, since the X pattern electrodes 18 and the Y pattern electrodes 28 are all the same and made up of a 13th base pattern that includes 16th to 19th internal patterns, the density of traces inside the base pattern is constant.

For this reason, according to the present embodiment, a uniform electric field/capacitance between the X electrodes 17 and the Y electrodes is formed. Consequently, by using the above electrode sheet 2 as an electrode sheet for a touch panel, the position detection precision of the touch panel 100 may be easily ensured.

For this reason, by using the above electrode sheet 2 as an electrode sheet for a touch panel, it is possible to realize a touch panel 100 and a display device 200 with excellent visibility and display quality as well as position detection precision.

Exemplary Modifications

Note that the present embodiment describes as an example a case in which the X pattern electrodes 18 and the Y pattern electrodes 28 are all the same and made up of a 13th base pattern that includes 16th to 19th internal patterns. However, the present embodiment is not limited thereto, and the X pattern electrodes 18 and the Y pattern electrodes 28 may also include different patterns.

For example, the periods (trace intervals) in the 16th to 19th internal patterns may be varied between the X pattern electrodes 18 and the Y pattern electrodes 28, or alternatively, the 16th to 19th internal patterns may all have different periods (trace intervals). Also, it may be configured such that only the electrodes in either the X pattern electrodes 18 or the Y pattern electrodes 28 internally include multiple electrode patterns as described above.

Also, likewise in the present embodiment, the outer shapes of the 13th base pattern are all taken to be square as discussed above, but the shape (outer shape) of the 13th base pattern is not limited thereto, and may be given various shapes, similarly to the other embodiments.

However, in the present embodiment, it is likewise desirable that the outer shape of the above 13th base pattern is a shape that becomes closely packed when the X pattern electrode part 12 and the Y pattern electrode part 22 are layered as discussed earlier.

Also, the internal patterns are not limited to the 16th to 19th internal patterns described above. It is sufficient for the internal patterns to have mutually different periodic directions.

Also, likewise in the present embodiment, the trace cutaway parts 32/42 described earlier are provided just to ensure insulation between X pattern electrodes 18 that are adjacent in the Y direction, and also to ensure insulation between Y pattern electrodes 28 that are adjacent in the X direction, as discussed earlier. However, the present embodiment is not limited thereto.

For example, in the 13th base pattern, the outer traces may be formed in a swastika or inverted swastika or the like, with the perimeter parts formed in alternating broken line shapes so that the respective perimeter parts do not overlap in a planar view when the X pattern electrode part 12 (X pattern electrode layer) and the Y pattern electrode part 22 (Y pattern electrode layer) are layered. Consequently, similarly to other embodiments, it may be configured so that in the above X electrodes 17 and Y electrodes 27, overlapping traces do not exist in a planar view, except for the connecting parts 19/29 (connection points).

Additionally, the present embodiment is likewise not limited to the above modification, and the present embodiment likewise may be modified similarly to Embodiments 1 to 7.

Conclusion

As above, an electrode sheet according to one mode of the present invention is an electrode sheet for a touch panel, comprising: (1) a first pattern electrode part in which first pattern electrode lines of first pattern electrodes multiply connected in a first direction are multiply arranged in a second direction orthogonal to the first direction; and (2) a second pattern electrode part in which second pattern electrode lines of second pattern electrodes multiply connected in the second direction are multiply arranged in the first direction; wherein in the first and the second pattern electrode parts, the second pattern electrode lines are provided between the first pattern electrode lines when viewed from a direction perpendicular to these pattern electrode parts, the first and the second pattern electrodes each internally include an electrode pattern periodically formed by traces, and multiple different electrode patterns are alternately arranged in a direction from among the first direction, the second direction, and a direction intersecting the first direction and the second direction when viewed from a direction perpendicular to the first and the second electrode parts.

According to the above configuration, in the case of using a display device overlaid with a touch panel using the above electrode sheet, for example, even if the first pattern electrodes and the second pattern electrodes interfere with pixels in the display device, the moiré fringes produced by interference between the first pattern electrodes and the pixels, and the moiré fringes produced by interference between the second pattern and the pixels, have respectively different periods and periodic directions of the moiré fringes.

For this reason, according to the above configuration, by alternately arranging multiple different electrode patterns in a direction from among the first direction, the second direction, and a direction intersecting the first direction and the second direction when viewed from a direction perpendicular to the first and the second electrode parts, continuous moiré fringes are not produced, and moiré fringes are not readily perceived.

Consequently, by using the above electrode sheet as an electrode sheet for a touch panel, the degradation of visibility and display quality due to moiré may be reduced compared to the related art. For this reason, a touch panel with better visibility and display quality than the related art, as well as a display device, may be realized.

In the above electrode sheet, the multiple different electrode patterns preferably have mutually different periods.

By making the multiple different electrode patterns have mutually different periods as described above, in the case of using a display device overlaid with a touch panel using the above electrode sheet, for example, even if the first pattern electrodes and the second pattern electrodes interfere with pixels in the display device, the moiré fringes produced by interference between the first pattern electrodes and the pixels, and the moiré fringes produced by interference between the second pattern and the pixels, have respectively different periods and periodic directions of the moiré fringes, as described above. For this reason, continuous moiré fringes are not produced, and moiré fringes are not readily perceived. Consequently, by using the above electrode sheet as an electrode sheet for a touch panel, the degradation of visibility and display quality due to moiré may be reduced compared to the related art.

In this case, traces inside the first and the second pattern electrodes may be arranged in a lattice shape, for example. Also, traces inside the first and the second pattern electrodes may be arranged in a striped shape, for example.

Additionally, the electrode patterns provided inside the first and the second pattern electrodes are preferably lattice-shaped, and in addition, the lattice sizes are preferably mutually different between the first pattern electrodes and the second pattern electrodes.

According to the above configuration, the period of the electrode pattern inside each pattern electrode differs between first pattern electrodes and second pattern electrodes that are adjacent to each other when viewed from a direction perpendicular to the first and the second pattern electrode parts. For this reason, since multiple different electrode patterns become alternately arranged when viewed from a direction perpendicular to the first and the second pattern electrode parts, continuous moiré fringes are not produced, and moiré fringes are not readily perceived. Consequently, by using the above electrode sheet as an electrode sheet for a touch panel, the degradation of visibility and display quality due to moiré may be reduced compared to the related art.

Additionally, the electrode patterns provided inside the first and the second pattern electrodes preferably include lattice-shaped electrode patterns whose periods differ between one edge and an edge in a direction perpendicular to the one edge, respectively.

According to the above configuration, the periods when viewed from a direction perpendicular to the first and the second pattern electrode parts may change depending on the direction. For this reason, electrode patterns that differ by having different periods may be easily alternately arranged when viewed from a direction perpendicular to the first and the second pattern electrode parts. Consequently, by using the above electrode sheet as an electrode sheet for a touch panel, the degradation of visibility and display quality due to moiré may be reduced compared to the related art.

In addition, the pattern electrodes of at least one of either the first or the second pattern electrodes preferably internally include lattice-shaped electrode patterns with multiple different sizes as the electrode pattern.

According to the above configuration, by arranging the first and the second pattern electrodes as described above, the above lattice-shaped electrode patterns with multiple different sizes may be periodically arranged.

For this reason, according to the above configuration, it is possible to obtain a configuration in which multiple different electrode patterns are alternately arranged when viewed from a direction perpendicular to the first and the second pattern electrode parts. Consequently, by using the above electrode sheet as an electrode sheet for a touch panel, the degradation of visibility and display quality due to moiré may be reduced compared to the related art.

Also, as described above, the second pattern electrode lines preferably include electrode patterns that are the same as electrode patterns obtained by rotating the first pattern electrode lines.

According to the above configuration, the density of traces inside each pattern electrode is constant between the first pattern electrode lines and the second pattern electrode lines.

For this reason, according to the above configuration, a uniform electric field/capacitance between the first pattern electrode lines and the second pattern electrode lines is formed. Consequently, by using the above electrode sheet as an electrode sheet for a touch panel, the position detection precision of the touch panel may be easily ensured. Consequently, according to the above configuration, a touch panel with higher visibility and display quality as well as better touch panel position detection precision compared to the related art, as well as a display device, may be provided.

In addition, the first and the second pattern electrode lines preferably respectively include multiple connecting parts between adjacent pattern electrodes.

In this way, by respectively providing multiple connecting parts among adjacent pattern electrodes, the occurrence of fabrication errors due to breaks in the patterns (that is, breaks in the traces) may be minimized. For this reason, an electrode sheet with excellent yield, as well as a touch panel and display device with excellent yield, may be obtained.

In addition, the multiple different electrode patterns preferably have mutually different periodic directions.

By making the multiple different electrode patterns have mutually different periodic directions, in the case of using a display device overlaid with a touch panel using the above electrode sheet, for example, even if the first pattern electrodes and the second pattern electrodes interfere with pixels in the display device, the moiré fringes produced by interference between the first pattern electrodes and the pixels, and the moiré fringes produced by interference between the second pattern and the pixels, have respectively different periods and periodic directions of the moiré fringes, as described above. For this reason, continuous moiré fringes are not produced, and moiré fringes are not readily perceived. Consequently, by using the above electrode sheet as an electrode sheet for a touch panel, the degradation of visibility and display quality due to moiré may be reduced compared to the related art.

Also, in the case in which the multiple different electrode patterns have both different periods and periodic directions, a synergistic effect makes moiré fringes even more difficult to perceive, and a touch panel with even better visibility and display quality, as well as a display device, may be realized.

In addition, the second pattern electrode lines preferably include electrode patterns that are the same as electrode patterns obtained by rotating the first pattern electrode lines.

In this case, since the density of traces is constant in the electrode patterns inside each pattern electrode line, a uniform electric field/capacitance is formed between the first electrode pattern lines and the second electrode pattern lines. Consequently, by using the above electrode sheet as an electrode sheet for a touch panel, the position detection precision of the touch panel may be easily ensured. Consequently, according to the above configuration, a touch panel with higher visibility and display quality as well as better touch panel position detection precision compared to the related art, as well as a display device, may be provided.

In addition, the electrode patterns provided inside the first pattern electrodes and the electrode patterns provided inside the second pattern electrodes preferably have mutually different periodic directions.

According to the above configuration, by arranging the first and the second pattern electrodes as described above, electrode patterns with mutually different periodic directions become alternately arranged when viewed from a direction perpendicular to the first and the second pattern electrode parts. For this reason, by using the above electrode sheet as an electrode sheet for a touch panel, the degradation of visibility and display quality due to moiré may be reduced compared to the related art.

In addition, preferably, the first and the second pattern electrodes are respectively rectangular, in the first pattern electrode lines, the multiple first pattern electrodes are respectively connected at a corner part of the first pattern electrodes, in the second pattern electrode lines, the multiple second pattern electrodes are respectively connected at a corner part of the second pattern electrodes, traces provided inside the first pattern electrodes are parallel to an edge of the first pattern electrodes, and traces provided inside the second pattern electrodes are parallel to an edge of the second pattern electrodes, and in addition, have a tilt direction that differs by 90 degrees from the traces provided inside the first pattern electrodes.

According to the above configuration, electrode patterns with mutually different periodic directions become alternately arranged when viewed from a direction perpendicular to the first and the second pattern electrode parts. For this reason, by using the above electrode sheet as an electrode sheet for a touch panel, the degradation of visibility and display quality due to moiré may be reduced compared to the related art.

In addition, the pattern electrodes of at least one of either the first or the second pattern electrodes preferably internally include multiple electrode patterns with different periodic directions as the electrode pattern.

According to the above configuration, by arranging the first and the second pattern electrodes as described above, the above multiple electrode patterns with different periodic directions may be periodically arranged.

For this reason, according to the above configuration, it is possible to obtain a configuration in which multiple different electrode patterns are alternately arranged when viewed from a direction perpendicular to the first and the second pattern electrode parts. Consequently, by using the above electrode sheet as an electrode sheet for a touch panel, the degradation of visibility and display quality due to moiré may be reduced compared to the related art.

In addition, preferably, the first and the second pattern electrodes are respectively rectangular, in the first pattern electrode lines, the multiple first pattern electrodes are respectively connected at a corner part of the first pattern electrodes, in the second pattern electrode lines, the multiple second pattern electrodes are respectively connected at a corner part of the second pattern electrodes, traces provided inside the first pattern electrodes respectively have geometrically similar shapes to an outer shape of the first pattern electrodes, having shapes that are successively reduced farther inward in the first pattern electrodes, and are joined to each other by joining traces, and traces provided inside the second pattern electrodes respectively have geometrically similar shapes to an outer shape of the second pattern electrodes, having shapes that are successively reduced farther inward in the second pattern electrodes, and are joined to each other by joining traces.

In this case, traces provided inside the first and the second pattern electrodes have respective periodic directions in directions perpendicular to the outer traces that form the outer shape of each pattern electrode.

For this reason, according to the above configuration, the first and the second pattern electrodes are internally equipped with multiple electrode patterns with different periodic directions, and by arranging the first and the second pattern electrodes as described above, electrode patterns with mutually different periodic directions become alternately arranged when viewed from a direction perpendicular to the first and the second pattern electrode parts. For this reason, by using the above electrode sheet as an electrode sheet for a touch panel, the degradation of visibility and display quality due to moiré may be reduced compared to the related art.

Moreover, according to the above configuration, traces are provided in a uniform arrangement so as to spread out in an approximately radial manner inside the first and the second pattern electrodes, while in addition, the first pattern electrodes and the second pattern electrodes have approximately matching trace patterns. For this reason, a uniform electric field/capacitance is formed between the first pattern electrode lines and the second pattern electrode lines. Consequently, by using the above electrode sheet as an electrode sheet for a touch panel, the position detection precision of the touch panel may be easily ensured.

For this reason, by using the above electrode sheet as an electrode sheet for a touch panel, a touch panel with excellent visibility and display quality as well as position detection precision, as well as a display device, may be realized.

In addition, preferably, the first and second pattern electrodes are respectively rectangular, in the first pattern electrode lines, the multiple first pattern electrodes are respectively connected at a corner part of the first pattern electrodes, in the second pattern electrode lines, the multiple second pattern electrodes are respectively connected at a corner part of the second pattern electrodes, and the pattern electrodes of at least one of either the first pattern electrodes or the second pattern electrodes respectively include four electrode patterns, and traces in each electrode pattern are tilted away from each other by 45 degrees.

According to the above configuration, electrode patterns with mutually different periodic directions become alternately arranged when viewed from a direction perpendicular to the first and second pattern electrode parts. For this reason, by using the above electrode sheet as an electrode sheet for a touch panel, the degradation of visibility and display quality due to moiré may be reduced compared to the related art.

In addition, in the first and the second pattern electrodes, overlapping traces preferably do not exist except at respective pattern electrode connecting parts when viewed from a direction perpendicular to the plane.

As a result, there does not occur the problem of the outermost (most peripheral) traces in the first and the second pattern electrodes overlapping or being adjacently placed along the directions in which the traces extend, thereby causing the apparent width of the traces to become larger (that is, become thicker lines) when viewed from a direction perpendicular to the first and the second pattern electrode parts, and consequently degrade visibility and display quality.

For example, preferably, the first pattern electrodes and the second pattern electrodes are provided neighboring each other with no gaps when viewed from a direction perpendicular to the first and the second pattern electrode parts, and alternating broken line shapes are formed at the respective perimeter parts of a first pattern electrode and a second pattern electrode that neighbor each other.

In addition, preferably, the first pattern electrodes and the second pattern electrodes are provided neighboring each other with no gaps when viewed from a direction perpendicular to the first and the second pattern electrode parts, while in addition, the first and the second pattern electrode lines respectively include multiple connecting parts made up of multiple connecting traces between adjacent pattern electrodes, alternating broken line shapes are formed at the respective perimeter parts of a first pattern electrode and a second pattern electrode that neighbor each other, and inside the pattern electrodes of at least one of either the first or the second pattern electrodes, trace cutaway parts are provided so that the traces inside the first and the second pattern electrodes do not overlap the connecting traces.

In addition, a touch panel according to one mode of the present invention is equipped with the electrode sheet according to the present invention.

By equipping the touch panel with the electrode sheet, moiré fringes become more difficult to perceive, and the degradation of visibility and display quality due to moiré may be reduced compared to the related art.

In addition, a display device according to one mode of the present invention is equipped with the touch panel according to the present invention.

By equipping the display device with the touch panel, moiré fringes become more difficult to perceive, and the degradation of visibility and display quality due to moiré may be reduced compared to the related art.

Note that the present invention is not limited to the embodiments discussed above, and various modifications are possible within the scope indicated by the claims. Embodiments obtained by appropriately combining the technical means respectively disclosed in different embodiments are also included within the technical scope of the present invention.

INDUSTRIAL APPLICABILITY

An electrode sheet of the present invention may be utilized in a touch panel used in a display device or the like, for example.

REFERENCE SIGNS LIST

1 protective layer
2 electrode sheet
3 sensor body
4 circuit unit
10 transparent electrode film
11 transparent film substrate
12 X pattern electrode part 13 sensor part
14 terminal line part
16 lead lines
17 X electrodes (first pattern electrode lines)
18 X pattern electrodes (first pattern electrodes)
19 connecting parts
20 transparent electrode film
21 transparent film substrate
22 Y pattern electrode part
23 sensor part
24 terminal line part
26 lead lines
27 Y electrodes (second pattern electrode lines)
28 Y pattern electrodes (second pattern electrodes)
29 connecting parts
31 traces
32 trace cutaway parts
41 traces
42 trace cutaway parts
51 gaps
52 connecting traces
53 connecting traces
61 joining traces
62 joining traces
100 touch panel
200 display device
201 display panel
202 display screen
203 bezel area
204 pixels

The invention claimed is:

1. An electrode sheet for a touch panel comprising:
a first pattern electrode part in which first pattern electrode lines of first pattern electrodes multiply connected in a first direction are multiply arranged in a second direction orthogonal to the first direction; and
a second pattern electrode part in which second pattern electrode lines of second pattern electrodes multiply connected in the second direction are multiply arranged in the first direction;
wherein in the first and second pattern electrode parts, the second pattern electrode lines are provided between the first pattern electrode lines when viewed from a direction perpendicular to these pattern electrode parts,
the first and second pattern electrodes each internally include an electrode pattern periodically formed by traces and lattice-shaped electrode patterns whose periods differ between one edge and an edge in a direction perpendicular to the one edge, respectively, and
multiple different electrode patterns are alternately arranged in a direction from among the first direction, the second direction, and a direction intersecting the first direction and the second direction when viewed from a direction perpendicular to the first and second electrode pattern parts, and the multiple different electrode patterns have mutually different periods.

2. The electrode sheet according to claim 1, wherein lattice sizes of the lattice-shaped electrode patterns are mutually different between the first pattern electrodes and the second pattern electrodes.

3. The electrode sheet according to claim 1, wherein the lattice-shaped electrode patterns of at least one of either the first or the second pattern electrodes internally include multiple different sizes as the electrode pattern.

4. The electrode sheet according to claim 1, wherein the second pattern electrode lines include electrode patterns that are the same as electrode patterns obtained by rotating the first pattern electrode lines.

5. The electrode sheet according to claim 1, wherein the first and second pattern electrode lines respectively include multiple connecting parts between adjacent pattern electrodes.

6. The electrode sheet according to claim 1, wherein the multiple different electrode patterns have mutually different periodic directions.

7. The electrode sheet according to claim 6, wherein the second pattern electrode lines include electrode patterns that are the same as electrode patterns obtained by rotating the first pattern electrode lines.

8. The electrode sheet according to claim 1, wherein the electrode patterns provided inside the first pattern electrodes and the electrode patterns provided inside the second pattern electrodes have mutually different periodic directions.

9. The electrode sheet according to claim 1, wherein the first and second pattern electrodes are respectively rectangular,
in the first pattern electrode lines, the first pattern electrodes are respectively connected at a corner part of the first pattern electrodes,
in the second pattern electrode lines, the second pattern electrodes are respectively connected at a corner part of the second pattern electrodes,
traces provided inside the first pattern electrodes are parallel to an edge of the first pattern electrodes, and
traces provided inside the second pattern electrodes are parallel to an edge of the second pattern electrodes, and in addition, traces provided inside the second pattern electrodes have a tilt direction that differs by 90 degrees from the traces provided inside the first pattern electrodes.

10. The electrode sheet according to claim 1, wherein the pattern electrodes of at least one of either the first or the second pattern electrodes internally include multiple electrode patterns with different periodic directions as the electrode pattern.

11. The electrode sheet according to claim 1, wherein the first and second pattern electrodes are respectively rectangular,
in the first pattern electrode lines, the first pattern electrodes are respectively connected at a corner part of the first pattern electrodes,
in the second pattern electrode lines, the second pattern electrodes are respectively connected at a corner part of the second pattern electrodes,
traces provided inside the first pattern electrodes respectively have geometrically similar shapes to an outer shape of the first pattern electrodes, the traces provided inside the first pattern electrodes respectively have shapes that are successively reduced farther inward in the first pattern electrodes, and the traces provided inside the first pattern electrodes respectively are joined to each other by joining traces, and
traces provided inside the second pattern electrodes respectively have geometrically similar shapes to an outer shape of the second pattern electrodes, the traces provided inside the second pattern electrodes respectively have shapes that are successively reduced farther inward in the second pattern electrodes, and the traces provided inside the second pattern electrodes respectively are joined to each other by joining traces.

12. The electrode sheet according to claim 1, wherein
in the first and the second pattern electrodes, overlapping traces do not exist except at respective pattern electrode connecting parts when viewed from a direction perpendicular to the first and the second pattern electrode parts.

13. A touch panel comprising:
the electrode sheet according to claim 1.

14. A display device comprising:
the touch panel according to claim 13.

* * * * *